(12) United States Patent
Litt et al.

(10) Patent No.: US 7,829,602 B2
(45) Date of Patent: Nov. 9, 2010

(54) PROCESS AND APPARATUS FOR CONVERTING NATURAL GAS TO HIGHER MOLECULAR WEIGHT HYDROCARBONS USING MICROCHANNEL PROCESS TECHNOLOGY

(75) Inventors: Robert Dwayne Litt, Westerville, OH (US); Wayne W. Simmons, Dublin, OH (US)

(73) Assignee: Velocys, Inc., Plain City, OH (US)

( * ) Notice: Subject to any disclaimer, the term of this patent is extended or adjusted under 35 U.S.C. 154(b) by 350 days.

(21) Appl. No.: 12/016,250

(22) Filed: Jan. 18, 2008

(65) Prior Publication Data

US 2008/0210596 A1 Sep. 4, 2008

Related U.S. Application Data

(60) Provisional application No. 60/885,735, filed on Jan. 19, 2007.

(51) Int. Cl.
*C07C 27/00* (2006.01)

(52) U.S. Cl. .................. 518/706; 518/700; 518/702; 518/704; 518/705; 518/715; 518/716; 518/717

(58) Field of Classification Search .............. 518/700, 518/702, 704, 705, 706, 715, 716, 717
See application file for complete search history.

(56) References Cited

U.S. PATENT DOCUMENTS

| | | | |
|---|---|---|---|
| 3,882,049 | A | 5/1975 | Bertolacini et al. |
| 3,972,837 | A | 8/1976 | Acres et al. |
| 4,089,810 | A | 5/1978 | Diwell et al. |
| 4,096,095 | A | 6/1978 | Cairns |
| 4,289,652 | A | 9/1981 | Hunter et al. |
| 5,248,251 | A | 9/1993 | Betta et al. |
| 6,040,266 | A | 3/2000 | Fay, III et al. |
| 6,440,895 | B1 | 8/2002 | Tonkovich et al. |
| 6,703,429 | B2 | 3/2004 | O'Rear et al. ............... 518/706 |
| 6,743,962 | B2 | 6/2004 | O'Rear et al. ............... 585/717 |
| 6,768,035 | B2 | 7/2004 | O'Rear et al. .............. 585/331 |

(Continued)

FOREIGN PATENT DOCUMENTS

DE 246257 6/1987

(Continued)

OTHER PUBLICATIONS

Chen et al.; "Performance analysis of a folding flow micromixer"; Microfluid Nanofluid (2009) 6:763-774.

(Continued)

*Primary Examiner*—Jafar Parsa
(74) *Attorney, Agent, or Firm*—Renner, Otto, Boisselle & Sklar, LLP

(57) ABSTRACT

The disclosed invention relates to a process and apparatus for converting natural gas to higher molecular weight hydrocarbons. The process includes steam reforming to form synthesis gas followed by a Fischer-Tropsch reaction to convert the synthesis gas to the high molecular weight hydrocarbons. The reforming and Fischer-Tropsch reactions are conducted in microchannel reactors. The higher molecular weight hydrocarbons may be further treated to form hydrocarbon products such as middle distillate fuels, lubricating oils, and the like. The apparatus includes vessels containing SMR microchannel reactors and Fischer-Tropsch microchannel reactors. A composition comprising a mixture of olefins and paraffins is disclosed.

43 Claims, 30 Drawing Sheets

U.S. PATENT DOCUMENTS

| | | | |
|---|---|---|---|
| 6,969,506 B2 | 11/2005 | Tonkovich et al. | 423/652 |
| 7,012,104 B2 | 3/2006 | Espinoza et al. | 518/715 |
| 7,019,038 B2 | 3/2006 | Espinoza et al. | 518/700 |
| 7,045,114 B2 | 5/2006 | Tonkovich et al. | 423/659 |
| 7,067,560 B2 | 6/2006 | Bowe | 518/700 |
| 7,067,561 B2 | 6/2006 | Bowe | 518/706 |
| 7,071,239 B2 | 7/2006 | Ortego, Jr. et al. | 518/715 |
| 7,084,180 B2 | 8/2006 | Wang et al. | 518/712 |
| 7,087,651 B2 | 8/2006 | Lee-Tuffnell et al. | 518/700 |
| 7,108,070 B2 | 9/2006 | Hall et al. | 166/357 |
| 7,109,248 B2 | 9/2006 | Bowe | 518/700 |
| 2003/0225169 A1 | 12/2003 | Yetman | 518/726 |
| 2004/0134660 A1 | 7/2004 | Hall et al. | 166/357 |
| 2005/0165121 A1 | 7/2005 | Wang et al. | 518/726 |
| 2005/0282918 A1 | 12/2005 | Bowe | 518/726 |
| 2006/0041029 A1 | 2/2006 | Bowe et al. | 518/700 |
| 2006/0074134 A1 | 4/2006 | O'Rear et al. | 518/726 |
| 2006/0135630 A1 | 6/2006 | Bowe | 518/702 |
| 2006/0142400 A1 | 6/2006 | Bowe | 518/703 |
| 2006/0251552 A1 | 11/2006 | Wang et al. | 422/190 |

FOREIGN PATENT DOCUMENTS

| | | |
|---|---|---|
| DE | 3926466 | 2/1991 |
| EP | 1 434 652 B1 | 2/2005 |
| EP | 1 248 675 B1 | 8/2005 |
| EP | 1 559 475 A1 | 8/2005 |
| EP | 1 567 616 B1 | 8/2006 |
| EP | 1102628 | 11/2006 |
| GB | 1531134 | 11/1978 |
| GB | 2077136 | 12/1981 |
| WO | 9421372 | 9/1994 |
| WO | 9700442 | 1/1997 |
| WO | 9828073 | 7/1998 |
| WO | 9838147 | 9/1998 |
| WO | 9916542 | 4/1999 |
| WO | 0006301 | 2/2000 |
| WO | 02/064248 A2 | 8/2002 |
| WO | 03006149 | 1/2003 |
| WO | 2004/096952 | 11/2004 |
| WO | 2005/003632 A1 | 1/2005 |
| WO | 2005/090521 A1 | 9/2005 |
| WO | 2005/090522 A1 | 9/2005 |
| WO | 2005/102511 A1 | 11/2005 |
| WO | 2005/123883 A1 | 12/2005 |
| WO | 2006/033025 A1 | 3/2006 |
| WO | 2006/043111 A1 | 4/2006 |
| WO | 2006/075130 A1 | 7/2006 |
| WO | 2006/075193 A1 | 7/2006 |
| WO | 2006/079848 A1 | 8/2006 |
| WO | 2006/090189 A1 | 8/2006 |
| WO | 2006/095204 A1 | 9/2006 |
| WO | 2006/127889 | 11/2006 |
| WO | 2007/008495 | 1/2007 |
| WO | 2007/008495 A2 | 1/2007 |
| ZA | 855317 | 7/1985 |

OTHER PUBLICATIONS

MacInnes et al.; "Investigation of alternating-flow mixing in microchannels"; Chemical Engineering Science 60; 2005; pp. 3453-3467.

MacInnes et al.; "Numerial characterization of floding flow microchannel mixers"; Chemical Engineering Science 62; 2007; pp. 2718-2727.

MacInnes et al.; "Mixing Strategies for Flow in Microchannel Devices"; Chemical and Process Engineering, University of Sheffield, Nov. 24, 2004.

"Smaller Scale GTL Plants Solve Associated Gas, Remote Location Problems"; *Syngas Refiner*, Dec. 1, 2006; pp. 16-17.

Miller et al.; "Selection of a Hydrogen Separation Process"; presented at the 1989 NPRA Annual Meeting held Mar. 19-21; pp. 1-27.

Iglesia; "Design, synthesis, and use of cobalt-based Fischer-Tropsch synthesis catalysts"; *Applied Catalysis A*: General 161 (1997); pp. 59-78.

Kandlikar; "Exploring Roughness Effect on Laminar Internal Flow—Are We Ready for Change?"; Nanoscale and Microscale Thermophysical Engineering; 2008; pp. 61-82; vol. 12; Taylor & Francis Group, LLC.

International Search Report and Written Opinion; Application No. PCT/US2008/051382; mailed Jan. 26, 2009.

Cybulski et al.; "Monoliths in Heterogeneous Catalysis"; Catal. Rev. —Sci. Eng., 36(2), 179-270 (1994).

Bennett et al.; "Microchannel cooled heatsinks for high average power laser diode arrays"; SPIE, vol. 1865; 1993; pp. 144-153.

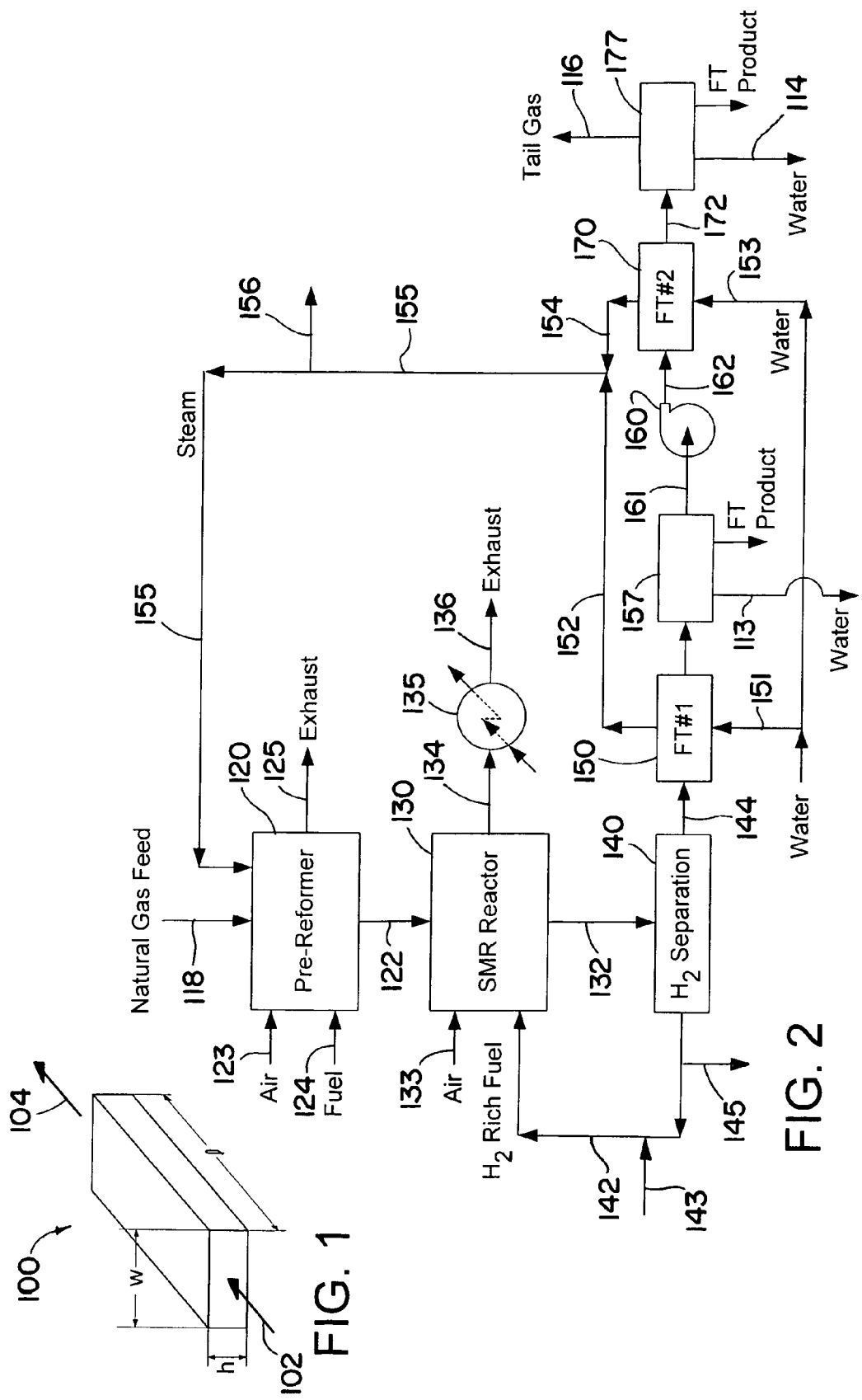

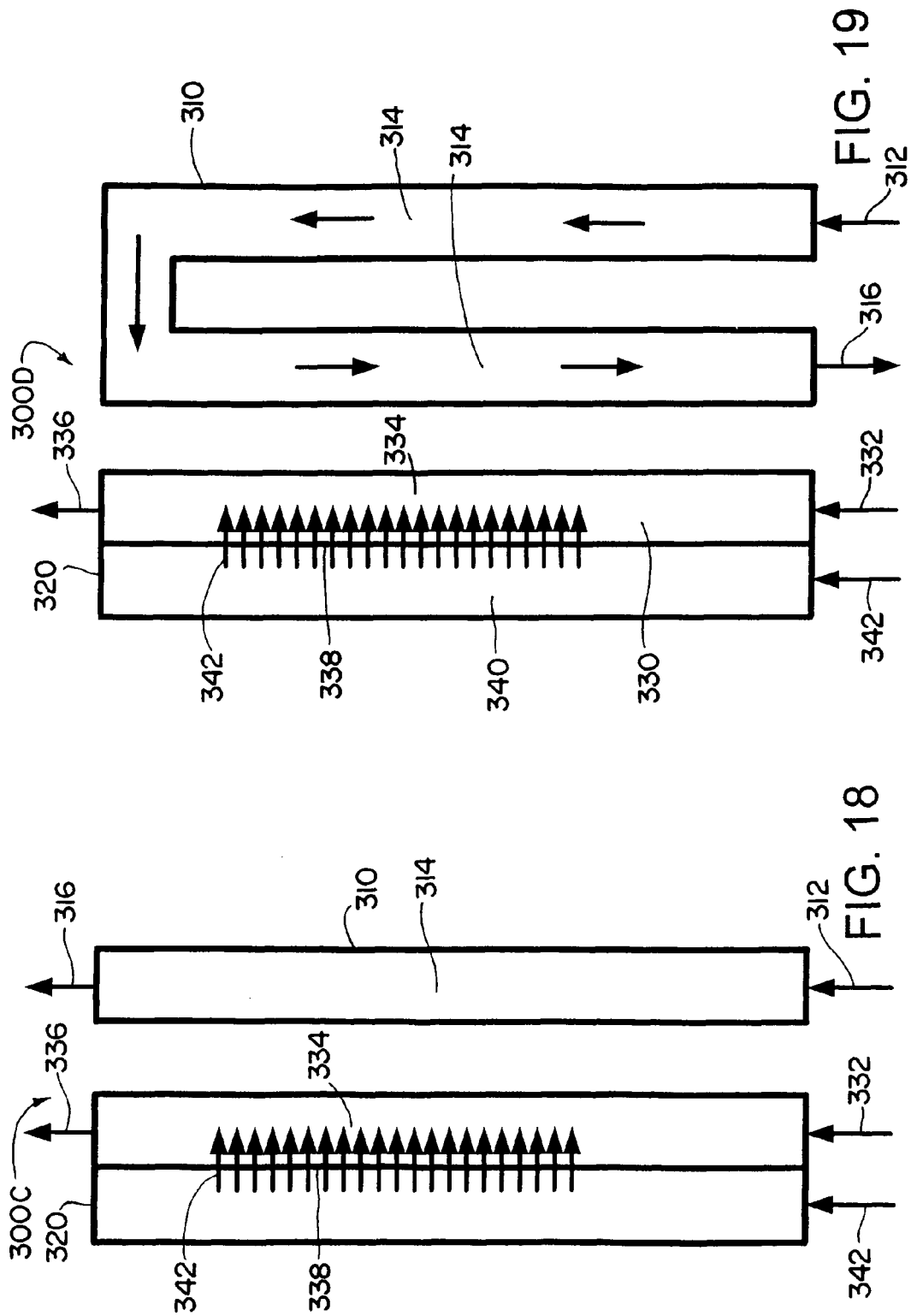

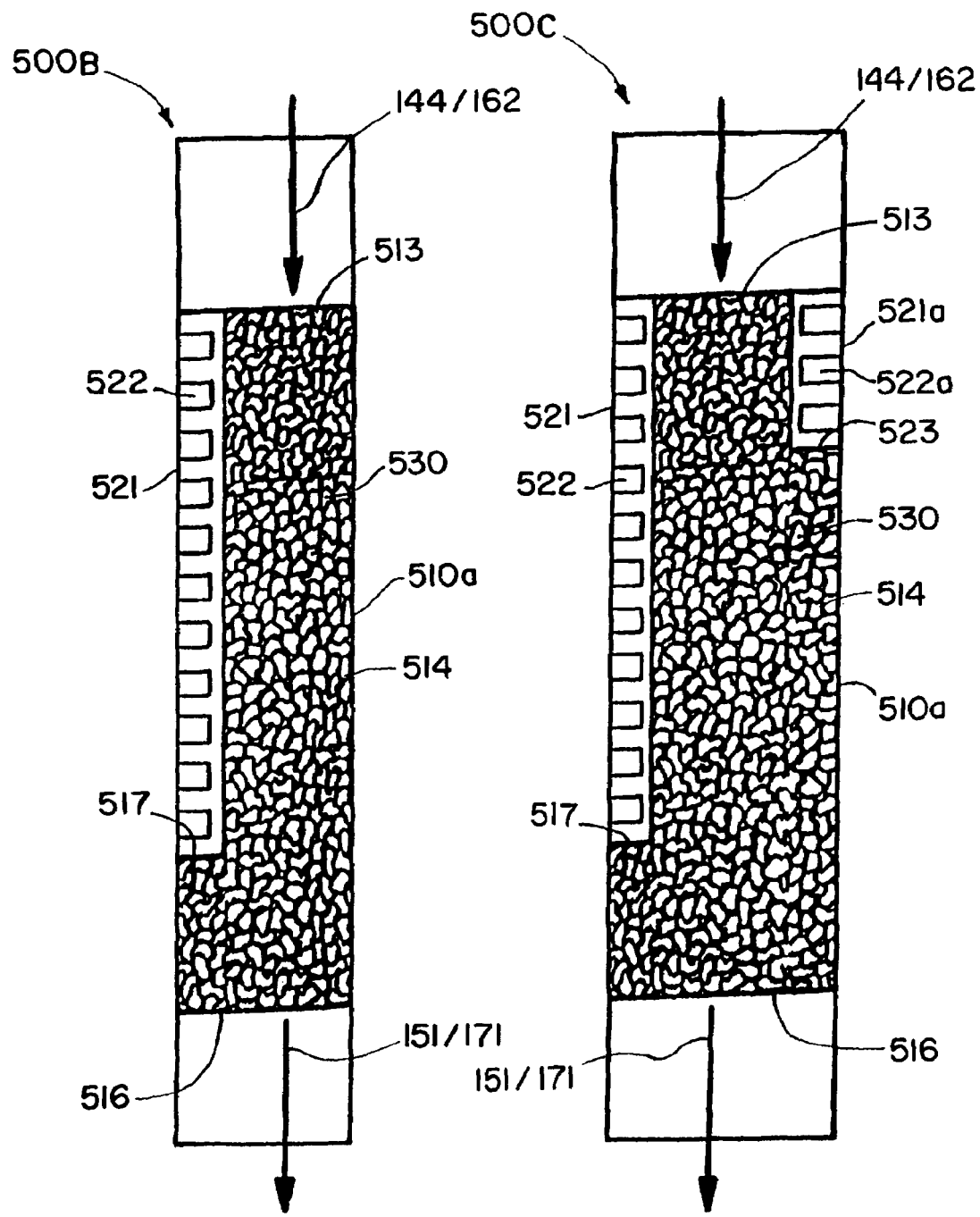

PROCESS AND APPARATUS FOR CONVERTING NATURAL GAS TO HIGHER MOLECULAR WEIGHT HYDROCARBONS USING MICROCHANNEL PROCESS TECHNOLOGY

This application claims priority to U.S. Provisional Patent Application Ser. No. 60/885,735, filed Jan. 19, 2007. The disclosure of this application is incorporated herein by reference.

TECHNICAL FIELD

This invention relates to a process and an apparatus for converting natural gas to one or more higher molecular weight hydrocarbon products using microchannel process technology.

BACKGROUND

Steam methane reforming (SMR) processes have been proposed for converting natural gas to synthesis gas. Fischer-Tropsch processes have been proposed for converting synthesis gas to the higher molecular weight hydrocarbons. Microchannel reactors for conducting the SMR and Fischer-Tropsch reactions have been suggested.

SUMMARY

There are problems with processes that have been proposed that combine SMR and Fischer-Tropsch reactions for converting natural gas to higher molecular weight hydrocarbons. These include the production of high levels of emissions, the requirement for high levels of water consumption, the production of large amounts of waste water, and process inefficiencies. The process inefficiencies tend to create limits in the amounts of carbon in the final Fischer-Tropsch product as compared to the amount of carbon in the natural gas feed. The present invention provides solutions to these problems.

This invention relates to a process, comprising: (A) flowing an SMR feed in an SMR microchannel reactor in contact with one or more SMR catalysts to form a first intermediate product, the SMR feed comprising methane and steam, the first intermediate product comprising CO and $H_2$; the SMR microchannel reactor comprising a plurality of SMR process microchannels and a plurality of combustion channels; the SMR process microchannels containing the one or more SMR catalysts, the methane and steam contacting the one or more SMR catalysts in the process microchannels; separating part of the $H_2$ from the first intermediate product to form a second intermediate product, the second intermediate product comprising CO and $H_2$; the combustion channels containing one or more combustion catalysts, the separated $H_2$ being combined with oxygen or a source of oxygen to form a combustion reaction mixture; the combustion reaction mixture contacting the one or more combustion catalysts, undergoing a combustion reaction, and generating heat and a combustion exhaust; transferring heat from the combustion channels to the SMR process microchannels; and (B) flowing the second intermediate product in a Fischer-Tropsch microchannel reactor in contact with one or more Fischer-Tropsch catalysts to form a Fischer-Tropsch product comprising one or more higher molecular weight hydrocarbons; the Fischer-Tropsch microchannel reactor comprising a plurality of Fischer-Tropsch process microchannels and a plurality of heat exchange channels; the Fischer-Tropsch process microchannels containing the one or more Fischer-Tropsch catalysts, the second intermediate product contacting the one or more Fischer-Tropsch catalysts in the Fischer-Tropsch process microchannels; transferring heat from the Fischer-Tropsch process microchannels to a heat exchange fluid in the heat exchange channels.

In one embodiment, the Fischer-Tropsch product formed in step (B) may further comprise a gaseous mixture comprising CO and $H_2$, and a second Fischer-Tropsch microchannel reactor may be used in combination with the foregoing Fischer-Tropsch microchannel reactor to further treat the product stream. This gaseous mixture may be separated from the Fischer-Tropsch product. The separated gaseous mixture may be referred to as a third intermediate product. The process may further comprise: (C) flowing the third intermediate product in a second Fischer-Tropsch microchannel reactor in contact with one or more second Fischer-Tropsch catalysts to form a second Fischer-Tropsch product comprising one or more higher molecular weight hydrocarbons; the second Fischer-Tropsch microchannel reactor comprising a plurality of second Fischer-Tropsch process microchannels and a plurality of second heat exchange channels; the second Fischer-Tropsch process microchannels containing one or more second Fischer-Tropsch catalysts, the third intermediate product contacting the one or more second Fischer-Tropsch catalysts in the second Fischer-Tropsch process microchannels; transferring heat from the second Fischer-Tropsch process microchannels to a heat exchange fluid in the second heat exchange channels.

In one embodiment, one or more, and in one embodiment from one to about ten, and in one embodiment from one to about seven, and in one embodiment from one to about five, and in one embodiment from one to about three, Fischer-Tropsch microchannel reactors may be used in combination with the foregoing Fischer-Tropsch microchannel reactor and second Fischer-Tropsch microchannel reactor to further treat the product stream. Thus, for example, the second Fischer-Tropsch product formed in step (C) may further comprise a gaseous mixture comprising CO and $H_2$. This gaseous mixture may be separated from the second Fischer-Tropsch product. The separated gaseous mixture may be referred to as a fourth intermediate product. The process may further comprise: (D) flowing the fourth intermediate product in a third Fischer-Tropsch microchannel reactor in contact with one or more third Fischer-Tropsch catalysts to form a third Fischer-Tropsch product comprising one or more higher molecular weight hydrocarbons; the third Fischer-Tropsch microchannel reactor comprising a plurality of third Fischer-Tropsch process microchannels and a plurality of third heat exchange channels; the third Fischer-Tropsch process microchannels containing one or more third Fischer-Tropsch catalysts, the fourth intermediate product contacting the one or more third Fischer-Tropsch catalysts in the third Fischer-Tropsch process microchannels; transferring heat from the third Fischer-Tropsch process microchannels to a heat exchange fluid in the third heat exchange channels.

In one embodiment, the third Fischer-Tropsch product formed in step (D) may further comprise a gaseous mixture comprising CO and $H_2$. This gaseous mixture may be separated from the third Fischer-Tropsch product. The separated gaseous mixture may be referred to as a fifth intermediate product. The process may further comprise: (E) flowing the fifth intermediate product in a fourth Fischer-Tropsch microchannel reactor in contact with one or more fourth Fischer-Tropsch catalysts to form a fourth Fischer-Tropsch product comprising one or more higher molecular weight hydrocarbons; the fourth Fischer-Tropsch microchannel reactor comprising a plurality of fourth Fischer-Tropsch process microchannels and a plurality of fourth heat exchange channels; the fourth Fischer-Tropsch process microchannels containing one or more fourth Fischer-Tropsch catalysts, the fifth intermediate product contacting the one or more fourth Fischer-Tropsch catalysts in the fourth Fischer-Tropsch process microchannels; transferring heat from the fourth Fischer-Tropsch process microchannels to a heat exchange fluid in the fourth heat exchange channels.

In one embodiment, the fourth Fischer-Tropsch product formed in step (E) may further comprise a gaseous mixture comprising CO and $H_2$. This gaseous mixture may be separated from the fourth Fischer-Tropsch product. The separated gaseous mixture may be referred to as a sixth intermediate product. The process may further comprise: (F) flowing the sixth intermediate product in a fifth Fischer-Tropsch microchannel reactor in contact with one or more fifth Fischer-Tropsch catalysts to form a fifth Fischer-Tropsch product comprising one or more higher molecular weight hydrocarbons; the fifth Fischer-Tropsch microchannel reactor comprising a plurality of fifth Fischer-Tropsch process microchannels and a plurality of fifth heat exchange channels; the fifth Fischer-Tropsch process microchannels containing one or more fifth Fischer-Tropsch catalysts, the sixth intermediate product contacting the one or more fifth Fischer-Tropsch catalysts in the fifth Fischer-Tropsch process microchannels; transferring heat from the fifth Fischer-Tropsch process microchannels to a heat exchange fluid in the fifth heat exchange channels.

The invention relates to an apparatus, comprising: a plurality of SMR microchannel reactors positioned in an SMR vessel, each SMR microchannel reactor comprises a plurality of SMR process microchannels, a plurality of combustion channels and a plurality of staged addition channels, each combustion channel being adjacent to at least one staged addition channel, the SMR vessel being equipped with a manifold for flowing an SMR feed to the SMR process microchannels, a manifold for flowing an SMR product from the SMR process microchannels, a manifold for flowing a fuel to the combustion channels, a manifold for flowing oxygen or a source of oxygen to the staged addition channels, and a manifold for flowing combustion exhaust from the combustion channels.

The invention relates to an apparatus, comprising: a plurality of Fischer-Tropsch microchannel reactors positioned in a Fischer-Tropsch vessel, each Fischer-Tropsch microchannel reactor comprises a plurality of the Fischer-Tropsch process microchannels and a plurality of heat exchange channels, the Fischer-Tropsch vessel being equipped with a manifold for flowing a Fischer-Tropsch feed to the Fischer-Tropsch process microchannels, a manifold for flowing a Fischer-Tropsch product from the Fischer-Tropsch process microchannels, a manifold for flowing a heat exchange fluid to the heat exchange channels, and a manifold for flowing the heat exchange fluid from the heat exchange channels.

The invention relates to a composition which may comprise a mixture of olefins and paraffins of about 5 to about 100 carbon atoms, and in one embodiment from about 5 to about 50 carbon atoms, and in one embodiment from about 5 to about 30 carbon atoms, and in one embodiment from about 5 to about 20 carbon atoms, and in one embodiment from about 5 to about 10 carbon atoms. The molar ratio of olefins to paraffins may be in the range from about 0.01 to about 0.8, and in one embodiment in the range from about 0.1 to about 0.8 and in one embodiment in the range from about 0.2 to about 0.8.

An advantage of the present invention is that the process may be conducted with relatively low levels of emissions such as $NO_x$, CO and $CO_2$ being produced. The need for fresh water feed for the process may be eliminated or reduced to very low levels. The carbon efficiency of the process, that is, the ratio of carbon in the Fischer-Tropsch product as compared to carbon in the natural gas feed, may be relatively high.

An advantage of the inventive process is that part of the $H_2$ may be separated from the first intermediate product or synthesis gas product produced in the SMR microchannel reactor and recycled back to the combustion channels in the SMR microchannel reactor as an $H_2$ rich fuel. By creating an $H_2$ rich fuel with little or no carbon-containing ingredients, the water from the combustion exhaust may be captured economically as water feed for the process thereby eliminating or reducing dramatically the need for fresh water feed. By using the $H_2$ rich fuel, the process may be operated with reduced levels of CO and $CO_2$ emissions.

An advantage of the inventive process is that it may be characterized as providing a relatively high level of carbon utilization. The following aspects of the inventive process may contribute to providing a high level of carbon utilization: (a) use of an SMR microchannel reactor that includes integrated combustion; (b) use of one or more Fischer-Tropsch microchannel reactors that produce steam for use elsewhere in the process; (c) recycle of $H_2$ separated from synthesis gas produced in the SMR microchannel reactor as an $H_2$ rich fuel to the combustion channels of the SMR microchannel reactor; (d) recycle of tail gas from the Fischer-Tropsch microchannel reactor to the feed for the SMR microchannel reactor; (e) separation of $H_2$ and/or $N_2$ from the tail gas formed in the Fischer-Tropsch microchannel reactor; and/or (f) recycle of steam from the heat exchange channels of the Fischer-Tropsch microchannel reactor to the SMR microchannel reactor. One or more of these advantages in various combinations may be used to achieve a carbon utilization greater than about 75% in a process to convert natural gas to hydrocarbon liquids via microchannel steam reforming and microchannel Fischer-Tropsch processing. An advantage of the inventive process is that it may be possible to avoid higher production costs as well as provide a relatively safe operation by using process streams that employ the use of air as a source for oxygen, as compared to prior art process that use pure oxygen or oxygen enriched air. Another advantage is that it may be possible to export electricity out of the process for other uses. Another advantage is that excess $H_2$ separated from the first intermediate product may be utilized and/or purified, as required, to supply $H_2$ needs for product upgrading, such as hydrotreating or hydrocracking, or for feedstock purification, such as hydrodesulfurization.

BRIEF DESCRIPTION OF THE DRAWINGS

In the annexed drawings like parts and features have like references. A number of the drawings are schematic illustrations which may not necessarily be drawn to scale.

FIG. 1 is a schematic illustration of a microchannel that may be used with the inventive process and apparatus.

FIG. 2 is a flow sheet illustrating the inventive process in a particular form, the process comprising converting natural gas to one or more higher molecular weight hydrocarbons using steam methane reforming (SMR) in an SMR microchannel reactor in combination with Fischer-Tropsch (FT) processing in two Fischer-Tropsch microchannel reactors operated in sequence. A pre-reformer positioned upstream of the SMR microchannel reactor is used in this process.

In FIG. 10, the SMR feed is identified as a mixture of natural gas, Fischer-Tropsch (FT) recycle, and steam. The first intermediate product is identified in FIG. 10 as the product synthesis gas. The source of oxygen identified in FIG. 10 is air.

In FIGS. 12 and 13, five SMR microchannel reactors are shown.

FIGS. 15-19 are schematic illustrations of microchannel repeating units that may be used in the SMR microchannel reactor. Each of these repeating units comprises a combustion channel and one or more SMR process microchannels. The combustion channels illustrated in FIGS. 15-19 include staged addition channels for flowing the oxygen or source of oxygen into the combustion channels. FIG. 15 illustrates an upside down U-shaped SMR process microchannel adjacent an M-shaped combustion channel. FIG. 16 illustrates a single SMR process microchannel adjacent an M-shaped combustion channel. FIG. 17 illustrates two SMR process microchannels and an M-shaped combustion channel, one of the SMR process microchannels being adjacent to the M-shaped combustion channel and the other SMR process microchannel being adjacent the first-named SMR process microchannel, both of the SMR process microchannels being in thermal contact with the combustion channel. FIG. 18 illustrates a single combustion channel, a staged addition channel positioned on one side of the combustion channel and an SMR process channel positioned on the other side of the combustion channel. FIG. 19 illustrates a repeating unit that is similar to the repeating unit illustrated in FIG. 18 with the exception that the SMR process microchannel in the repeating unit illustrated in FIG. 19 is in the shape of an upside down U-shaped microchannel. In FIGS. 15-19 the channels are illustrated as being spaced from each other for purposes of clarification, however, in actual practice the channels would be stacked on top of each other or positioned side-by-side with no spacing between the channels. The channels may share common walls at the channel interfaces.

FIGS. 24-27 are schematic illustrations of repeating units that may be used in the Fischer-Tropsch microchannel reactors. Each of the repeating units illustrated in FIGS. 24-27 includes a Fischer-Tropsch process microchannel that contains a catalyst which is in the form of a bed of particulate solids, and adjacent heat exchange channels. The catalyst beds may be referred to as reaction zones. Heat exchange fluid flowing in the heat exchange channels illustrated in FIG. 24 flows in a direction that is cross-current relative to the flow of process fluids in the Fischer-Tropsch process microchannel. Heat exchange fluid flowing in the heat exchange channel illustrated in FIG. 25 may flow in a direction that is co-current or counter-current to the flow of process fluid in the Fischer-Tropsch process microchannel. The heat exchange channels illustrated in FIGS. 26 and 27 provide for the flow of heat exchange fluid in a direction that is cross-current relative to the flow of process fluid in the Fischer-Tropsch process microchannels. The heat exchange channels illustrated in FIGS. 26 and 27 provide for heat exchange zones that cover only part of the length of the reaction zones in the Fischer-Tropsch process microchannels. Tailored heat exchange profiles may be provided with each of these embodiments by controlling the number of heat exchange channels in thermal contact with different sections of the process microchannels and/or by controlling the flow rate of heat exchange fluid in the heat exchange channels. With these tailored heat exchange profiles more cooling may be provided in some parts of the process microchannels as compared to other parts of the process microchannels. For example, more cooling may be provided at or near the entrances to the reaction zones as compared to downstream parts of the reaction zones. The heat exchange profile may be tailored by controlling the flow rate of heat exchange fluid in the heat exchange channels. For example, a relatively high rate of flow of heat exchange fluid in the heat exchange channels in thermal contact with the entrances to the reaction zones may be used in combination with relatively low rates of flow of heat exchange fluid in heat exchange channels in thermal contact with downstream sections of the reaction zones.

FIGS. 30-35 are also illustrative of sorption materials or supports for such sorption materials that may be used in the microchannel separators illustrated in FIGS. 28 and 29. The catalyst or sorption material illustrated in FIG. 30 is in the form of a bed of particulate solids. The catalyst or sorption material illustrated in FIG. 31 has a flow-by design. The catalyst or sorption material illustrated in FIG. 32 is a flow-through structure. FIGS. 33-35 are schematic illustrations of fin assemblies that may be used for supporting the catalyst or sorption materials.

DETAILED DESCRIPTION

Figure 3:
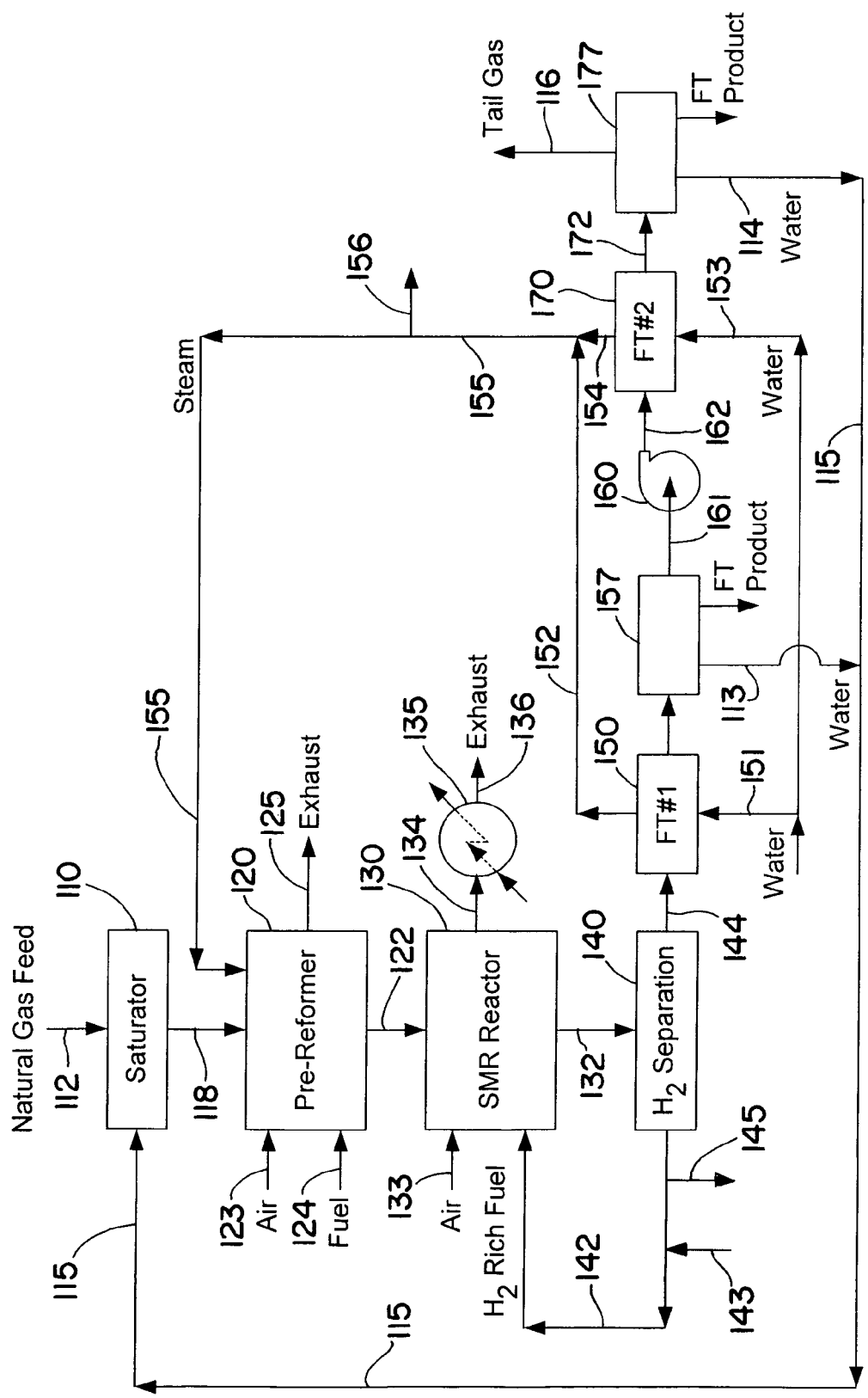
FIG. 3 is a flow sheet of a process similar to the process shown in FIG. 2. The process illustrated in FIG. 3 includes the addition of a saturator and recirculation of process water from the Fischer-Tropsch microchannel reactors to the saturator. Natural gas feed is combined with the recirculated process water in the saturator. This embodiment of the process may provide the advantage of eliminating the step of treating process water produced in the Fischer-Tropsch microchannel reactors to remove dissolved organics.

The term "microchannel" may refer to a channel having at least one internal dimension of height or width of up to about 10 millimeters (mm), and in one embodiment up to about 5 mm, and in one embodiment up to about 2 mm, and in one embodiment up to about 1 mm. The microchannel may comprise at least one inlet and at least one outlet wherein the at least one inlet is distinct from the at least one outlet. The microchannel may not be merely an orifice. The microchannel may not be merely a channel through a zeolite or a mesoporous material. An example of a microchannel that may be used with the disclosed process as a process microchannel, combustion microchannel, staged addition microchannel, and/or a heat exchange microchannel is illustrated in FIG. 1.

Referring to FIG. 1, microchannel 100 has a height (h), width (w) and length (l). Fluid may flow through the microchannel in the direction indicated by the arrows 102 and 104. Both the height (h) and width (w) are perpendicular to the direction of the bulk flow of fluid through the microchannel which is indicated by the arrows 102 and 104 in FIG. 1. The length (l) may be at least about two times the height (h) or (w), and in one embodiment at least about five times the height (h) or width (w), and in one embodiment at least about ten times the height (h) or width (w). The height (h) or width (w) of the microchannel may be in the range of about 0.05 to about 10 mm, and in one embodiment from about 0.05 to about 5 mm, and in one embodiment from about 0.05 to about 2 mm, and in one embodiment from about 0.05 to about 1.5 mm, and in one embodiment from about 0.05 to about 1 mm, and in one embodiment from about 0.05 to about 0.75 mm, and in one embodiment from about 0.05 to about 0.5 mm. The other dimension of height (h) or width (w) may be of any dimension, for example, up to about 3 meters, and in one embodiment about 0.01 to about 3 meters, and in one embodiment about 0.1 to about 3 meters. The length (l) of the microchannel may be of any dimension, for example, up to about 10 meters, and in one embodiment from about 0.1 to about 10 meters, and in one embodiment from about 0.2 to about 10 meters, and in one embodiment from about 0.2 to about 6 meters, and in one embodiment from 0.2 to about 3 meters. Although the microchannel illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "microchannel reactor" may refer to an apparatus comprising a plurality of process microchannels wherein a process may be conducted. The process may be an SMR reaction process or a Fischer-Tropsch reaction process. The process microchannels may be operated in parallel. The microchannel reactor may include a header or manifold assembly for providing for the flow of fluid into the process microchannels, and a footer or manifold assembly providing for the flow of fluid out of the process microchannels. The microchannel reactor may comprise one or more heat exchange channels adjacent to and/or in thermal contact with the process microchannels. The heat exchange channels provide heating and/or cooling for the fluids in the process microchannels. The heat exchange channels may be combustion channels. The heat exchange channels and/or combustion channels may be microchannels.

The term "process microchannel" may refer to a microchannel wherein a process is conducted. The process may relate to conducting a steam methane reforming (SMR) reaction or a Fischer-Tropsch (FT) reaction.

The term "volume" with respect to volume within a process microchannel may include all volume in the process microchannel a process fluid may flow through or flow by. This volume may include volume within surface features that may be positioned in the process microchannel and adapted for the flow of fluid in a flow-through manner or in a flow-by manner.

The term "adjacent" when referring to the position of one channel relative to the position of another channel may mean directly adjacent such that a wall or walls separate the two channels. In one embodiment, the two channels may have a common wall. The common wall may vary in thickness. However, "adjacent" channels may not be separated by an intervening channel that may interfere with heat transfer between the channels. One channel may be adjacent to another channel over only part of the dimension of the another channel. For example, a process microchannel may be longer than and extend beyond one or more adjacent heat exchange channels.

The term "thermal contact" may refer to two bodies, for example, two channels, that may or may not be in physical contact with each other or adjacent to each other but still exchange heat with each other. One body in thermal contact with another body may heat or cool the other body.

The term "fluid" may refer to a gas, a liquid, a mixture of a gas and a liquid, or a gas or a liquid containing dispersed solids, liquid droplets and/or gaseous bubbles. The droplets and/or bubbles may be irregularly or regularly shaped and may be of similar or different sizes.

The terms "gas" and "vapor" may have the same meaning and are sometimes used interchangeably.

The term "residence time" or "average residence time" may refer to the internal volume of a space within a channel occupied by a fluid flowing in the space divided by the average volumetric flow rate for the fluid flowing in the space at the temperature and pressure being used.

The terms "upstream" and "downstream" may refer to positions within a channel (e.g., a process microchannel) or in a process flow sheet that is relative to the direction of flow of a fluid in the channel or process flow sheet. For example, a position within a channel or process flow sheet not yet reached by a portion of a fluid stream flowing toward that position would be downstream of that portion of the fluid stream. A position within the channel or process flow sheet already passed by a portion of a fluid stream flowing away from that position would be upstream of that portion of the fluid stream. The terms "upstream" and "downstream" do not necessarily refer to a vertical position since the channels used herein may be oriented horizontally, vertically or at an inclined angle.

The term "shim" may refer to a planar or substantially planar sheet or plate. The thickness of the shim may be the smallest dimension of the shim and may be up to about 4 mm, and in one embodiment in the range from about 0.05 to about 2 mm, and in one embodiment in the range of about 0.05 to about 1 mm, and in one embodiment in the range from about 0.05 to about 0.5 mm. The shim may have any length and width.

The term "surface feature" may refer to a depression in a channel wall and/or a projection from a channel wall that disrupts flow within the channel. Examples of surface feature designs that may be used are illustrated in FIGS. 45 and 46. The surface features may be in the form of circles, spheres, frustrums, oblongs, squares, rectangles, angled rectangles, checks, chevrons, vanes, airfoils, wavy shapes, and the like, and combinations of two or more thereof. The surface features may contain subfeatures where the major walls of the surface features further contain smaller surface features that may take the form of notches, waves, indents, holes, burrs, checks, scallops, and the like. The surface features may have a depth, a width, and for non-circular surface features a length. The surface features may be formed on or in one or more of the interior walls of the process microchannels, heat exchange channels and/or combustion channels used in accordance with the disclosed process. The surface features may be referred to as passive surface features or passive mixing features. The surface features may be used to disrupt flow (for example, disrupt laminar flow streamlines) and create advective flow at an angle to the bulk flow direction.

The term "heat exchange channel" may refer to a channel having a heat exchange fluid in it that provides heat and/or absorbs heat. The heat exchange channel may absorb heat from or provide heat to an adjacent channel (e.g., process microchannel) and/or one or more channels in thermal contact with the heat exchange channel. The heat exchange channel may absorb heat from or provide heat to channels that are adjacent to each other but not adjacent to the heat exchange channel. In one embodiment, one, two, three or more channels may be adjacent to each other and positioned between two heat exchange channels.

The term "heat transfer wall" may refer to a common wall between a process microchannel and an adjacent heat exchange channel where heat transfers from one channel to the other through the common wall.

The term "heat exchange fluid" may refer to a fluid that may give off heat and/or absorb heat.

The term "bulk flow direction" may refer to the vector through which fluid may travel in an open path in a channel.

The term "bulk flow region" may refer to open areas within a microchannel. A contiguous bulk flow region may allow rapid fluid flow through a microchannel without significant pressure drops. In one embodiment, the flow in the bulk flow region may be laminar. A bulk flow region may comprise at least about 5% of the internal volume and/or cross-sectional area of a microchannel, and in one embodiment from about 5% to about 100%, and in one embodiment from about 5% to about 99%, and in one embodiment about 5% to about 95%, and in one embodiment from about 5% to about 90%, and in one embodiment from about 30% to about 80% of the internal volume and/or cross-sectional area of the microchannel.

The terms "open channel" or "flow-by channel" or "open path" may refer to a channel (e.g., a microchannel) with a gap of at least about 0.01 mm that extends all the way through the channel such that fluid may flow through the channel without encountering a barrier to flow. The gap may extend up to about 10 mm.

The term "cross-sectional area" of a channel (e.g., process microchannel) may refer to an area measured perpendicular to the direction of the bulk flow of fluid in the channel and may include all areas within the channel including any surface features that may be present, but does not include the channel walls. For channels that curve along their length, the cross-sectional area may be measured perpendicular to the direction of bulk flow at a selected point along a line that parallels the length and is at the center (by area) of the channel. Dimensions of height and width may be measured from one channel wall to the opposite channel wall. These dimensions may not be changed by application of a coating to the surface of the wall. These dimensions may be average values that account for variations caused by surface features, surface roughness, and the like.

The term "open cross-sectional area" of a channel (e.g., process microchannel) may refer to an area open for bulk fluid flow in a channel measured perpendicular to the direction of the bulk flow of fluid flow in the channel. The open cross-sectional area may not include internal obstructions such as surface features and the like which may be present.

The term "superficial velocity" for the velocity of a fluid flowing in a channel may refer to the velocity resulting from dividing the volumetric flow rate of the fluid at the inlet temperature and pressure of the channel divided by the cross-sectional area of the channel.

The term "free stream velocity" may refer to the velocity of a stream flowing in a channel at a sufficient distance from the sidewall of the channel such that the velocity is at a maximum value. The velocity of a stream flowing in a channel is zero at the sidewall if a no slip boundary condition is applicable, but increases as the distance from the sidewall increases until a constant value is achieved. This constant value is the "free stream velocity."

The term "process fluid" may be used herein to refer to reactants, product and any diluent or other fluid that may flow in a process microchannel.

The term "reaction zone" may refer to the space within a microchannel wherein a chemical reaction occurs or wherein a chemical conversion of at least one species occurs. The reaction zone may contain one or more catalysts.

The term "yield" may refer to the number of moles of product exiting a microchannel reactor divided by the number of moles of a reactant entering the microchannel reactor.

The term "cycle" may refer to a single pass of the reactants through a microchannel reactor.

The term "graded catalyst" may refer to a catalyst with one or more gradients of catalytic activity. The graded catalyst may have a varying concentration or surface area of a catalytically active metal. The graded catalyst may have a varying turnover rate of catalytically active sites. The graded catalyst may have physical properties and/or a form that varies as a function of distance. For example, the graded catalyst may have an active metal concentration that is relatively low at the entrance to a process microchannel and increases to a higher concentration near the exit of the process microchannel, or vice versa; or a lower concentration of catalytically active metal nearer the center (i.e., midpoint) of a process microchannel and a higher concentration nearer a process microchannel wall, or vice versa, etc. The thermal conductivity of a graded catalyst may vary from one location to another within a process microchannel. The surface area of a graded catalyst may be varied by varying size of catalytically active metal sites on a constant surface area support, or by varying the surface area of the support such as by varying support type or particle size. A graded catalyst may have a porous support where the surface area to volume ratio of the support is higher or lower in different parts of the process microchannel followed by the application of the same catalyst coating everywhere. A combination of two or more of the preceding embodiments may be used. The graded catalyst may have a single catalytic component or multiple catalytic components (for example, a bimetallic or trimetallic catalyst). The graded catalyst may change its properties and/or composition gradually as a function of distance from one location to another within a process microchannel. The graded catalyst may comprise rimmed particles that have "eggshell" distributions of catalytically active metal within each particle. The graded catalyst may be graded in the axial direction along the length of a process microchannel or in the lateral direction. The graded catalyst may have different catalyst compositions, different loadings and/or numbers of active catalytic sites that may vary from one position to another position within a process microchannel. The number of catalytically active sites may be changed by altering the porosity of the catalyst structure. This may be accomplished using a washcoating process that deposits varying amounts of catalytic material. An example may be the use of different porous catalyst thicknesses along the process microchannel length, whereby a thicker porous structure may be left where more activity is required. A change in porosity for a fixed or variable porous catalyst thickness may also be used. A first pore size may be used adjacent to an open area or gap for flow and at least one second pore size may be used adjacent to the process microchannel wall.

The term "chain growth" may refer to the growth in a molecule resulting from a reaction in which the molecule grows with the addition of new molecular structures (e.g., the addition of methylene groups to a hydrocarbon chain in a Fischer-Tropsch synthesis).

The term "hydrocarbon" may refer to purely hydrocarbon compounds; that is, aliphatic compounds, (e.g., alkane, alkene or alkyne), alicyclic compounds (e.g., cycloalkane, cycloalkylene), aromatic compounds, aliphatic- and alicyclic-substituted aromatic compounds, aromatic-substituted aliphatic compounds, aromatic-substituted alicyclic compounds, and the like. Examples may include methane, ethane, propane, cyclohexane, ethyl cyclohexane, toluene, ethyl benzene, etc. The term "hydrocarbon" may refer to substituted hydrocarbon compounds; that is, hydrocarbon compounds containing non-hydrocarbon substituents. Examples of the non-hydrocarbon substituents may include hydroxyl, acyl, nitro, etc. The term "hydrocarbon" may refer to hetero substituted hydrocarbon compounds; that is, hydrocarbon compounds which contain atoms other than carbon in a chain or ring otherwise containing carbon atoms. The hetero atoms may include, for example, nitrogen, oxygen, sulfur, and the like.

The term "higher molecular weight hydrocarbon" may refer to a hydrocarbon having 2 or more carbon atoms, and in one embodiment 3 or more carbon atoms, and in one embodiment 4 or more carbon atoms, and in one embodiment 5 or more carbon atoms. The higher molecular weight hydrocarbons may have up to about 100 carbon atoms, and in one embodiment up to about 90 carbon atoms, and in one embodiment up to about 80 carbon atoms, and in one embodiment up to about 70 carbon atoms, and in one embodiment up to about 60 carbon atoms, and in one embodiment up to about 50 carbon atoms, and in one embodiment up to about 40 carbon atoms, and in one embodiment up to about 30 carbon atoms. The higher molecular weight hydrocarbons may be aliphatic hydrocarbons. Examples may include ethane, propane, butane, pentane, hexane, octane, decane, dodecane, and the like.

The term "steam methane reforming" or "SMR" may refer to the reaction:

$$H_2O+CH_4 \rightarrow CO+3H_2$$

This reaction is endothermic, and may be conducted in the presence of an SMR catalyst. The product mixture of $CO+H_2$ may be referred to as synthesis gas or syn gas. The heat required to effect this reaction may be provided by the combustion reaction of a mixture of a fuel (e.g., $H_2$) and oxygen or a source of oxygen (e.g., air or oxygen enriched air). The combustion reaction is exothermic and may be conducted in the presence of a combustion catalyst.

The term "Fischer-Tropsch" or "FT" may refer to a chemical reaction represented by the equation:

$$nCO+2nH_2 \rightarrow (CH_2)_n+nH_2O$$

This reaction is an exothermic reaction which may be conducted in the presence of a Fischer-Tropsch catalyst.

The term "Co loading" may refer to the weight of Co in a catalyst divided by the total weight of the catalyst, that is, the total weight of the Co plus any co-catalyst or promoter as well as any support. If the catalyst is supported on an engineered support structure such as a foam, felt, wad or fin, the weight of such engineered support structure may not be included in the calculation. Similarly, if the catalyst is adhered to a channel wall, the weight of the channel wall may is not be included in the calculation.

The term "carbon utilization" may refer to the percent of carbon in the Fischer-Tropsch product produced by the inventive process as compared to or based on the amount of carbon in the natural gas feed used in the process. Carbon utilization does not include import of oxygen to the process or export of electricity from the process.

The term "Fischer-Tropsch product" or "FT product" may refer to a hydrocarbon product made by a Fischer-Tropsch process having a boiling point at or above 30° C. at atmospheric pressure.

The term "tail gas" may refer to a gaseous product made by a Fischer-Tropsch process having a boiling point below 30° C. at atmospheric pressure.

The term "mm" may refer to millimeter. The term "nm" may refer to nanometer. The term "ms" may refer to millisecond. The term "µs" may refer to microsecond. The term "µm" may refer to micron or micrometer. The terms "micron" and "micrometer" have the same meaning and may be used interchangeably.

Unless otherwise indicated, all pressures are expressed in terms of absolute pressure.

The inventive process will now be described with reference to the drawings. Referring to FIG. 2, the process may be conducted using pre-reformer 120, SMR microchannel reactor 130, $H_2$ separator 140, Fischer-Tropsch (FT) microchannel reactor 150, compressor 160, second Fischer-Tropsch (FT) microchannel reactor 170, and separators 157 and 177. Although the illustrated embodiments disclose the use of two Fischer-Tropsch microchannel reactors used in sequence, it is to be understood that a single Fischer-Tropsch microchannel reactor may be used, or three or more Fischer-Tropsch microchannel reactors may be used in sequence, for example, three, four, five, six, etc., Fischer-Tropsch microchannel reactors may be used in sequence. Thus, for example, one or more, and in one embodiment from one to about ten, and in one embodiment from one to about seven, and in one embodiment from one to about five, and in one embodiment from one to about three, Fischer-Tropsch microchannel reactors may be used in sequence with the Fischer-Tropsch microchannel reactors 150 and 170.

The natural gas may contain higher molecular weight hydrocarbons (e.g., ethane and higher) which if included in the SMR feed may tend to form carbon deposits in the SMR microchannel reactor. The pre-reformer 120 may be used to reduce the level of higher molecular weight hydrocarbons in the SMR feed by converting at least some of these hydrocarbons to methane. There is less tendency to form carbon deposits with methane. If higher molecular weight hydrocarbons are not in the natural gas feed, the use of pre-reforming may be avoided.

The pre-reformer 120 may be a conventional reformer or a microchannel reformer. The conventional reformer may be in the form of a fixed bed reactor employing an SMR catalyst such as a nickel SMR catalyst. The microchannel pre-reformer 120 may be the same as or similar to the SMR microchannel reactor 130 with the exception that the microchannel pre-reformer 120 may be operated at a lower temperature than the SMR microchannel reactor 130 in order to avoid the formation of carbon/coke deposits in the process microchannels. For example, the pre-reformer 120 may be operated at a temperature in the range from about 400 to about 600° C., while the SMR microchannel reactor may be operated at these temperatures or higher temperatures as indicated below. In the pre-reformer 120 the concentration of higher molecular weight hydrocarbons, that is hydrocarbons of two or more carbon atoms, may be reduced by converting these hydrocarbons to methane. The percentage of higher molecular weight hydrocarbons converted to methane in the pre-reformer 120 may be in the range from about 80 to about 100% by volume of the higher molecular weight hydrocarbons, and in one embodiment in the range from about 98 to about 99% by volume. The operating pressure within the pre-reformer 120 may be in the range from about 5 to about 25 atmospheres, and in one embodiment in the range from about 15 to about 20 atmospheres. The pre-reformer 120 may be heated using combustion channels similar to those used in the SMR microchannel reactor 130. Air and fuel enter the pre-reformer 120 as indicated by lines 123 and 124, contact a combustion catalyst, undergo a combustion reaction, and generate heat and exhaust. The exhaust exits the pre-reformer 120 as indicated by line 125. The combustion channels may be microchannels. The fuel may be an $H_2$ rich fuel taken from the separator 140, tail gas separated in the separator 177, natural gas, or two or more thereof.

The SMR microchannel reactor 130 may comprise a plurality of SMR process microchannels, a plurality of combustion channels, and a plurality of staged addition channels. The SMR microchannel reactor 130 may contain any desired number of SMR process microchannels, combustion channels and staged addition channels, for example, from about 100 to about 50,000 of each, and in one embodiment from about 1000 to about 10,000 of each. The SMR process microchannels may contain one or more SMR catalysts. The SMR process microchannels may be in the form of a U or an upside down U (see, FIGS. 15 and 19) wherein the reactants enter the process microchannels on one side of the microchannel reactor and product exits the SMR process microchannel on the same side of the microchannel reactor. Alternatively, the SMR process microchannels may be in the form of straight run channels (see, FIGS. 16-18) wherein the reactants enter the process microchannels on one side of the microchannel reactor and product exits the process microchannels on the other side of the microchannel reactor. The combustion channels may contain one or more combustion catalysts. Each combustion channel is adjacent to at least one staged addition channel. The staged addition channels may have different lengths than the combustion channels. The combustion channels and the staged addition channels may be microchannels. The combustion channels may be in the form of a U, an upside down U, a W or an M (see, FIGS. 15-17) wherein the $H_2$ rich fuel enters the combustion channel on one side of the microchannel reactor and the combustion exhaust exits on the same side. Alternatively, the combustion channels may be in the form of straight run channels (see, FIGS. 18 and 19) wherein the $H_2$ rich fuel enters the SMR microchannel reactor on one side of the reactor and the combustion exhaust exits on the other side of the microchannel reactor. The combustion channels may be aligned to provide for the flow of fluid in the combustion channels that is co-current, counter-current or cross-current relative to the flow of fluid in the SMR process microchannels. The SMR process microchannels, combustion channels and staged addition channels may be stacked one above another or positioned side-by-side. Two or more SMR process microchannels may be used in combination with each combustion channel. For example, each combustion channel may be used in combination with two SMR process microchannels wherein one of the SMR process microchannels is adjacent to the combustion channel and the other SMR process microchannel is positioned adjacent to the first named SMR process microchannel and is in thermal contact with the combustion channel (see, FIGS. 15, 17 and 19). The SMR microchannel reactor 130 may be equipped with appropriate headers and footers or manifolds to provide for the flow of reactants into the SMR process microchannels, product out of the SMR process microchannels, $H_2$ rich fuel into the combustion channels, oxygen or a source of oxygen into the staged addition channels, and combustion exhaust out of the combustion channels.

Each of the Fischer-Tropsch microchannel reactors 150 and 170 may comprise a plurality of Fischer-Tropsch process microchannels and a plurality of heat exchange channels stacked one above another or positioned side-by-side. The Fischer-Tropsch microchannel reactors 150 and 170 may each contain any desired number of process microchannels and heat exchange channels, for example, from about 100 to about 50,000 of each, and in one embodiment from about 1000 to about 10,000 of each. The heat exchange channels may be microchannels. The Fischer-Tropsch process microchannels may be straight run channels (see, FIGS. 24-27) wherein the reactants enter the process microchannels on one side of the microchannel reactor and product exits the process microchannels on the other side of the microchannel reactor. In one embodiment, the reactants may enter at the top of the channels and the product may exit at the bottom of the channels such that a down flow pattern is established. The heat exchange channels may be aligned to provide for flow of heat exchange fluid that is co-current, counter-current and/or cross-current relative to the flow of fluid in the process microchannels. Two or more Fischer-Tropsch process microchannels may be used in combination with each heat exchange channel. For example, each heat exchange channel may be used in combination with two Fischer-Tropsch process microchannels wherein one of the Fischer-Tropsch process microchannels is adjacent to the heat exchange channel and the other Fischer-Tropsch process microchannel is adjacent to the first named Fischer-Tropsch process microchannel and in thermal contact with the heat exchange channel. Each of the Fischer-Tropsch microchannel reactors may be equipped with appropriate headers and footers or manifolds to provide for the flow of reactants into the Fischer-Tropsch process microchannels, product out of the process microchannels, and heat exchange fluid into and out of the heat exchange channels. The product manifold may include a heating jacket that maintains the temperature of the product mixture until it exits the Fischer-Tropsch microchannel reactor vessel 400 (see, FIGS. 20-22). The heat may be supplied by steam, electricity, or other techniques.

The $H_2$ separator 140 may be a microchannel separator or a conventional separator. The $H_2$ separator 140 may comprise a temperature swing adsorption (TSA) separator, a pressure swing adsorption (PSA) separator, a membrane separator, or a combination of two or more thereof.

The separators 157 and 177 may comprise any separator suitable for separating liquid hydrocarbons, hydrocarbons and water from a mixture containing these materials. The separators may be microchannel separators or they may be conventional separators. The separators 157 and 177 may comprise high temperature and/or lower temperature vapor-liquid separators, or low pressure separators, or a combination of two or more of such separators.

In operation, a natural gas feed enters pre-reformer 120 as indicated by line 118. In pre-reformer 120 the natural gas feed is mixed with steam and undergoes a reaction wherein at least some of the higher molecular weight hydrocarbons (i.e., ethane and above) that may be in the natural gas feed are converted to methane. The product from the pre-reformer 120 flows into the SMR microchannel reactor 130 as the SMR feed. This is indicated by line 122. The SMR feed comprises a gaseous mixture which includes methane and steam.

In the SMR microchannel reactor 130, the SMR feed undergoes a steam methane reforming (SMR) reaction with the result being the formation of a first intermediate product comprising CO and $H_2$. This first intermediate product may be referred to as synthesis gas or syngas. The temperature within the SMR microchannel reactor 130 may be in the range from about 600° C. to about 1000° C., and in one embodiment from about 700° C. to about 950° C. The pressure within the SMR microchannel reactor may be in the range from about 5 to about 25 atmospheres, and in one embodiment from about 15 to about 20. The conversion of methane in the SMR microchannel reactor 130 may be in the range from about 10 to about 100%, and in one embodiment from about 60 to about 100%, and in one embodiment in the range from about 60 to about 90%. The selectivity to CO may be in the range from about 10 to about 90%, and in one embodiment in the range from about 30 to about 80%, and in one embodiment from about 40 to about 75%. The yield of CO in the SMR microchannel reactor 130 may be in the range from about 0.5 to about 1.5 moles of CO per mole of methane, and in one embodiment in the range from about 0.9 to about 1.2 moles of CO per mole of methane.

The first intermediate product flows from the SMR microchannel reactor 130 to the $H_2$ separator 140 as indicated by line 132. In the $H_2$ separator 140, part of the $H_2$ is separated from the first intermediate product and flows to or is recycled to the SMR microchannel reactor 130 as indicated by line 142. The remainder of the first intermediate product, which has a reduced $H_2$ concentration, comprises a second intermediate product which flows from the $H_2$ separator 140 to the Fischer-Tropsch microchannel reactor 150 as indicated by line 144. The amount of $H_2$ in the first intermediate product that is recycled to the SMR microchannel reactor 130 may be from about 5% to about 50% by volume of the $H_2$ in the first intermediate product, and in one embodiment from about 15% to about 50%, and in one embodiment from about 15% to about 35%, and in one embodiment from about 25% to about 35% by volume. Part of the $H_2$ separated from the first intermediate product may be split off from the $H_2$ flowing to the SMR microchannel reactor 130 as indicated by arrow 145. The $H_2$ that is split off may be used as a fuel for other utilities or as a chemical feedstock for other process operations, for example, hydrocracking, hydrotreating, hydrodesulfurization, catalyst regeneration, and the like.

The separated $H_2$ that is recycled to the SMR microchannel reactor 130 comprises an $H_2$ rich fuel. The $H_2$ rich fuel may comprise at least about 80% by volume $H_2$, and in one embodiment at least about 90% by volume $H_2$, and in one embodiment at least about 92% by volume $H_2$, and in one embodiment at least about 95% by volume $H_2$, and in one embodiment at least about 97% by volume $H_2$. The $H_2$ rich fuel flows in the combustion channels in the SMR microchannel reactor. Air, which in the embodiment illustrated in FIG. 2 is used as a source of oxygen, enters the staged addition channels of the SMR microchannel reactor 130 as indicated by line 133, and flows from the staged addition channels into the combustion channels. In the combustion channels the air contacts and mixes with the $H_2$ rich fuel. The resulting fuel-air mixture contacts one or more combustion catalysts in the combustion channels, undergoes a combustion reaction, and generates heat and a combustion exhaust. The combustion exhaust exits the SMR microchannel reactor 130, as indicated by line 134, flows through heat exchanger 135 where it may provide heat exchange with other process streams as indicated below, and flows out of heat exchanger 135 as indicated by line 136. The combustion exhaust comprises water or water vapor. A make-up line 143 may be used to add additional fuel to the $H_2$ rich fuel entering the SMR microchannel reactor. The make-up fuel may comprise $H_2$. The make-up fuel may comprise methane, natural gas, or a plant fuel gas mixture.

The second intermediate product, which comprises CO and $H_2$, flows from the hydrogen separator 140 to the first Fischer-Tropsch microchannel reactor 150 as indicated by line 144. In the Fischer-Tropsch microchannel reactor 150, the second intermediate product flows through the Fischer-Tropsch process microchannels, contacts one or more Fischer-Tropsch catalysts, and reacts to form a Fischer-Tropsch product comprising higher molecular weight hydrocarbons, water and a gaseous mixture comprising CO and $H_2$. The temperature within the Fischer-Tropsch microchannel reactor 150 may be in the range from about 180 to about 300° C., and in one embodiment from about 200 to about 260° C. The pressure may be in the range from about 10 to about 50 atmospheres, and in one embodiment from about 12 to about 18 atmospheres. The temperature at the entrance to the Fischer-Tropsch process microchannels may be within about 80° C. of the temperature at the exit from the Fischer-Tropsch process microchannels. The conversion of CO in the Fischer-Tropsch microchannel reactor 150 may be in the range from about 10 to about 99%, and in one embodiment in the range from about 50 to about 99%, and in one embodiment from about 50 to about 90%, and in one embodiment in the range from about 70 to about 85%, and in one embodiment about 80%. The selectivity to methane may be in the range up to about 25%, and in one embodiment in the range from about 1 to about 15%, and in one embodiment in the range from about 3 to about 15%. The yield of Fischer-Tropsch product may be in the range from about 0.02 to about 0.2 moles of Fischer-Tropsch product per mole of CO feed, and in one embodiment from about 0.04 to about 0.1 moles of Fischer-Tropsch Tropsch product per mole of CO feed. The Fischer-Tropsch product is separated from the water and gaseous mixture in separator 157. The Fischer-Tropsch product is shown in the drawings as "FT Product." The process water flows out of separator 157 as indicated by line 113. The process water may be discarded or recycled to the saturator 110 as indicated by line 115 (see, FIGS. 3-9). The separated gaseous mixture may be referred to as a third intermediate product.

The third intermediate product flows from separator 157 to compressor 160 as indicated by line 161. The third intermediate product is compressed in compressor 160 and flows to the second Fischer-Tropsch microchannel reactor 170 as indicated by line 162. In the alternative, the compressor 160 may be positioned in line 132 and used for compressing the first intermediate product flowing from the SMR microchannel reactor 130. Alternatively, the compressor 160 may be positioned in line 116 and used to compress the tail gas flowing from the separator 177 to the saturator 110 (see, FIGS. 4-9).

In the second Fischer-Tropsch microchannel reactor 170, the third intermediate product flows through the Fischer-Tropsch process microchannels, contacts one or more Fischer-Tropsch catalysts, and reacts to form a second Fischer-Tropsch product comprising one or more higher molecular weight hydrocarbons, as well as process water and tail gas. The temperature within the Fischer-Tropsch microchannel reactor 170 may be in the range from about 180 to about 300° C., and in one embodiment from about 200 to about 260° C. The pressure may be in the range from about 10 to about 50 atmospheres, and in one embodiment from about 22 to about 26 atmospheres. The temperature at the entrance to the Fischer-Tropsch microchannels may be within about 80° C. of the temperature at the exit from the Fischer-Tropsch microchannels. The conversion of CO in the Fischer-Tropsch microchannel reactor 170 may be in the range from about 10 to about 90%, and in one embodiment in the range from about 30 to about 90%, and in one embodiment from about 40 to about 70%, and in one embodiment about 80%. The overall conversion of CO in both Fischer-Tropsch microchannel reactors 150 and 170 may be in the range from about 50% to about 99%. When both the Fischer-Tropsch microchannel reactors 150 and 170 are operated at 80% conversion, the overall conversion of both reactors may be 96%. The selectivity to methane may be in the range up to about 25%, and in one embodiment up to about 15%, and in one embodiment in the range from about 3 to about 15%, and in one embodiment in the range from about 5 to about 10%. The yield of Fischer-Tropsch product may be in the range from about 0.02 to about 0.3 mole of Fischer-Tropsch product per mole of CO feed, and in one embodiment from about 0.1 to about 0.2 mole of Fischer-Tropsch product per mole of CO feed. The product mixture flows from Fischer-Tropsch microchannel reactor 170 to separator 177 as indicated by arrow 172 wherein the Fischer-Tropsch product, identified in the drawings as "FT Product," is separated from the process water and tail gas.

The tail gas may have calorific heating value and may be burned in a combustion system to recover the energy and avoid or minimize hydrocarbon emissions. The tail gas may be discarded, recycled to a plant fuel gas system, or recycled to the saturator 110 as indicated by line 116 (see, FIGS. 4-9). Part of the tail gas may be separated from the recycle line as indicated by line 117, and used as a fuel for operating utilities and the like outside the process (see, FIGS. 4-9). An added benefit of the $N_2$ Separation step illustrated in FIG. 9 is that the $N_2$ concentration in the tail gas stream may be reduced (relative to the concentration without any $N_2$ separation) and may result in decreased NOx emissions from any combustion system using the tail gas. The $N_2$ concentration in the tail gas may be reduced by about 50% to about 90% by volume per pass through the $N_2$ Separator.

The process water may be discarded or recycled to the saturator 110 as indicated by line 115 (see, FIGS. 3-9).

The Fischer-Tropsch reactions conducted in the Fischer-Tropsch microchannel reactors 150 and 170 are exothermic reactions. These reactions are cooled by a heat exchange fluid flowing in the heat exchange channels in the Fischer-Tropsch microchannel reactors. The heat exchange fluid identified in FIG. 2 is water. The heat exchange fluid may be vaporized or partially vaporized in the heat exchange channels. The water used as the heat exchange fluid in the Fischer-Tropsch microchannel reactors 150 and 170 may be partially vaporized to form a mixture of steam and water. This is shown in FIG. 2 wherein water flows into Fischer-Tropsch microchannel reactor 150 as indicated by line 151. The water flows through the heat exchange channels in Fischer-Tropsch microchannel reactor 150, absorbs heat from the Fischer-Tropsch microchannels, and is converted to a mixture of steam and water in the heat exchange channels. The mixture of steam and water (shown as "Steam" in the drawings) flows out of the Fischer-Tropsch microchannel reactor 150 as indicated by line 152. Similarly, water enters Fischer-Tropsch microchannel reactor 170, as indicated by line 153, flows through the heat exchange channels in Fischer-Tropsch microchannel reactor 170, absorbs heat from the Fischer-Tropsch microchannels, is converted to a mixture of steam and water in the heat exchange channels, and flows out of the Fischer-Tropsch microchannel reactor 170 as indicated by line 154. Part of the steam or part of the steam and water mixture may flow to the pre-reformer 120 (FIGS. 2-4), the integrated SMR microchannel reactor 130A (FIG. 5), or the SMR microchannel reactor 130 (FIGS. 6-9) as indicated by line 155. Part of the steam or part of the steam and water mixture may be diverted from the process as indicated by line 156 and used for operating utilities and the like outside the process. Steam generated from the Fischer-Tropsch microchannel reactors may be integrated into a plant utility steam system to provide flexibility and economy to the operation of the inventive process as well as other processes that may be operated in the same plant. The plant utility steam system may allow the Fischer-Tropsch generated steam to be used in an economical manner and provide steam needed for startup and SMR operation if the Fischer-Tropsch generated steam becomes unavailable.

The process illustrated in FIG. 3 is similar to the process shown in FIG. 2. The process illustrated in FIG. 3 includes saturator 110 and the recirculation of process water from the Fischer-Tropsch microchannel reactors 150 and 170 to the saturator as indicated by line 115. The saturator 110 may comprise any vessel capable of receiving and mixing the natural gas feed and process water. Natural gas feed is combined with the recirculated process water in the saturator 110. This embodiment of the process may provide the advantage of eliminating the requirement for treating processes water produced in the Fischer-Tropsch microchannel reactors 150 and 170 to remove dissolved organics. The saturator 110 may be used for mixing the natural gas feed and process water with the tail gas (see, FIGS. 4-9). The saturator 110 may be a pressurizable vessel. The temperature within the saturator 110 may be in the range from 50 to about 400° C., and in one embodiment from about 50 to about 300° C., and in one embodiment from about 50 to about 250° C., and in one embodiment from about 140 to about 180° C. The pressure within the saturator 110 may be in the range from about 1 to about 50 atmospheres, and in one embodiment in the range from about 10 to about 30 atmospheres.

Figure 4:
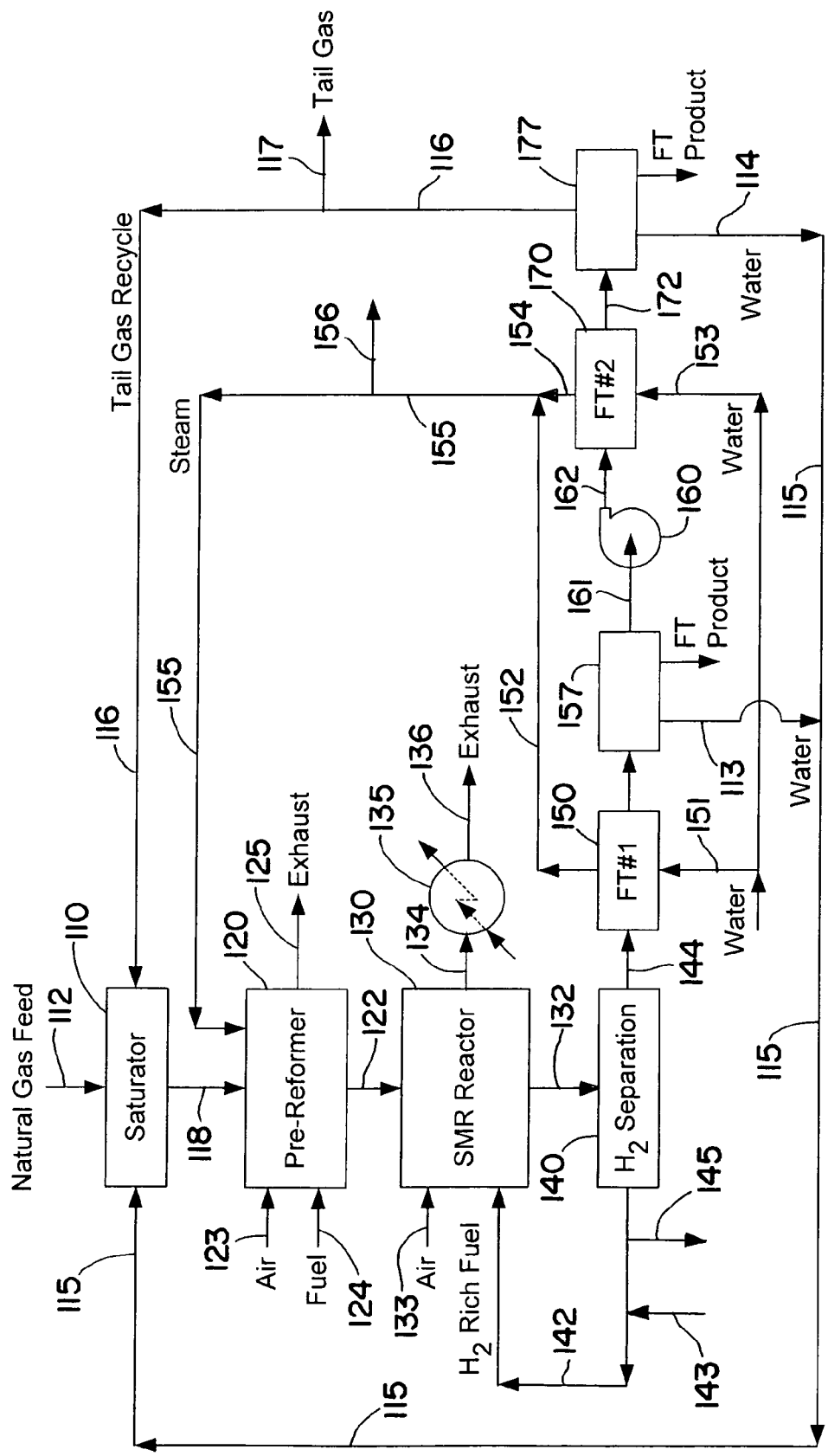
FIG. 4 is a flow sheet of a process similar to the process shown in FIG. 3. The process illustrated in FIG. 4 includes recycling tail gas from the second Fischer-Tropsch microchannel reactor to the saturator. In this embodiment, carbon utilization may be enhanced.

The process illustrated in FIG. 4 is similar to the process shown in FIG. 3. The process illustrated in FIG. 4 includes recycling tail gas from the separator 177 to the saturator 110 as indicated by line 116. Part of the tail gas may be diverted from the process as indicated by line 117 and used to operate utilities and the like outside the process. In this embodiment, carbon utilization may be enhanced as a result of recycling the tail gas to the saturator 110.

Figure 5:
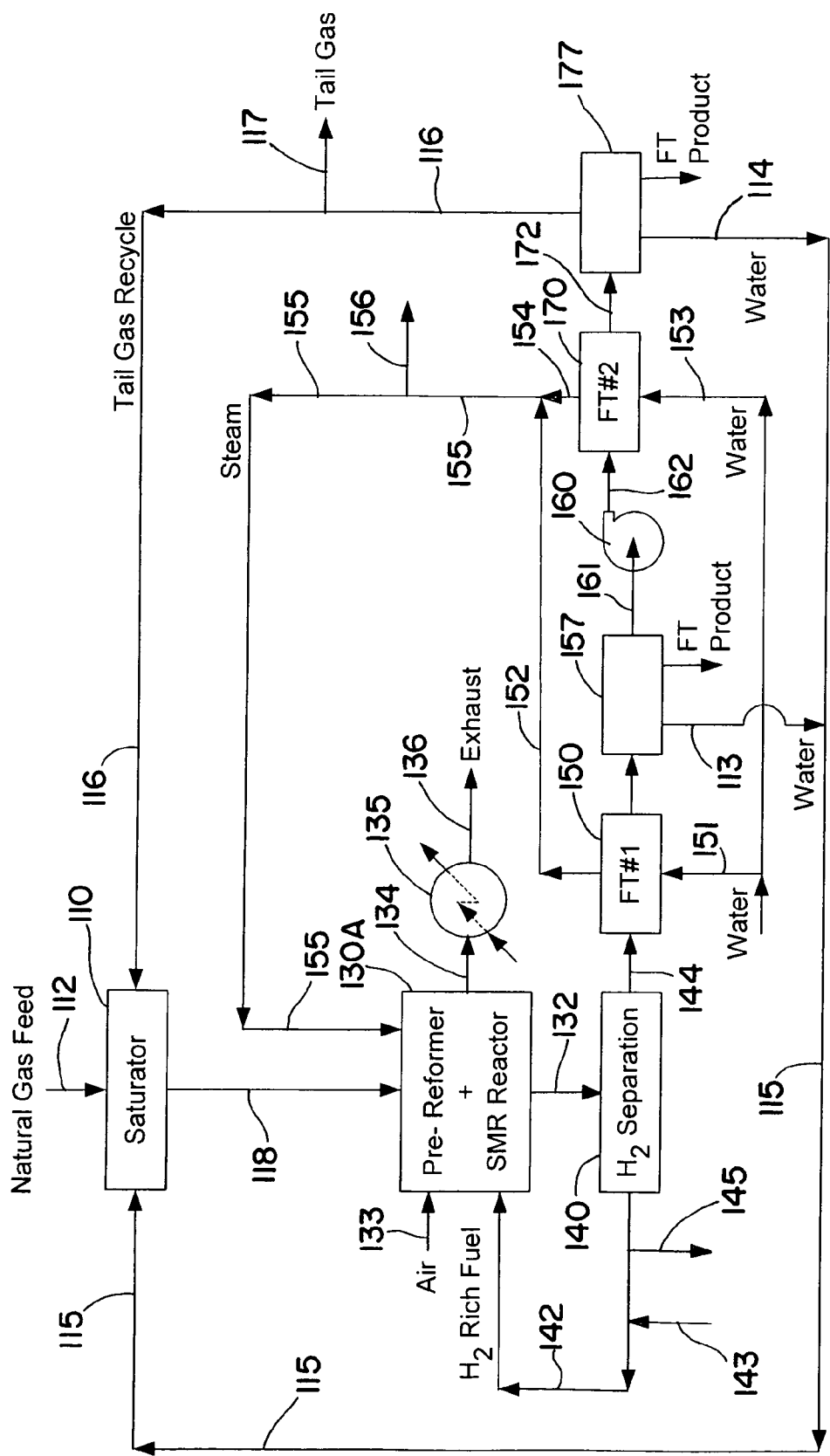
FIG. 5 is a flow sheet of a process similar to the process shown in FIG. 4. The process illustrated in FIG. 5 provides for the pre-reformer being integrated with the SMR microchannel reactor. This embodiment may provide the advantage of improved thermal efficiency and the reduction in capital costs as a result of the elimination of a separate pre-reformer.

The process illustrated in FIG. 5 is similar to the process illustrated in FIG. 4 with the exception that the pre-reformer 120 and SMR microchannel reactor 130 in FIG. 4 are integrated together in FIG. 5 as pre-reformer and SMR microchannel reactor 130A. The pre-reformer and SMR microchannel reactor 130A is the same as the combination of pre-reformer 120 and SMR microchannel reactor 130 except that with the pre-reformer and the SMR microchannel reactor 130A the pre-reformer and SMR microchannel reactor are combined in a manner to allow for the heat required for operating the pre-reformer to be provided by the combustion reaction conducted in the combustion channels in the SMR microchannel reactor.

Figure 6:
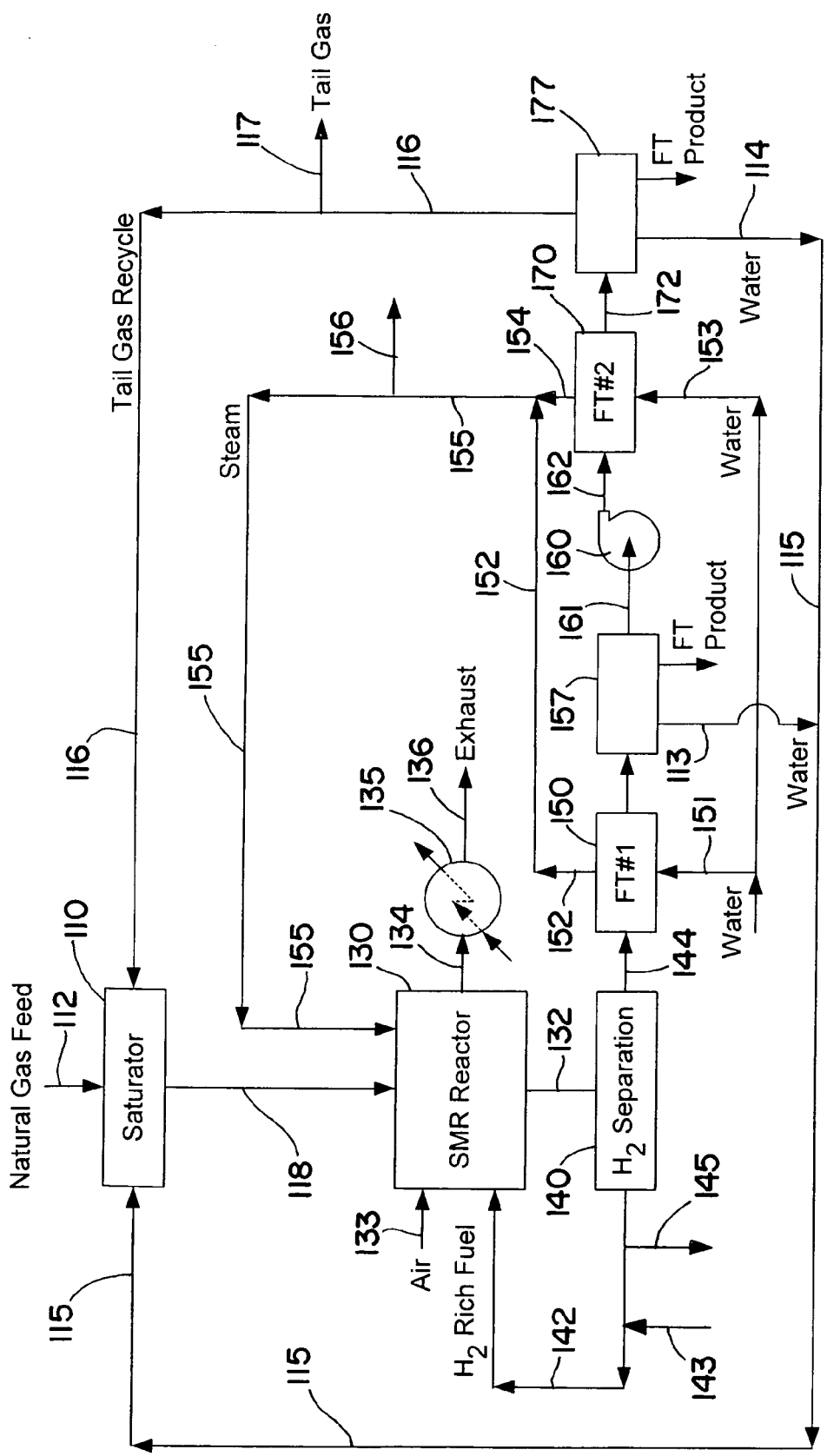
FIG. 6 is a flow sheet of a process similar to the process shown in FIG. 5 with the exception that the process illustrated in FIG. 6 provides for the elimination of a separate pre-reformer. This process may provide the advantage of enhancing thermal efficiency, simplifying the system and reducing capital costs. Pre-reforming of the SMR feed may be conducted in the SMR process microchannels wherein the SMR feed may be processed at a first temperature in a first part of the process microchannels and then at a second higher temperature in a second part of the SMR process microchannels, the second part being downstream of the first part.

The process illustrated in FIG. 6 is the same as the process illustrated in FIG. 5 with the exception that both pre-reforming and steam methane reforming are conducted in the SMR microchannel reactor 130. In this embodiment, the SMR microchannel reactor 130 is constructed and operated in such a manner that the higher molecular weight hydrocarbons, if present, are converted to methane, and then the methane undergoes steam methane reforming in the SMR process microchannel. The SMR process microchannels may employ tailored thermal profiles to provide a lower operating temperature in the SMR process microchannels in a first part of the SMR process microchannels to effect conversion of the higher molecular weight hydrocarbons to methane, and a higher operating temperature in a second part of the SMR process microchannels downstream of the first part of the SMR process microchannels. The temperature in the first part of the SMR process microchannels may be in the range from about 150° C. to about 400° C., and in one embodiment in the range from about 250 to about 350° C. The first part of the SMR process microchannels may comprise from about 1 to about 40% of the overall length of the SMR process microchannels, and in one embodiment from about 10 to about 25% of the overall length. The temperature in the SMR process microchannels in the second part of the SMR process microchannels downstream of the first part may be in a range sufficient to effect steam methane reforming. This temperature may be in the range from about 600° C. to about 1000° C., and in one embodiment from about 700 to about 950° C.

Figure 7:
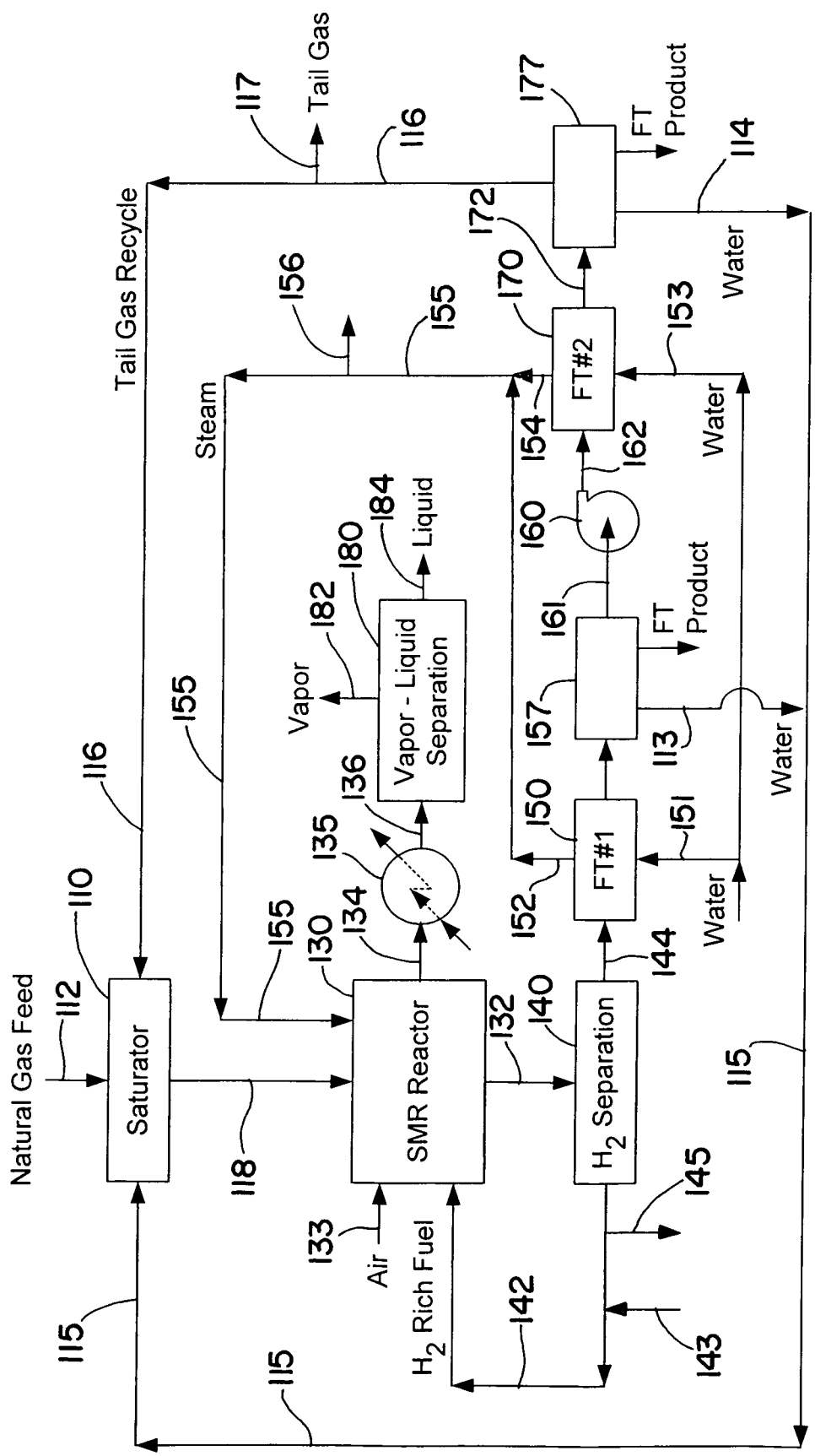
FIG. 7 is a flow sheet of a process similar to the process shown in FIG. 6. The process illustrated in FIG. 7 includes dividing the combustion exhaust into a liquid and a vapor. The liquid may comprise water. This embodiment may provide the advantage of reducing or eliminating the need for fresh water feed to the process.

The process illustrated in FIG. 7 is similar to the process illustrated in FIG. 6 with the exception that the process illustrated in FIG. 7 includes vapor-liquid separator 180. Vapor-liquid separator 180 may be used to treat the combustion exhaust after it flows through heat exchanger 135. The combustion exhaust flows from heat exchanger 135 to vapor-liquid separator 180 as indicated by line 136. In the vapor-liquid separator 180, the combustion exhaust is separated into a vapor stream as indicated by line 182 and a liquid stream as indicated by line 184. The liquid stream may comprise water which may be recycled to the saturator 110 or alternatively used as makeup for boiler feed water or other utility needs. This may provide the advantage of reducing or eliminating the requirement for fresh water feed for the process.

Figure 8:
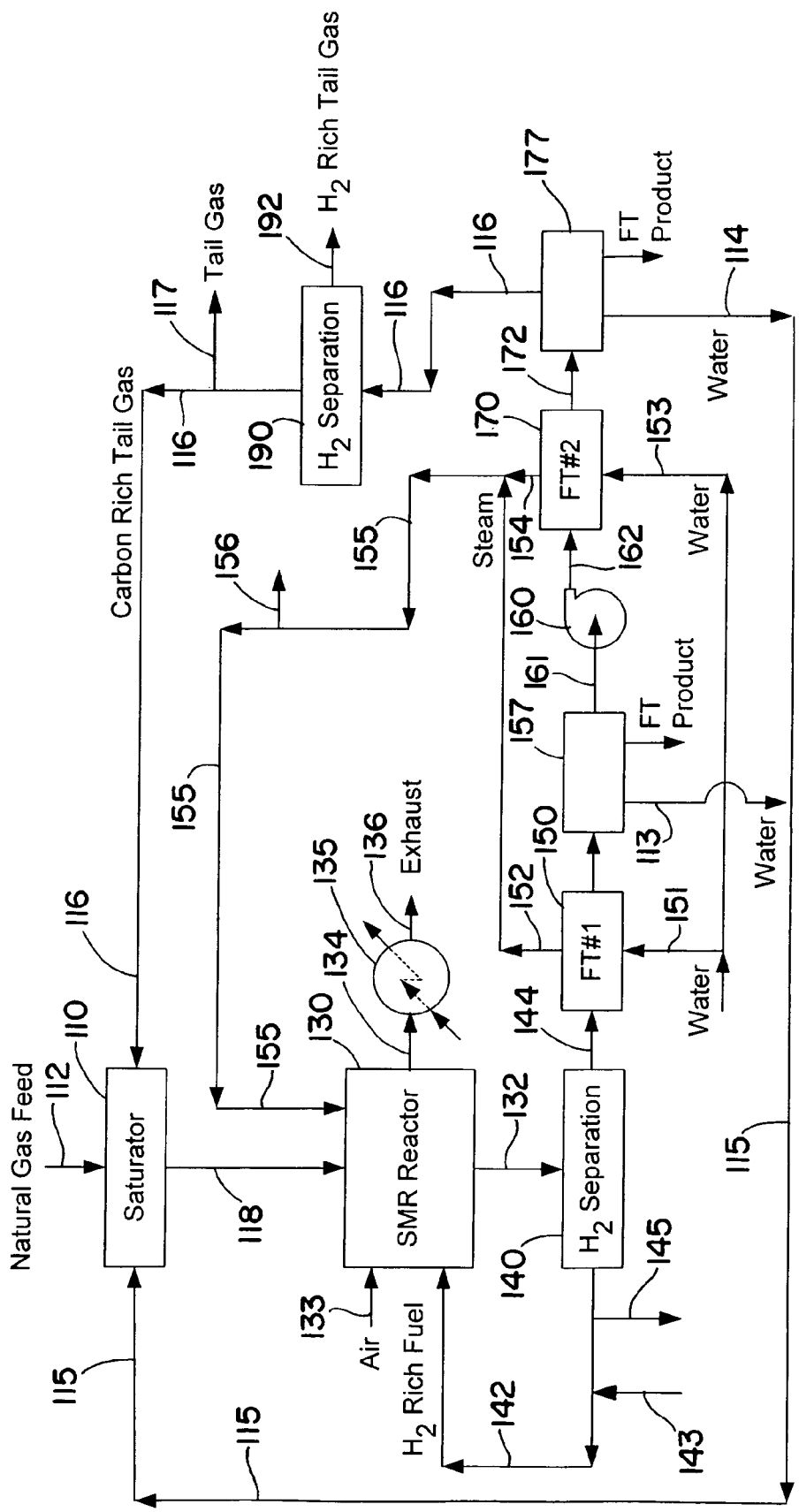
FIG. 8 is a flow sheet of a process similar to the process shown in FIG. 6. The process illustrated in FIG. 8 includes dividing the tail gas into a carbon rich tail gas and an $H_2$ rich tail gas. This embodiment may provide the advantage of operating the process with very low CO and $CO_2$ emissions.
Figure 9:
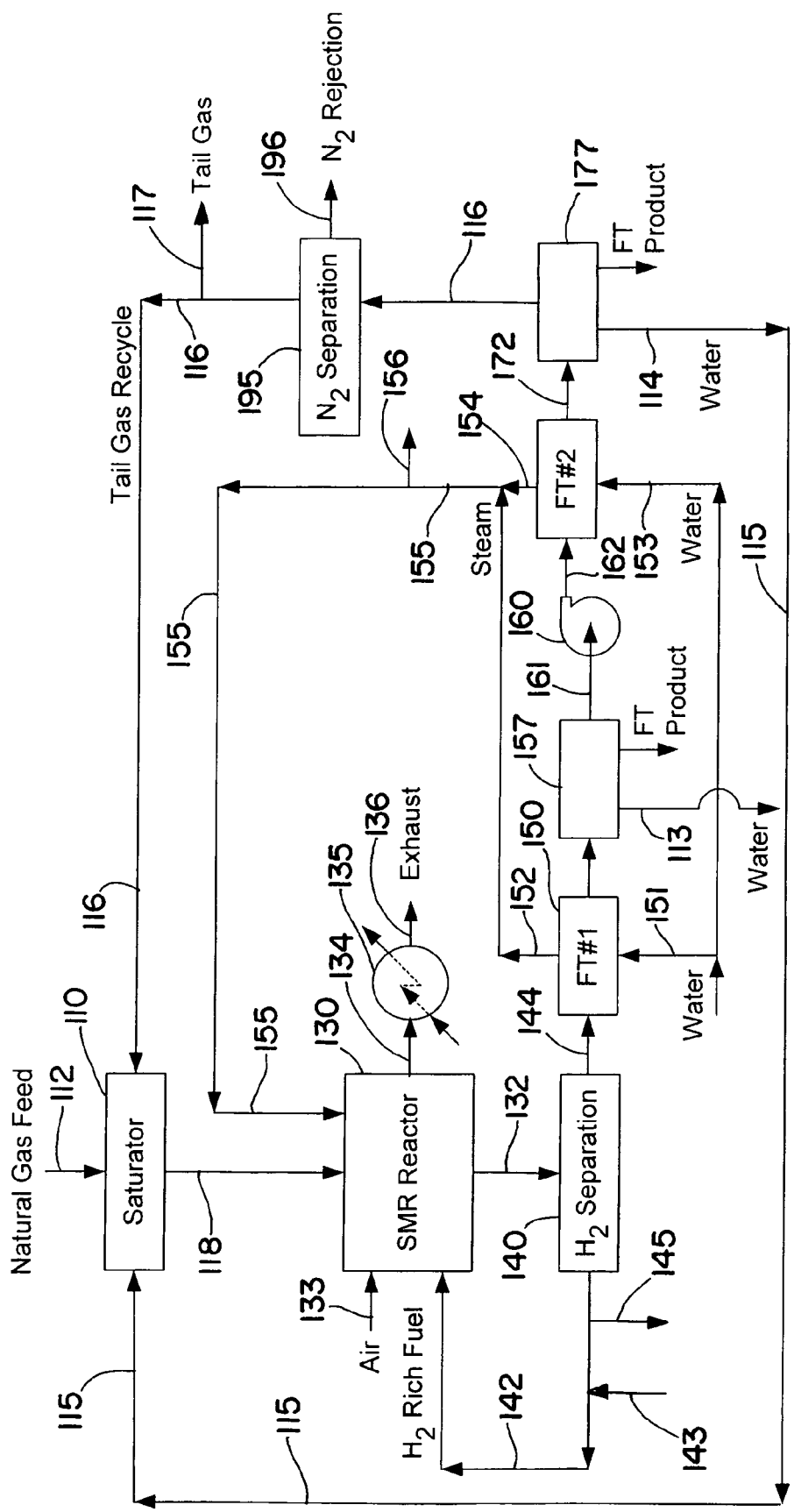
FIG. 9 is a flow sheet illustrating a process similar to the process shown in FIG. 6. The process illustrated in FIG. 9 includes separating $N_2$ from the tail gas. This embodiment may provide the advantage of operating the process with ultra low $NO_x$ emissions.

The process illustrated in FIG. 8 is similar to the process illustrated in FIG. 6 with the exception that the process illustrated in FIG. 4 includes $H_2$ separator 190. The tail gas flows from the separator 177 to the $H_2$ separator 190 as indicated by line 116. In the $H_2$ separator 190 the tail gas is divided into an $H_2$ rich tail gas and a carbon rich tail gas. The $H_2$ rich tail rich gas flows out of the $H_2$ separator 190 as indicated by line 192. The $H_2$ rich tail gas may be used as a fuel for utilities and the like outside the process or as fuel make-up for the SMR microchannel reactor 130. The $H_2$ rich tail gas may be recycled to the SMR microchannel reactor 130 or used as fuel make-up for the SMR microchannel reactor 130. $H_2$ from the $H_2$ rich tail gas may be used as a chemical feedstock for other process operations, for example, hydrocracking, hydrotreating, hydrodesulfurization, catalyst regeneration, and the like. The carbon rich tail gas flows to or is recycled to saturator 110 as indicated by line 194 or may flow or is recycled to the SMR microchannel reactor 130 when the saturator 110 is not used. The separation that is conducted in the $H_2$ separator 190 may be conducted using temperature swing adsorption (TSA), pressure swing adsorption (PSA), membranes, or a combination of two or more thereof. This may provide the advantage of operating the process at ultra low levels of CO and $CO_2$ emissions.

The process illustrated in FIG. 9 is the same as the process illustrated in FIG. 6 with the exception that the tail gas undergoes an $N_2$ rejection process. The tail gas flows out of the separator 177 as indicated by line 116 to $N_2$ rejecter 195. In the $N_2$ rejecter 195, $N_2$ is separated from the tail gas as indicated by line 196. The tail gas then flows to or is recycled to the saturator 110 as indicated by line 116 or may flow or is recycled to the SMR microchannel reactor 130 when the saturator 110 is not used. Part of the tail gas can be separated from the tail gas recycle as indicated by line 117 and used as a fuel for operating utilities and the like outside the process or as a fuel make-up for the SMR microchannel reactor 130. The $N_2$ rejection process may be conducted using temperature swing adsorption, pressure swing adsorption, membranes, or a combination of two or more thereof. This may provide the advantage of operating the process with ultra low levels of NOx emissions.

Although not shown in the drawings, in one embodiment, both $H_2$ and $N_2$ may be separated from the tail gas in line 116. This may be accomplished using temperature swing adsorption, pressure swing adsorption, membranes, or a combination of two or more thereof. The $H_2$ separator may be followed by $N_2$ separation, or vice versa. The $H_2$ separator and $N_2$ separator may be integrated together. This may provide the advantage of a process that emits ultra low levels of CO, $CO_2$ and NOx emissions.

In one embodiment, the following sequence may be used for start up of the inventive process:

(1) The SMR catalyst in the SMR microchannel reactor 130 is activated by heating the catalyst at a rate of 50° C. per hour to 450° C. and flowing 10% by volume $H_2$ in $N_2$ in contact with the catalyst.

(2) The feed of natural gas to the saturator 110 is commenced. The SMR microchannel reactor 130 is pressurized using high pressure nitrogen. Natural gas is used as fuel for the SMR microchannel reactor 130 until the reactor is ready for use. The flow of steam and natural gas to the SMR microchannel reactor 130 is commenced.

(3) Catalytic combustion using dilute $H_2$ fuel is commenced and heating is continued at a rate of 50° C. per hour. Product flowing from the SMR microchannel reactor 130 is diverted to a boiler where it is used as a fuel until partial conversion to the first intermediate product (i.e., synthesis gas) is established.

(4) $H_2$ separation in the $H_2$ separator 140 is commenced. Heating of the SMR microchannel reactor 130 at 50° C. per hour is continued. $H_2$ is separated in the $H_2$ separator. The separated $H_2$ provides $H_2$ for combustion in the combustion channels and Fischer-Tropsch catalyst activation.

(5) The Fischer-Tropsch catalysts in the Fischer-Tropsch microchannel reactors 150 and 170 are activated with $H_2$ at 400° C. The temperature of the Fischer-Tropsch catalyst is reduced to 230° C. Heating of the SMR microchannel reactor is continued at a rate of 50° C. per hour until a temperature of 850° C. is achieved.

(6) The operation of the Fischer-Tropsch microchannel reactors 150 and 170 at 230° C. is commenced. The cooling water is circulated. Fischer-Tropsch product is taken from the Fischer-Tropsch reactors 150 and 170 and is available for upgrading. The tail gas is used as a fuel until the SMR microchannel reactor 130 achieves an operating temperature of 850° C.

(7) The process is stabilized by starting the flow of the tail gas recycle to the saturator 110. The SMR microchannel reactor 130 is at a temperature of 850° C. The steam to carbon ratio is 3.0.

(8) The temperature of the SMR microchannel reactor is increased to 900° C. The steam to carbon ratio is reduced to the standard operating condition such as 1.5. The flow rates are set at the desired levels.

Figure 10:
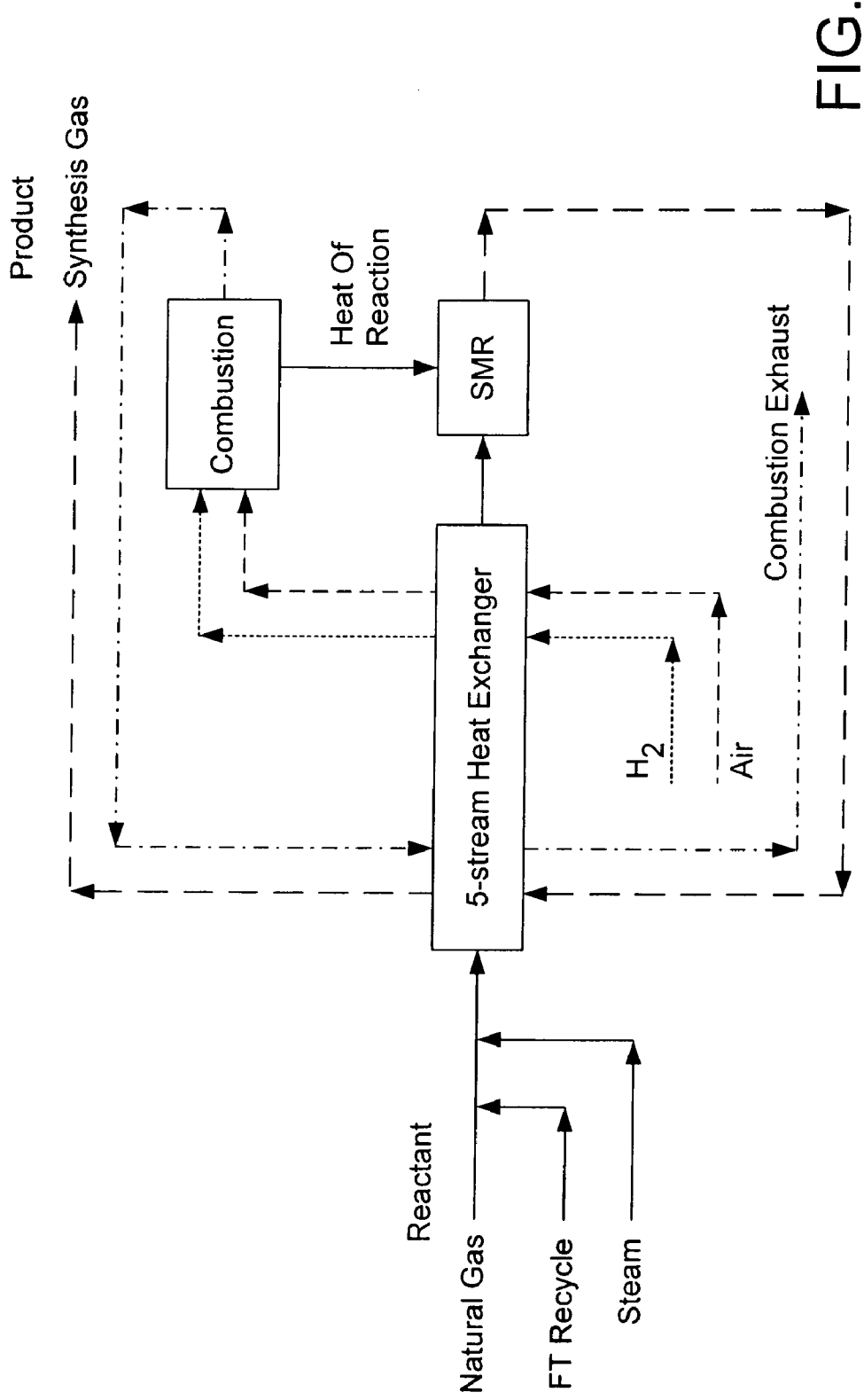
FIG. 10 is a flow sheet showing the flow of fluids for the SMR microchannel reactor. A five-stream heat exchanger is provided which is used for exchanging heat between the SMR feed and first intermediate product, and between the $H_2$ and the oxygen or source of oxygen of the combustion reaction mixture and the combustion exhaust.
Figure 11:
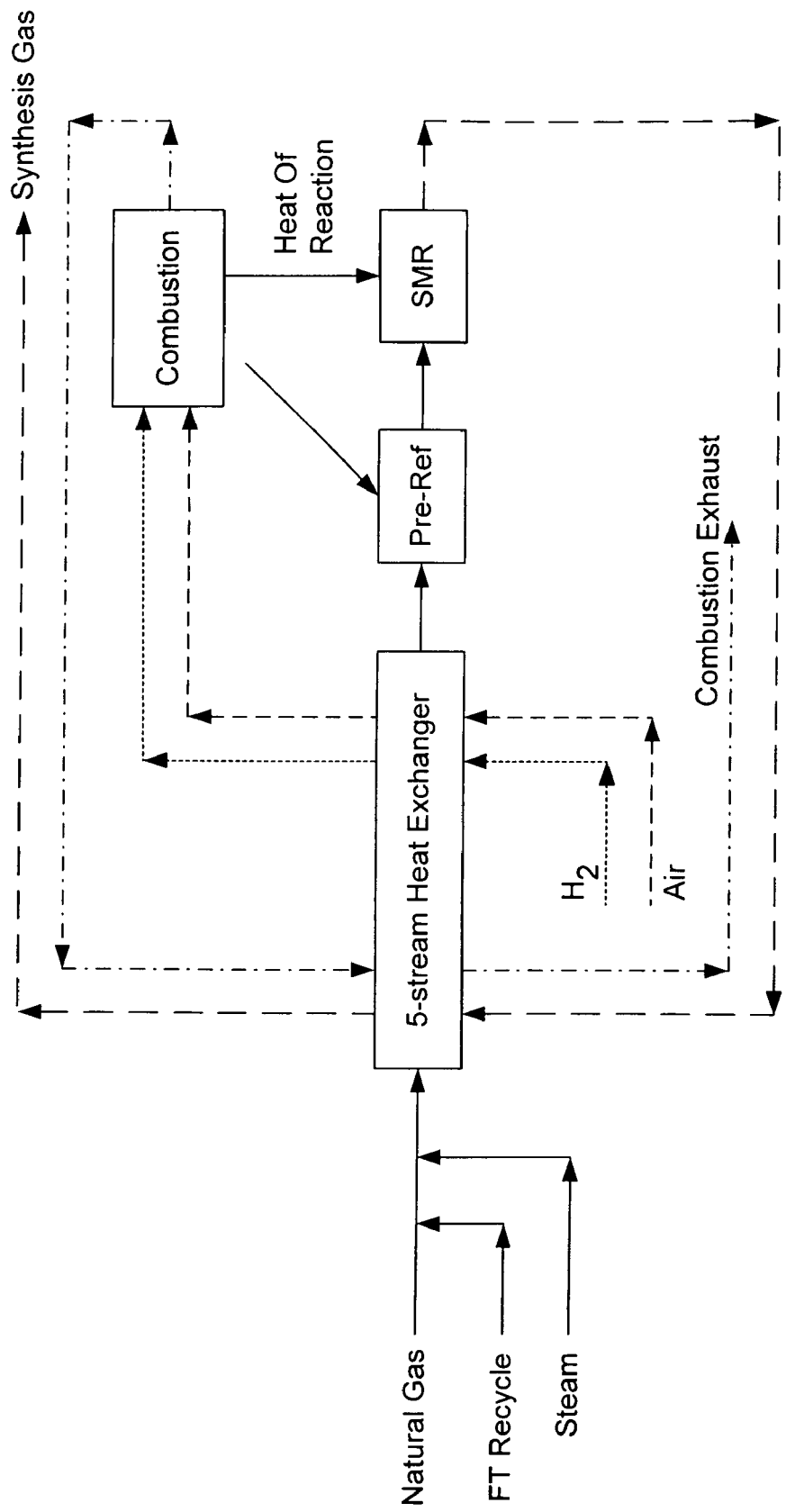
FIG. 11 is a flow sheet that is similar to the flow sheet provided in FIG. 10 with the exception that the flow sheet illustrated in FIG. 11 shows a pre-reformer integrated with the SMR microchannel reactor. The pre-reformer is identified in FIG. 11 as "Pre-Ref."

The efficiency of the inventive process may be enhanced by using one or more multi-stream heat exchangers to exchange heat between the process fluids and heat exchange fluids. This is shown in FIGS. 10 and 11 wherein a five-stream heat exchanger is illustrated. This heat exchanger provides for the exchange of heat between the SMR feed stream and first intermediate product stream, and between the $H_2$ stream and the oxygen or source of oxygen stream flowing to the SMR microchannel reactor 130 and the combustion exhaust. The process illustrated in FIG. 11 is distinguishable from the process illustrated in FIG. 10 in that the process illustrated in FIG. 11 relates to using a pre-reformer integrated with the SMR microchannel reactor wherein the pre-reformer is heated using heat from the combustion channels in the SMR microchannel reactor. The five-stream heat exchanger may be a microchannel heat exchanger.

Figure 36:
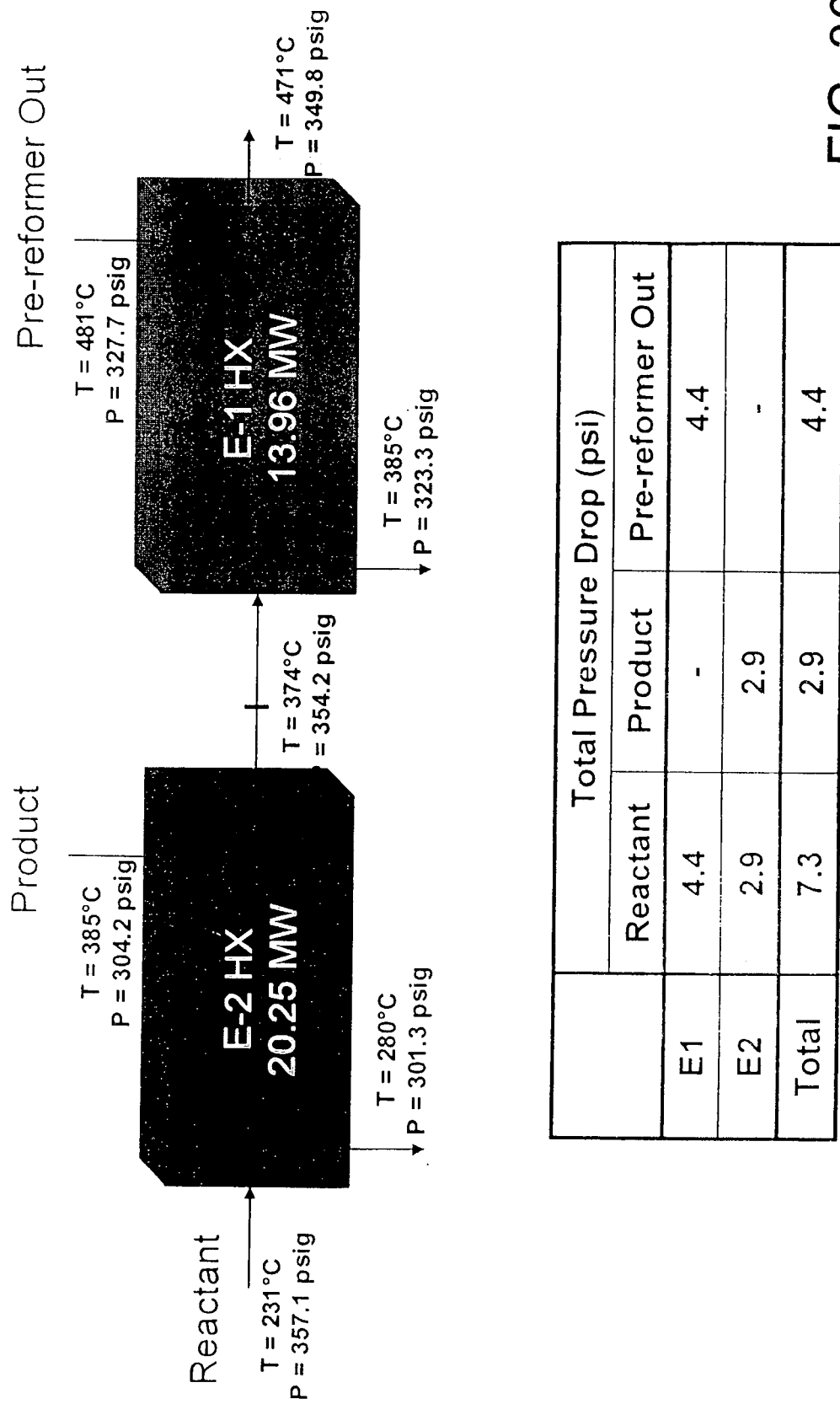
FIGS. 36-38 illustrate a multi-stream microchannel heat exchanger that may be used with the SMR microchannel reactor used in the inventive process.
Figure 37:
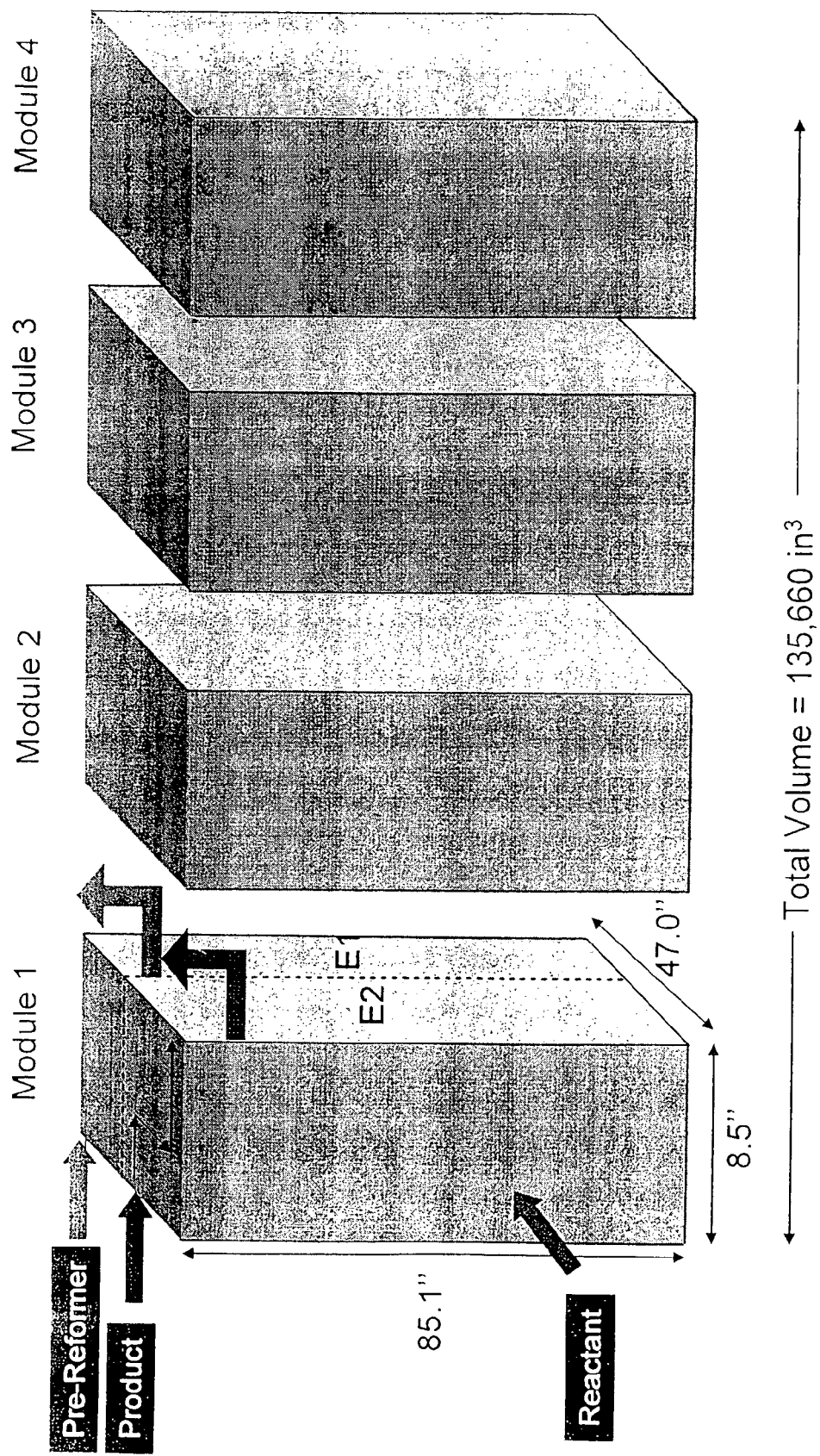
Figure 38:
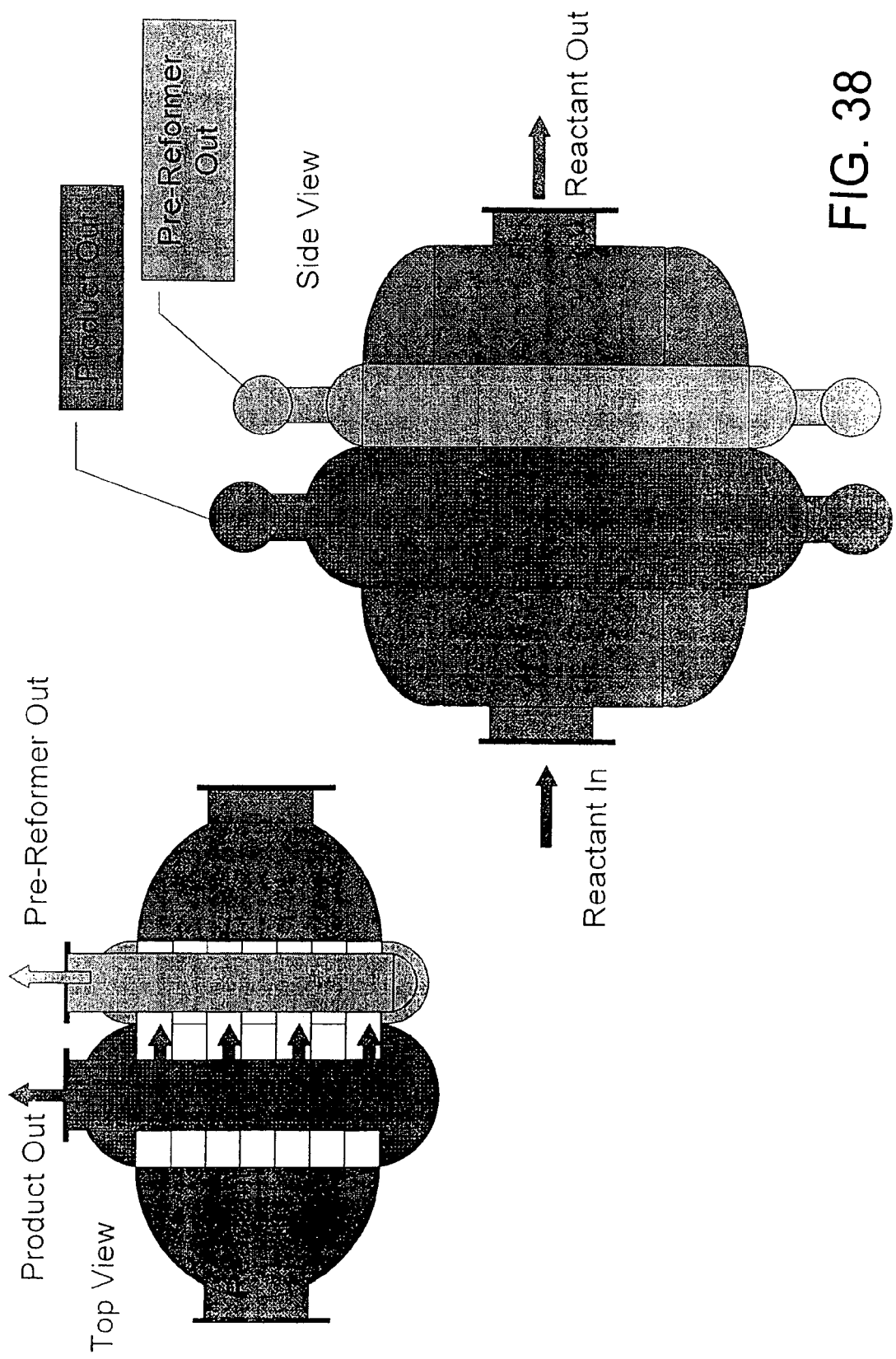

A multi-stream heat exchanger for exchanging heat between the SMR feed (Reactant), the first intermediate product (Product), produced in the SMR microchannel reactor 130 is shown in FIGS. 36-38. In this embodiment, the Pre-reformer Out stream applies to a discrete (not integrated) pre-reformer, i.e., pre-reformer 120. This compact heat exchanger may be equivalent to about 17 conventional shell and tube heat exchangers in heat exchange capacity while providing significant advantages in space (volume), weight and piping requirements. Each module shown in FIG. 37 has the dimensions of 8.5×47.0×85.1 inches (21.6×19.4×216.2 cm). The total volume for the four modules illustrated in FIG. 42 is 135,660 cubic inches ($2.223 \times 10^6$ $cm^3$). The heat exchange assembly shown in FIG. 38 may have the dimensions of 8×10×10 feet (2.44×3.05×3.05 meters).

Examples of multi-stream microchannel heat exchangers that may be used are disclosed in PCT International Application Publication No. WO 2004/016347 A2, which is incorporated herein by reference.

Figure 23:
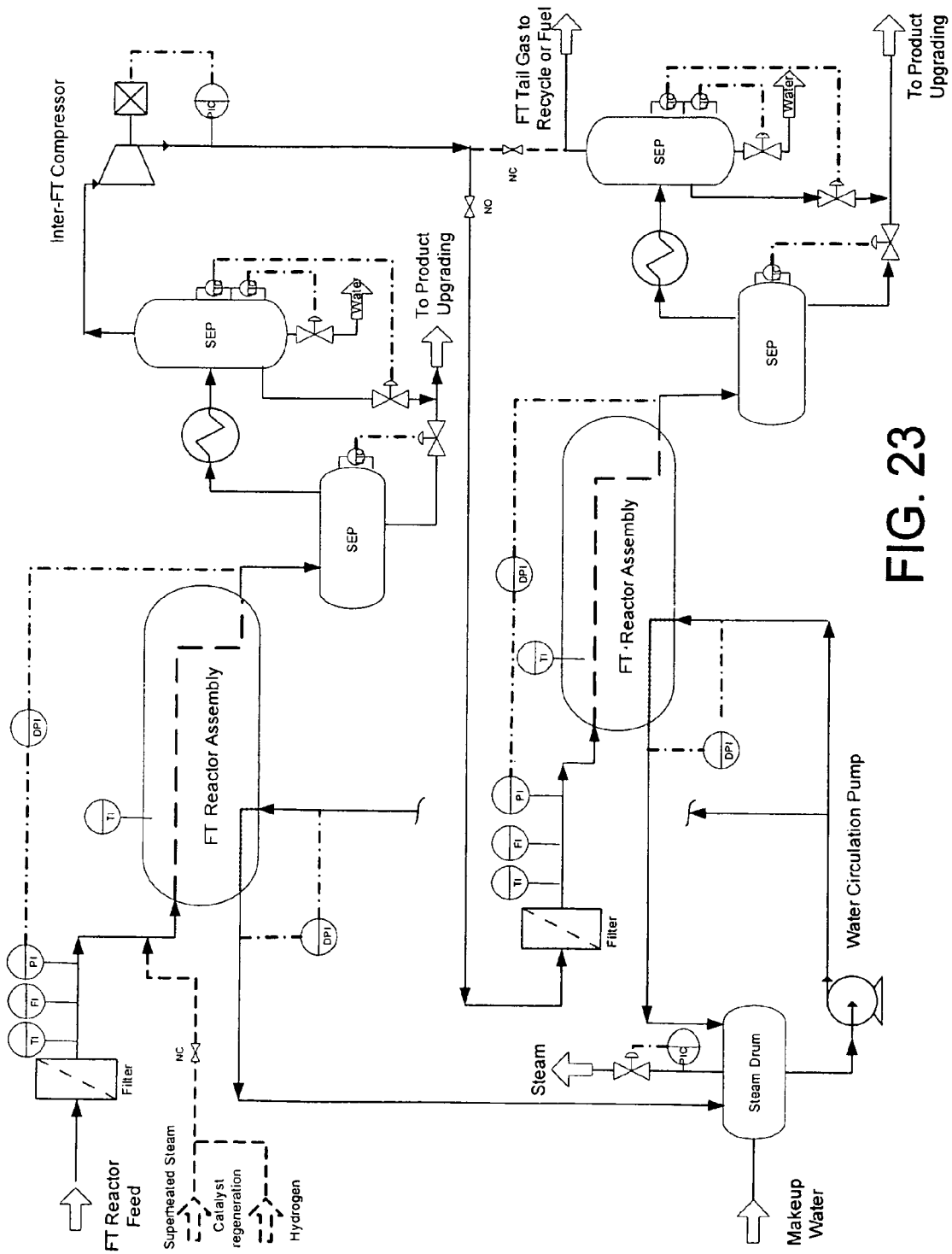
FIG. 23 is a flow sheet showing the flow of process fluids to and from the first Fischer-Tropsch microchannel reactor and the second Fischer-Tropsch microchannel reactor. The FT Reactor Assemblies illustrated in FIG. 23 are identified in the flow sheets illustrated in FIGS. 2-9 as FT #1 and FT #2.

The operation of the Fischer-Tropsch microchannel reactors 150 and 170 in combination with the compressor 160 and separators 157 and 177 is shown in greater detail in FIG. 23. FIG. 23 is a flow sheet showing pumps, filters, vessels, valves and controls for operating the Fischer-Tropsch microchannel reactors 150 and 170, compressor 160 and separators 157 and 177.

The natural gas feed may be taken from any source. The natural gas feed may comprise from about 25 to about 99% by volume methane, and in one embodiment about 40 to about 99% by volume methane, and in one embodiment from about 65% to about 99% by volume methane, and in one embodiment from about 90 to about 99% by volume methane. The natural gas feed may further comprise higher molecular weight gaseous hydrocarbons, for example, hydrocarbons of 2 to about 5 carbon atoms. The concentration of these higher molecular weight gaseous hydrocarbons in the natural gas feed may be in the range up to about 20% by volume, and in one embodiment in the range from about 1 to about 20% by volume, and in one embodiment from about 2 to about 10% by volume. The natural gas feed may contain $N_2$ at concentrations up to about 20% by volume, and in one embodiment in the range from about 0.1 to about 5% by volume. The natural gas feed may contain other components, including $CO_2$, CO, water vapor, natural gas liquids, oxygen and hydrogen, at concentrations up to about 40% by volume. The concentration of $CO_2$ may be in the range from about 0.1 to about 40% by volume.

The natural gas feed may contain sulfur which can be removed upstream of the inventive process using hydro desulfurization. The natural gas feed stream may be passed through a catalyst bed to convert organic sulfur containing compounds in the natural gas to $H_2S$. A natural gas stream containing the $H_2S$ may then be passed through a zinc oxide bed that absorbs the $H_2S$.

The feed stream flowing out of the saturator 110 as indicated by line 118 (FIGS. 3-9) may have a methane concentration in the range from about 1 to about 90% by volume, and in one embodiment from about 15 to about 50% by volume, and in one embodiment in the range from about 20 to about 30% by volume. The concentration of steam may be in the range from about 1 to about 99% by volume, and in one embodiment from about 10 to about 90% by volume, and in one embodiment in the range from about 20 to about 70% by volume. This feed stream may contain higher molecular weight hydrocarbons, for example, hydrocarbons of 2 to about 5 carbon atoms. The concentration of the higher molecular weight hydrocarbons in the feed may be in the range from about 0.1 to about 20% by volume, and in one embodiment in the range from about 0.5 to about 5% by volume. The feed may include $CO_2$ at a concentration in the range up to about 40% by volume, and in one embodiment in the range from about 0.1 to about 15% by volume. The feed may include additional components, for example, $N_2$, $O_2$ and CO. The concentration of these additional components may be in the range up to about 20% by volume, and in one embodiment in the range from about 0.1 to about 5% by volume. The mole ratio of methane to steam may be in the range from about 1 to about 4, and in one embodiment from about 1 to about 3, and in one embodiment in the range about 1.5 to about 2.5. The temperature of this stream may be in the range from about 50 to about 400° C., and in one embodiment in the range from about 150 to about 300° C. This feed stream may be at a pressure in the range from about 1 to about 50 atmospheres, and in one embodiment in the range from about 10 to about 30 atmospheres. This feed stream may be referred to as the SMR feed for the embodiments illustrated in FIGS. 5-9 wherein the feed stream flows from the saturator 110 to the SMR microchannel reactor 130.

The SMR feed flowing from the pre-reformer 120 to the SMR microchannel reactor 130 as indicated by line 122 (FIGS. 2-4) may have a concentration of methane in the range from about 1 to about 90% by volume, and in one embodiment in the range from about 15 to about 50% by volume, and in one embodiment from about 20 to about 30% by volume. The concentration of steam may be in the range from about 1 to about 90% by volume, and in one embodiment in the range from about 30 to about 80% by volume. The mole ratio of steam to methane in the SMR feed may be in the range from about 0.5 to about 6, and in one embodiment from about 1 to about 4, and in one embodiment from about 1 to about 3, and in one embodiment in the range from about 1.5 to about 2.5. The SMR feed may contain higher molecular weight hydrocarbons of 2 to about 5 carbon atoms at a concentration in the range up to about 15% by volume, and in one embodiment in the range from about 0.01 to about 15% by volume, and in one embodiment in the range from about 0.1 to about 5% by volume. The SMR feed may include $CO_2$ at a concentration in the range up to about 40% by volume, and in one embodiment from about 0.1 to about 15% by volume. The concentration of other ingredients, including $N_2$, $O_2$ and CO, may be in the range up to about 20% by volume, and in one embodiment in the range from about 0.01 to about 5% by volume. The temperature of the SMR feed entering the SMR microchannel reactor may be in the range from about 100 to about 400° C., and in one embodiment in the range from about 150 to about 350° C. The SMR feed may be at a pressure in the range from about 1 to about 50 atmospheres, and in one embodiment in the range from about 10 to about 30 atmospheres.

The first intermediate product or synthesis gas exiting the SMR microchannel reactor 130 as indicated by line 132 may have a concentration of CO in the range from about 1 to about 50% by volume, and in one embodiment in the range from about 10 to about 30% by volume. The concentration of $H_2$ in the first intermediate product may be in the range from about 1 to about 80% by volume, and in one embodiment in the range from about 10 to about 50% by volume. The first intermediate product may contain methane at a concentration in the range from about 0.01 to about 50% by volume, and in one embodiment in the range from about 1 to about 20% by volume. The first intermediate product may also contain additional ingredients such as $N_2$, $O_2$, $CO_2$, at a concentration in the range up to about 30% by volume, and in one embodiment in the range from about 0.001 to about 20% by volume. The mole ratio of $H_2$ to CO in the first intermediate product may be in the range from about 1 to about 4, and in one embodiment from about 2 to about 3.5, and in one embodiment in the range from about 2.8 to about 3.2, and in one embodiment about 3. The temperature of the first intermediate product flowing out of the SMR microchannel reactor 130 may be in the range from about 100 to about 500° C., and in one embodiment in the range from about 200 to about 400° C. The first intermediate product may be at a pressure in the range from about 1 to about 50 atmospheres, and in one embodiment in the range from about 10 to about 40 atmospheres.

Part of the $H_2$ in the first intermediate product is separated from the first intermediate product in $H_2$ separator 140 and flows to or is recycled to the combustion channels in the SMR microchannel reactor 130 as the $H_2$ rich fuel indicated by line 142. The separation of the $H_2$ from the intermediate product in the $H_2$ separator 140 may be effected using temperature swing adsorption, pressure swing adsorption, membranes, or a combination of two or more thereof. The temperature of the $H_2$ rich fuel entering the combustion channels may be in the range from about 25 to about 800° C., and in one embodiment in the range from about 200 to about 600° C. The $H_2$ rich fuel entering the combustion channels may be at a pressure in the range from about 1 to about 20 atmospheres, and in one embodiment in the range from about 1 to about 3 atmospheres.

The oxygen or source of oxygen, may comprise oxygen, air, oxygen enriched air, or other oxidants, such as nitrogen oxides, which may function as a source of oxygen. Advantageously the source of oxygen is air which is shown as the oxygen source in FIGS. 2-9. The oxygen source may comprise carbon dioxide, carbon monoxide or a peroxide (e.g., hydrogen peroxide). Gaseous mixtures containing oxygen, such as mixtures of oxygen and air, or mixtures of oxygen and an inert gas (e.g., helium, argon, etc.) or a diluent gas (e.g., carbon dioxide, water vapor, etc.) may be used.

The temperature of the oxygen or oxygen source entering the staged addition channels in the SMR microchannel reactor 130 as indicated by line 133 may be in the range from about 25 to about 800° C., and in one embodiment in the range from about 50 to about 600° C. The oxygen or oxygen source may be at a pressure in the range from about 1 to about 50 atmospheres, and in one embodiment in the range from about 1 to about 3 atmospheres as it enters the staged addition channels. The mole ratio of the $H_2$ to oxygen in the combustion reaction conducted in the combustion channels of the SMR microchannel reactor 130 may be in the range from about 0.01 to about 1, and in one embodiment from about 0.1 to about 0.6.

The second intermediate product exiting the $H_2$ separator 140 as indicated by line 144 may have a concentration of CO in the range from about 1 to about 50% by volume, and in one embodiment in the range from about 10 to about 40% by volume. The concentration of $H_2$ in the second intermediate product may be in the range from about 10 to about 90% by volume, and in one embodiment in the range from about 20 to about 80% by volume. The second intermediate product may contain methane at a concentration in the range from about 0.01 to about 50% by volume, and in one embodiment in the range from about 0.1 to about 20% by volume. The second intermediate product may also contain additional ingredients such as $N_2$, $O_2$ and $CO_2$, at a concentration in the range up to about 20% by volume, and in one embodiment in the range from about 0.001 to about 5% by volume. The mole ratio of $H_2$ to CO in the second intermediate product may be in the range from about 1 to about 4, and in one embodiment from about 1.5 to about 2.5, and in one embodiment in the range from about 2.08 to about 2.13. The temperature of the second intermediate product flowing out of the $H_2$ separator 140 may be in the range from about 25 to about 300° C., and in one embodiment in the range from about 50 to about 250° C. The second intermediate product may be at a pressure in the range from about 1 to about 100 atmospheres, and in one embodiment in the range from about 10 to about 50 atmospheres.

Additional flexibility may be achieved by adjusting the $H_2$ to CO mole ratio entering each of the Fischer-Tropsch microchannel reactors 150 and 170 to specific values to provide for process and economic optimization for each Fischer-Tropsch microchannel reactor and/or the overall inventive process. For example, adjusting the $H_2$ to CO ratio between Fischer-Tropsch microchannel reactor 150 and Fischer-Tropsch microchannel reactor 170 is possible because of the net excess of $H_2$ provided by the inventive process. This may allow for an optimization of each of the Fischer-Tropsch microchannel reactors 150 and 170 to maximize the yield of the desired products. This may also allow for an adjustment of $H_2$ to CO ratio for feed streams for any additional Fischer-Tropsch microchannel reactors that may be used downstream of the Fischer-Tropsch microchannel reactor 170.

The product produced in the Fischer-Tropsch microchannel reactor 150 may comprise a Fischer-Tropsch product, water, and a gaseous mixture comprising CO and $H_2$. These are separated from each other in separator 157. The gaseous mixture may include hydrocarbons boiling below about 30° C. at atmospheric pressure. The gaseous mixture may be referred to as the third intermediate product.

The third intermediate product may have a concentration of CO in the range from about 1 to about 50% by volume, and in one embodiment in the range from about 10 to about 40% by volume. The concentration of $H_2$ in the third intermediate product may be in the range from about 1 to about 50% by volume, and in one embodiment in the range from about 10 to about 40% by volume. The third intermediate product may contain methane at a concentration in the range from about 0.1 to about 20% by volume, and in one embodiment in the range from about 1 to about 15% by volume. The concentration of hydrocarbons boiling below about 30° C. at atmospheric pressure may be in the range up to about 10% by volume, and in one embodiment in the range from about 2 to about 5% by volume. The third intermediate product may also contain additional ingredients such as $N_2$, $O_2$ and $CO_2$ at a concentration in the range up to about 20% by volume, and in one embodiment in the range from about 0.01 to about 5% by volume. The mole ratio of $H_2$ to CO in the third intermediate product may be in the range from about 0.01 to about 5, and in one embodiment in the range from about 0.5 to about 3, and in one embodiment about 2.05. The temperature of the third intermediate product may be in the range from about 100 to about 400° C., and in one embodiment in the range from about 150 to about 250° C. The third intermediate product in line 161 may be at a pressure in the range from about 1 to about 50 atmospheres, and in one embodiment in the range from about 10 to about 30 atmospheres. The pressure may be increased using compressor 160. The pressure of the third intermediate product entering the Fischer-Tropsch microchannel reactor 170 may be in the range from about 10 to about 50 atmospheres, and in one embodiment in the range from about 15 to about 50 atmospheres, and in one embodiment in the range from about 15 to about 40 atmospheres, and in one embodiment in the range from about 15 to about 25 atmospheres.

The product produced in the Fischer-Tropsch microchannel reactor 170 may comprise a liquid hydrocarbon fraction, a gaseous mixture and process water. The gaseous mixture may include hydrocarbons boiling below about 30° C. at atmospheric pressure. This fraction may be referred to as a tail gas. The tail gas may be recycled or otherwise used as discussed above. The liquid hydrocarbon fraction may be referred to as the Fischer-Tropsch product. The Fischer-Tropsch product may include hydrocarbons boiling above about 30° C. (e.g., middle distillates through heavy paraffins). The Fischer-Tropsch product may comprise paraffins and/or olefins of about 5 to about 100 carbon atoms as well as higher boiling hydrocarbons.

The carbon utilization or percent of carbon in the Fischer-Tropsch product produced in the Fischer-Tropsch microchannel reactor 150 may be in the range from about 50% to about 70% as compared to carbon in the natural gas feed. The percent of carbon in the Fischer-Tropsch product produced in the Fischer-Tropsch microchannel reactor 170 may be in the range from about 10% to about 20% as compared to carbon in the natural gas feed. The overall carbon utilization or percent of carbon in the Fischer-Tropsch product produced in both the Fischer-Tropsch microchannel reactors 150 and 170 as compared to carbon in the natural gas feed may be at least about 75%, and in one embodiment in the range from about 75 to about 90%, and in one embodiment in the range from about 77 to about 90%, and in one embodiment from about 80 to about 90%. These figures may be achieved without import of oxygen to the process or export of electricity from the process.

The Fischer-Tropsch product may comprise a hydrocarbon fraction boiling in the range from about 30 to about 175° C. at atmospheric pressure. The Fischer-Tropsch product may include a fraction boiling above about 175° C. The fraction boiling above 175° C. may be separated into a wax fraction boiling in the range of about 175° C. to about 350° C. after removing one or more fractions boiling above about 350° C. The wax fraction may contain linear paraffins of about 20 to about 50 carbon atoms with relatively small amounts of higher boiling branched paraffins. The separation may be effected using fractional distillation.

The Fischer-Tropsch product may include methane, wax and other heavy high molecular weight products. The product may include olefins such as ethylene, normal and iso-paraffins, and combinations thereof. These may include hydrocarbons in the distillate fuel ranges, including the jet or diesel fuel ranges.

The Fischer-Tropsch product may include a hydrocarbon fraction having a 5% by volume boiling point above about 350° F. (177° C.), and in one embodiment above about 400° F. (204° C.). In one embodiment, at least about 90% by volume of the product may fall within the boiling point range of about 300° F. (149° C.) to about 1050° F. (566° C.), and in one embodiment between about 600° F. (316° C.) to about 1000° F. (538° C.).

The Fischer-Tropsch product may be further processed to form one or more distillate products. The distillate product may comprise a middle distillate fraction boiling in the range of about 260-700° F. (127-371° C.). The term "middle distillate" is intended to include the diesel, jet fuel and kerosene boiling range fractions. The terms "kerosene" and "jet fuel" boiling range are intended to refer to a temperature range of 260-550° F. (127-288° C.) and "diesel" boiling range is intended to refer to hydrocarbon boiling points between about 260 to about 700° F. (127-371° C.). The distillate product may comprise a gasoline or naphtha fraction. These are normally considered to be the $C_5$ to 400° F. (204° C.) endpoint fractions.

Branching may be advantageous in a number of end-uses, particularly when increased octane values and/or decreased pour points are desired. The degree of isomerization may be greater than about 1 mole of isoparaffin per mole of n-paraffin, and in one embodiment about 3 moles of isoparaffin per mole of n-paraffin. When used in a diesel fuel composition, the product may comprise a hydrocarbon mixture having a cetane number of at least about 60.

Figure 39:
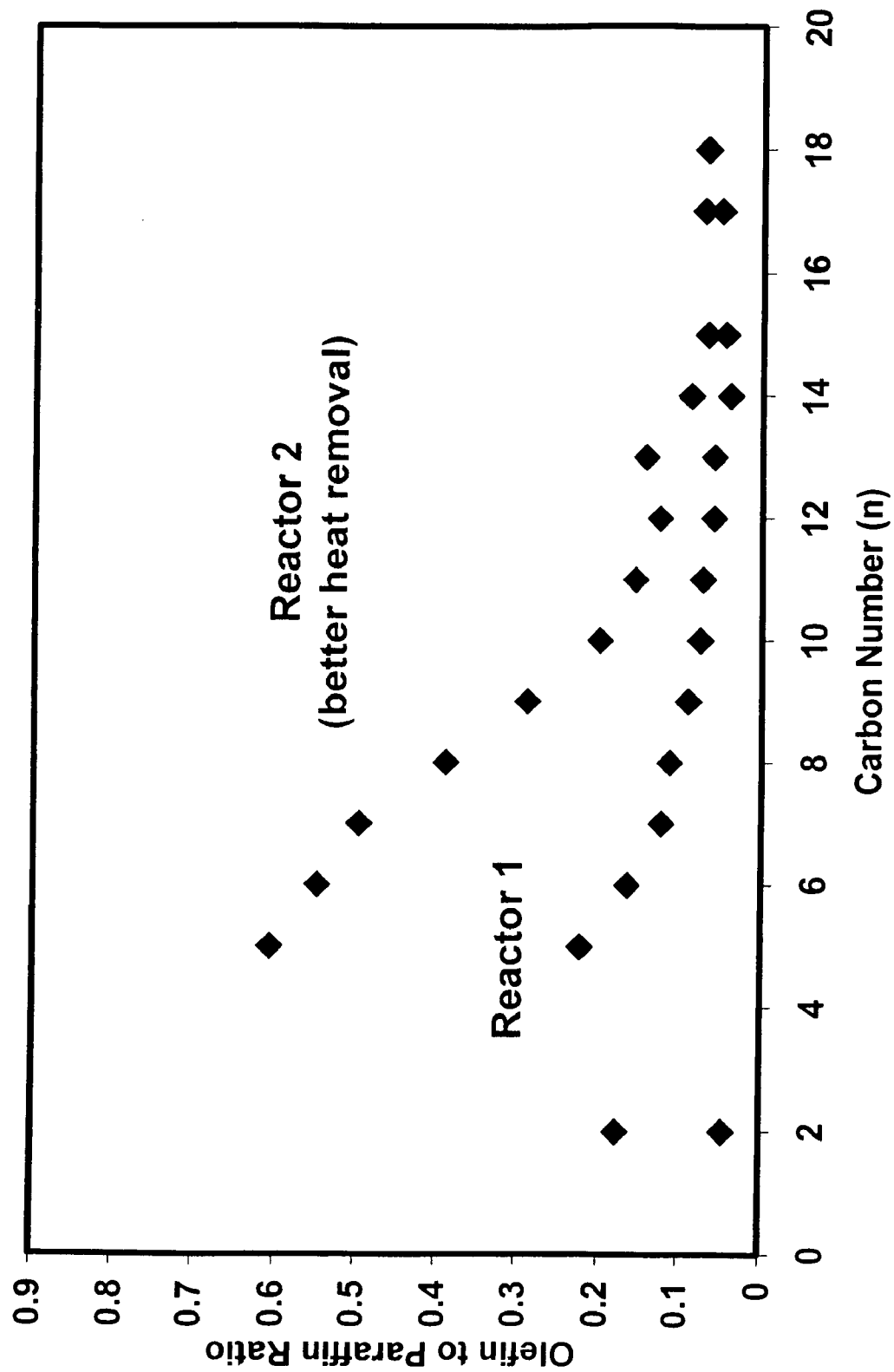
FIG. 39 is a graph showing a higher olefin to paraffin ratio for Fischer-Tropsch products produced in a Fischer-Tropsch microchannel reactor pursuant to the inventive process as compared to a Fischer-Tropsch product produced using conventional processing.

In one embodiment, the Fischer-Tropsch products (i.e., third intermediate product or final product) produced by the inventive process may contain a higher ratio of olefins to paraffins as compared to conventional (i.e., non-microchannel) processing. This is shown in FIG. 39 wherein Reactor 2 (good heat removal) shows a higher ratio of olefins as compared to Reactor 1 (poor heat removal). While not wishing to be bound by theory, it is believed that with the inventive process, improved temperature control and reduced contact time in the Fischer-Tropsch microchannel reactors 150 and 170 may decrease secondary reactions involving the olefins so that the olefins may be included in the product mixture more than other constituents (ethers, ketones and/or organic acids) that may be found in Fischer-Tropsch products produced using conventional processing.

The mole ratio of olefins to paraffins in the Fischer-Tropsch product may be in the range from about 0.01 to about 0.8 and in one embodiment in the range from about 0.03 to about 0.7. In one embodiment, the Fischer-Tropsch product may comprise a mixture of olefins and paraffins of about 5 to about 10 carbon atoms, wherein the olefin to paraffin molar ratio is in the range from about 0.2 to about 0.8, and in one embodiment from about 0.25 to about 0.8 and in one embodiment from about 0.3 to about 0.8. In one embodiment, the Fischer-Tropsch product comprises a mixture of olefins and paraffins of about 10 carbon atoms, the olefin to paraffin molar ratio being greater than about 0.12. In one embodiment, the Fischer-Tropsch product comprises a mixture of olefins and paraffins of about 8 carbon atoms, the olefin to paraffin molar ratio being greater than about 0.15. In one embodiment, the Fischer-Tropsch product comprises a mixture of olefins and paraffins of about 6 carbon atoms, the olefin to paraffin molar ratio being greater than about 0.25.

The olefins in the Fischer-Tropsch product may be further processed to form alcohols, acids, esters, and the like, using microchannel processing or conventional (i.e., non-microchannel) processing.

Higher molecular weight products, for example waxes, may either be isolated and used directly, or reacted to form lower molecular weight products. For example, high molecular weight products may be hydrocracked to provide lower molecular weight products thereby increasing the yield of liquid combustible fuels. Hydrocracking refers to a catalytic process, usually carried out in the presence of free hydrogen, in which the cracking of the larger hydrocarbon molecules is a primary purpose of the operation. Catalysts used in carrying out hydrocracking operations are well known in the art; see, for example, U.S. Pat. Nos. 4,347,121 and 4,810,357, which are incorporated herein by reference, for their descriptions of hydrotreating, hydrocracking, and catalysts used in each process. The Fischer-Tropsch product may be further processed to form a lubricating base oil or diesel fuel. For example, the Fischer-Tropsch product may be hydrocracked and then subjected to distillation and/or catalytic isomerization to provide a lubricating base oil, diesel fuel, and the like.

The Fischer-Tropsch products may be hydroisomerized using the process disclosed in U.S. Pat. No. 6,103,099 or 6,180,575; hydrocracked and hydroisomerized using the process disclosed in U.S. Pat. No. 4,943,672 or 6,096,940; dewaxed using the process disclosed in U.S. Pat. No. 5,882,505; or hydroisomerized and dewaxed using the process disclosed in U.S. Pat. Nos. 6,013,171, 6,080,301 or 6,165,949. These patents are incorporated herein by reference for their disclosures of processes for treating Fischer-Tropsch synthesized hydrocarbons and the resulting products made from such processes.

In one embodiment, a hydrocracking reactor may be operated in series with the Fischer-Tropsch microchannel reactor 170. The hydrocracking reactor may be a conventional reactor or a microchannel reactor. The Fischer-Tropsch microchannel reactor and the hydrocracking reactor may be placed within the same hardware or sequentially separated by pipe connections and water removal. The Fischer-Tropsch process microchannels may include a hydrocracking zone downstream of the Fischer-Tropsch reaction zone wherein hydrocracking may be effected. An optional configuration may provide for the inclusion of water capture within an integrated Fischer-Tropsch and hydrocracker reactor, where the Fischer-Tropsch product is cooled to remove water and then reheated to a higher temperature to drive the hydrocracking reaction. Additional $H_2$ may be used in the hydrocracker reactor or hydrocracking zone to promote the hydrocracking reaction. The source of the additional $H_2$ may be the excess $H_2$ split off at line 145 or the $H_2$ rich tail gas from line 192.

Figure 12:
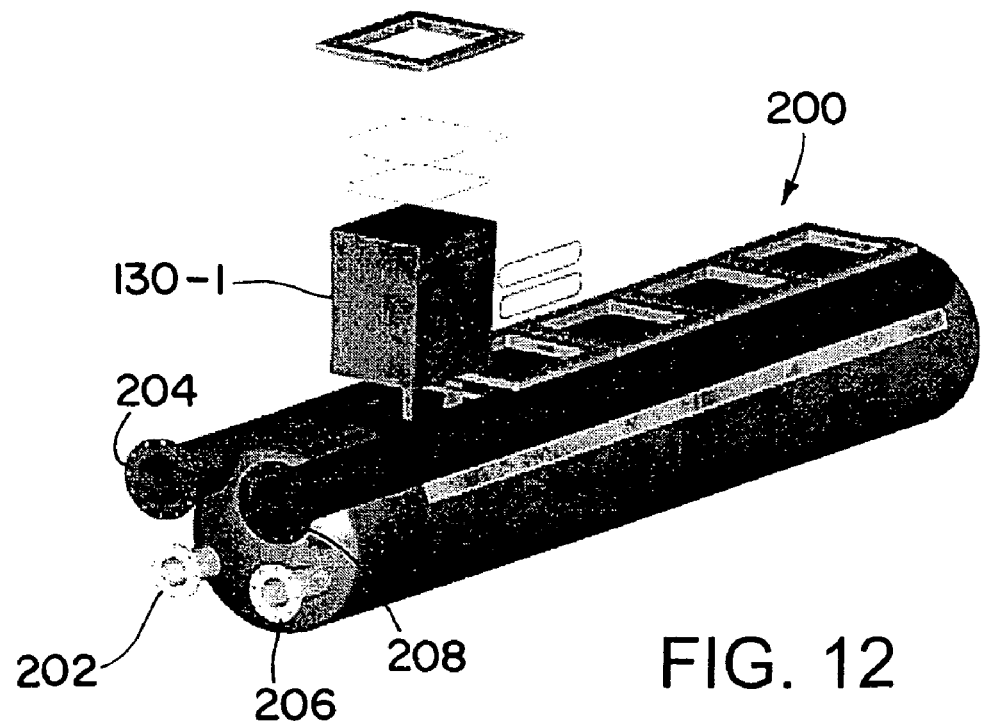
FIGS. 12 and 13 are schematic illustrations of an SMR vessel used for housing a plurality of SMR microchannel reactors.
Figure 13:
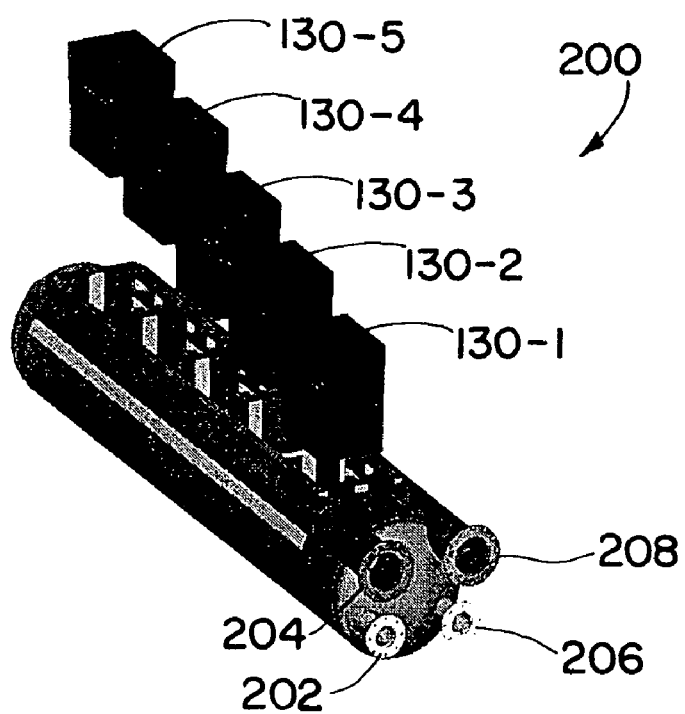

A plurality of the SMR microchannel reactors 130 may be housed in vessel 200 which is illustrated in FIGS. 12 and 13. Referring to FIGS. 12 and 13, the vessel 200 contains five SMR microchannel reactors 130. These are identified in FIGS. 12 and 13 as SMR microchannel reactors 130-1, 130-2, 130-3, 130-4 and 130-5. Although five SMR Microchannel reactors 130 are disclosed in the drawings, it will be understood that the vessel 200 may contain any desired number of SMR microchannel reactors. For example, the vessel 200 may contain from 1 to about 1000 SMR microchannel reactors 130, and in one embodiment from about 3 to about 500 SMR microchannels reactors 130, and in one embodiment from about 3 to about 250 SMR microchannel reactors 130, and in one embodiment from about 3 to about 150 SMR microchannel reactors 130, and in one embodiment from about 5 to about 50 SMR microchannel reactors 130, and in one embodiment from about 8 to about 12 SMR microchannel reactors 130. In one embodiment, the SMR vessel 200 may contain from 1 to about 50 SMR microchannel reactors 130, and in one embodiment from 1 to about 20 SMR microchannel reactors 130. The vessel 200 may be a pressurizable vessel. The vessel 200 includes inlets 202, 204 and 208, and outlet 206. The inlet 202 is connected to a manifold which is provided for flowing the SMR feed to the SMR process microchannels in the SMR microchannel reactors 130-1, 130-2, 130-3, 130-4 and 130-5. The inlet 204 is connected to a manifold which is provided for flowing the $H_2$ rich fuel to the combustion channels in the SMR microchannel reactors 130-1, 130-2, 130-3, 130-4 and 130-5. The outlet 206 is connected to a manifold which provides for the flow of the first intermediate product or synthesis gas from the SMR microchannel reactors 130-1, 130-2, 130-3, 130-4 and 130-5 out of the vessel 200. The inlet 208 is connected to a manifold to provide for the flow of the oxygen or source of oxygen (e.g., air) to the staged addition channels in the SMR microchannel reactors 130-1, 130-2, 130-3, 130-4 and 130-5. The vessel 200 also includes an outlet (not shown in the drawings) providing for the flow of exhaust gas from the SMR microchannel reactors 130-1, 130-2, 130-3, 130-4 and 130-5.

Figure 14:
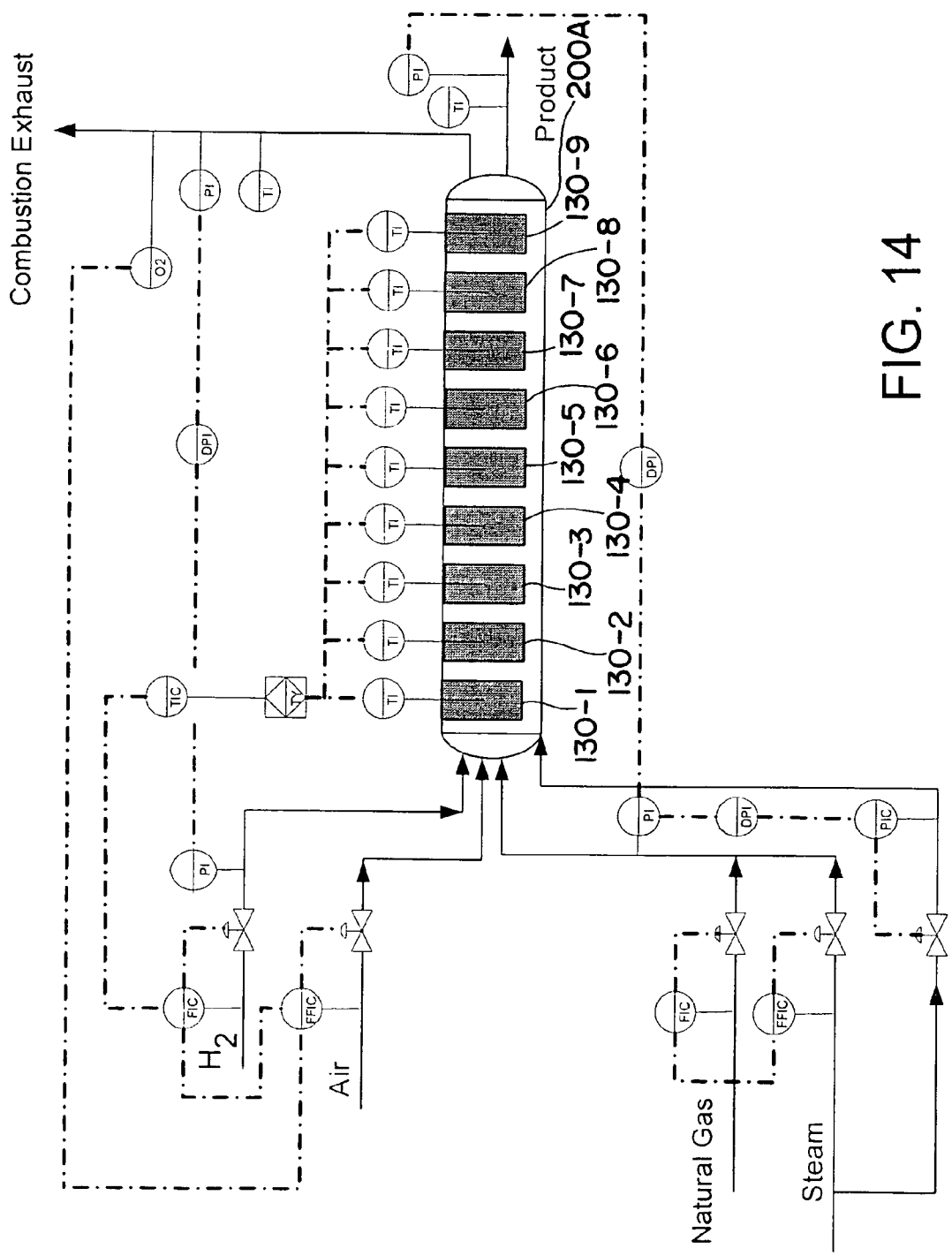
FIG. 14 is a flow sheet showing the flow of fluids and controls for such fluid flow, into and out of an SMR vessel similar to the SMR vessel shown in FIGS. 12 and 13. The SMR vessel shown in FIG. 14 includes nine SMR microchannel reactors.

Vessel 200A is illustrated in FIG. 14. The vessel 200A is the same as the vessel 200 illustrated in FIGS. 12 and 13, with the exception that the vessel 200A includes nine SMR microchannel reactors, namely, SMR microchannel reactors 130-1, 130-2, 130-3, 130-4, 130-5, 130-6, 130-7, 130-8 and 130-9. The valves and controls providing for the flow of fluids to and from the vessel 200A are shown in FIG. 14. Vessel 200A may be a pressurizable vessel.

The vessels 200 and 200A may be constructed from any suitable material sufficient for operating under the pressures and temperatures required for operating the SMR microchannel reactors. For example, the shell and heads of the vessels 200 and 200A may be constructed of cast steel. The flanges, couplings and pipes may be constructed of stainless steel or other suitable alloys. The vessels 200 and 200A may have any desired diameter, for example, from about 30 to about 500 cm, and in one embodiment from about 100 to about 300 cm. The axial length of the vessels 200 and 200A may be of any desired value, for example, from about 0.5 to about 50 meters, and in one embodiment from about 0.5 to about 15 meters, and in one embodiment from about 1 to about 10 meters.

As indicated above, the SMR microchannel reactors 130 may comprise a plurality of SMR process microchannels, combustion channels and staged addition channels stacked one above the other or positioned side-by-side. The SMR microchannel reactors 130 may be in the form of cubic blocks as illustrated in FIGS. 12 and 13. Each of these cubic blocks may have a length, width and height, the length being in the range from about 10 to about 1000 cm, and in one embodiment in the range from about 50 to about 200 cm. The width may be in the range from about 10 to about 1000 cm, and in one embodiment in the range from about 50 to about 200 cm. The height may be in the range from about 10 to about 1000 cm, and in one embodiment in the range from about 50 to about 200 cm.

The SMR microchannel reactors 130 may comprise a plurality of repeating units, each of which includes one or more SMR process microchannels, combustion channels and staged addition channels. The repeating units that may be used include repeating units 300, 300A, 300B, 300C and 300D illustrated in FIGS. 15-19, respectively. The SMR microchannel reactors 130 may comprise from about 1 to about 1000 of the repeating units 300, 300A, 300B, 300C or 300D, and in one embodiment from about 3 to about 750, and in one embodiment from about 5 to about 500, and in one embodiment from about 5 to about 250, and in one embodiment from about 10 to about 100 repeating units.

Figure 15:
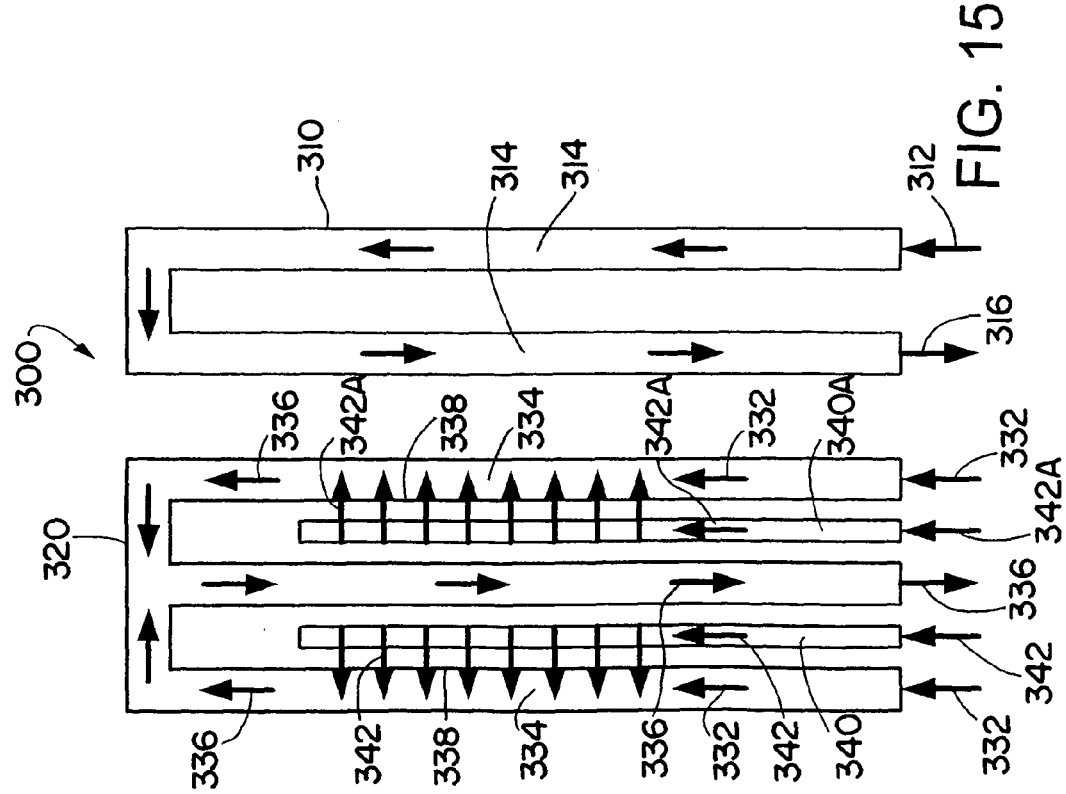

The repeating unit 300 illustrated in FIG. 15 includes SMR process microchannel 310 and heating section 320. Heating section 320 comprises combustion channel 330 and staged addition channels 340 and 340A. The process microchannel 310 is in the form of an upside down U and includes reaction zone 314 where an SMR catalyst (not shown in the drawing) is positioned. The SMR feed enters the SMR process microchannel 310 as indicated by arrow 312, flows through the SMR process microchannel, contacts the SMR catalyst in the reaction zone 314, undergoes a steam methane reforming reaction with the result being the formation of the first intermediate product comprising CO and $H_2$. The intermediate product flows out of the SMR process microchannel as indicated by arrow 316. The combustion channel 330 is an M-shaped combustion channel which includes reaction zones 334 wherein a combustion catalyst (not shown in the drawing) is positioned. The combustion channel also includes apertured sections 338 in its sidewalls to permit the oxygen or source of oxygen to flow from the staged addition channels 340 and 340A into the combustion channel 330. The $H_2$ rich fuel enters the combustion channel 330 as indicated by arrows 332 and flows into the reaction zones 334. The oxygen or source of oxygen enters the staged addition channels 340 and 340A as indicated by arrows 342 and 342A and flows through the apertured sections 338 and into the reaction zones 334 in the combustion channels 330. The $H_2$ rich fuel is mixed with the oxygen or source of oxygen, contacts the combustion catalyst, and undergoes a combustion reaction which generates heat and combustion exhaust. The combustion exhaust flows out of the combustion channel 330 as indicated by arrows 336.

Figure 16:
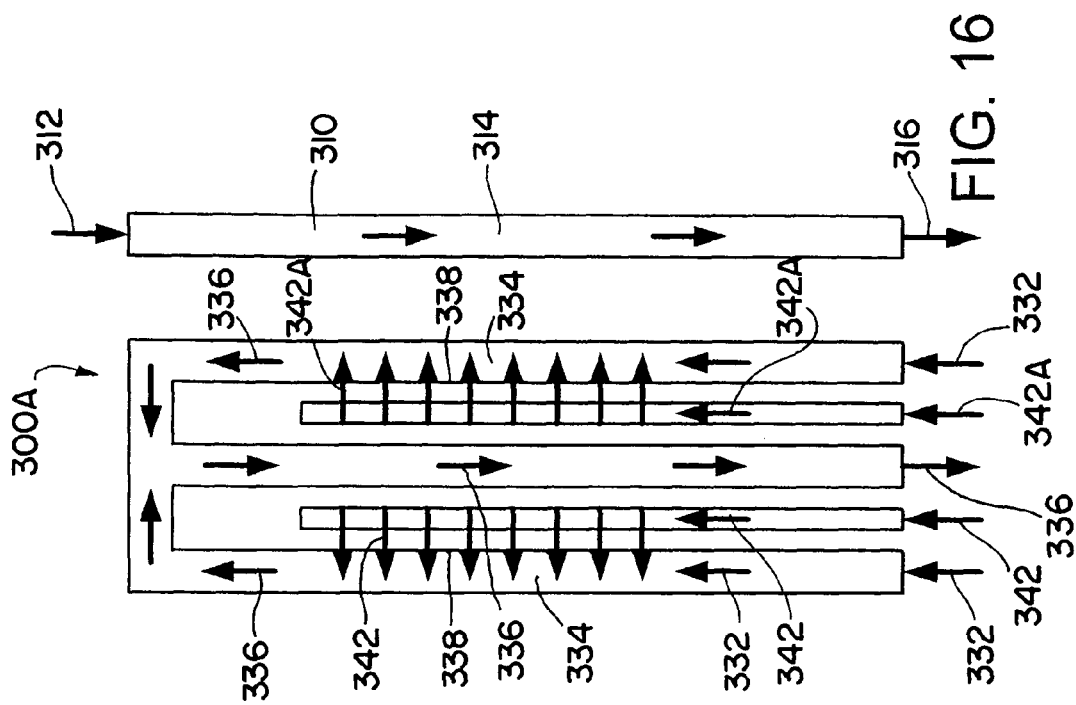

The repeating unit 300A illustrated in FIG. 16 is the same as the repeating unit 300 with the exception that the SMR process microchannel 310 in repeating unit 300A is a straight-run flow-through microchannel, rather than an upside down U-shaped microchannel.

Figure 17:
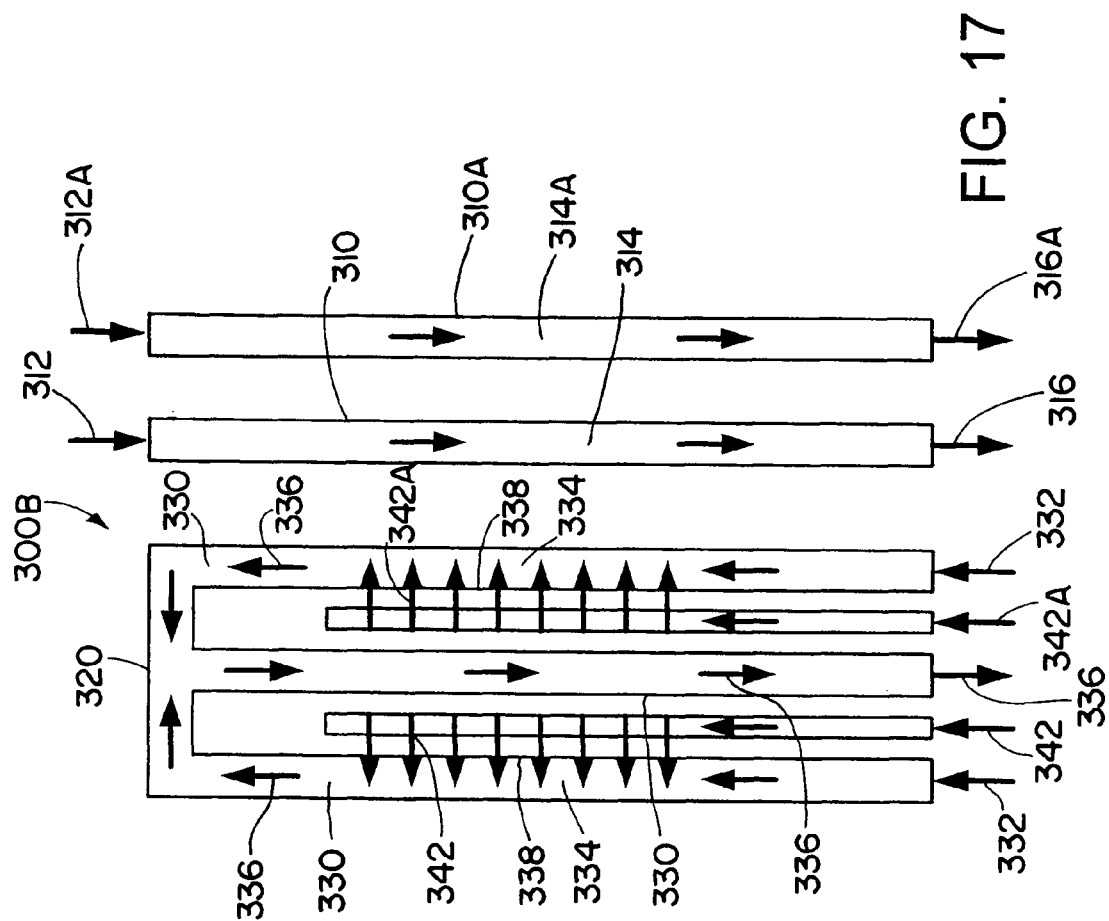

The repeating unit 300B illustrated in FIG. 17 is the same as the repeating unit 300A with the exception that the repeating unit 300B includes two adjacent SMR process microchannels, namely, SMR process microchannels 310 and 310A. The SMR process microchannel 310 is adjacent to the combustion channel 330. The SMR process microchannel 310A is adjacent to the SMR process microchannel 310 and in thermal contact with the combustion channel 330.

The repeating unit 300C illustrated in FIG. 18 is the same as the repeating unit 300A illustrated in FIG. 16 with the exception that the combustion channel 330 illustrated in FIG. 18 is a straight run channel, rather than a M-shaped channel, and only one staged addition channel 340 is used.

The repeating unit 300D illustrated in FIG. 19 is the same as the repeating unit 300C illustrated in FIG. 18 with the exception that the SMR process microchannel 310 in repeating unit 300D is an upside down U-shaped microchannel, rather than a straight run microchannel.

Figure 20:
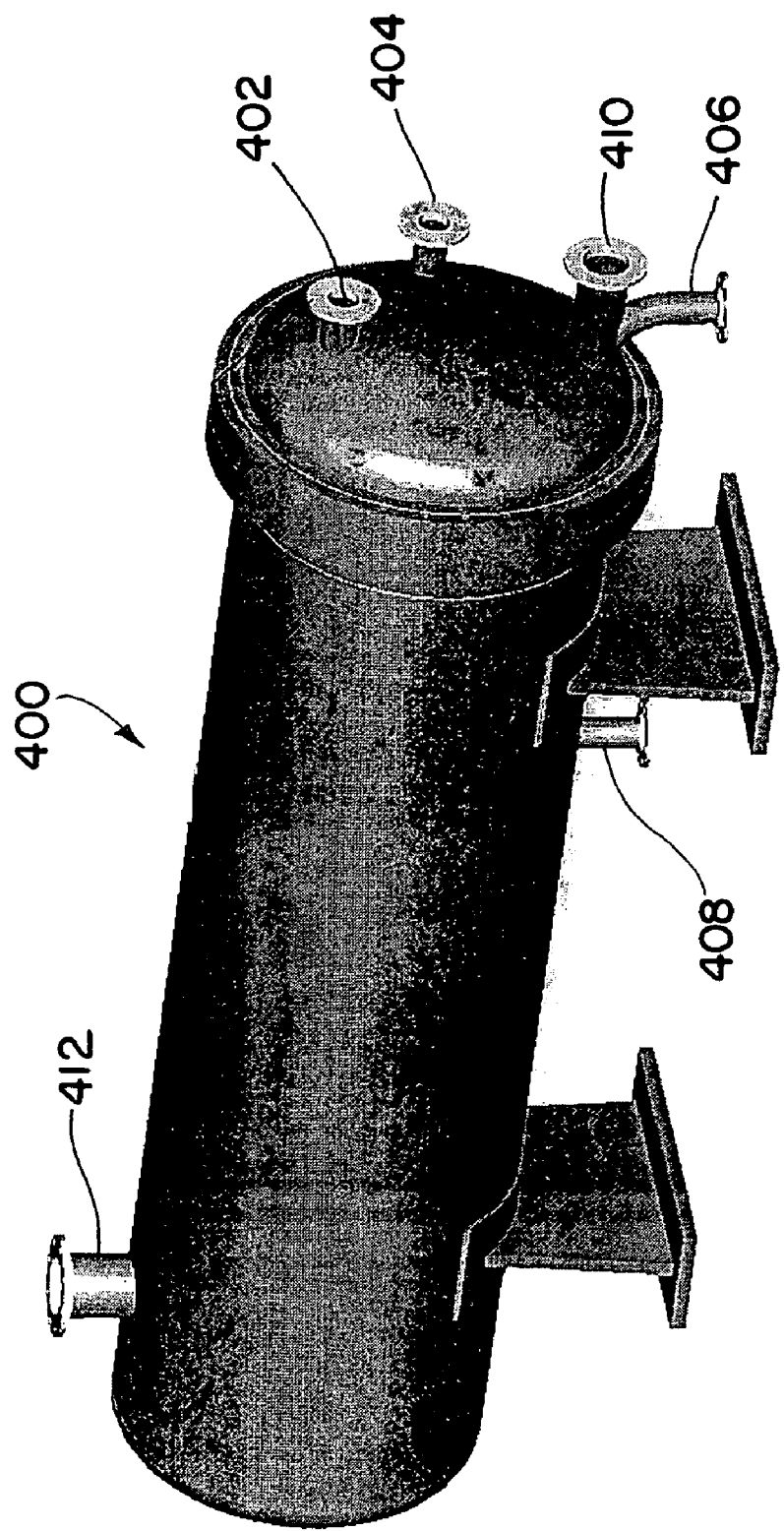
FIG. 20 is a schematic illustration of a Fischer-Tropsch vessel which may be used for housing a plurality of the Fischer-Tropsch microchannel reactors used with the inventive process.
Figure 21:
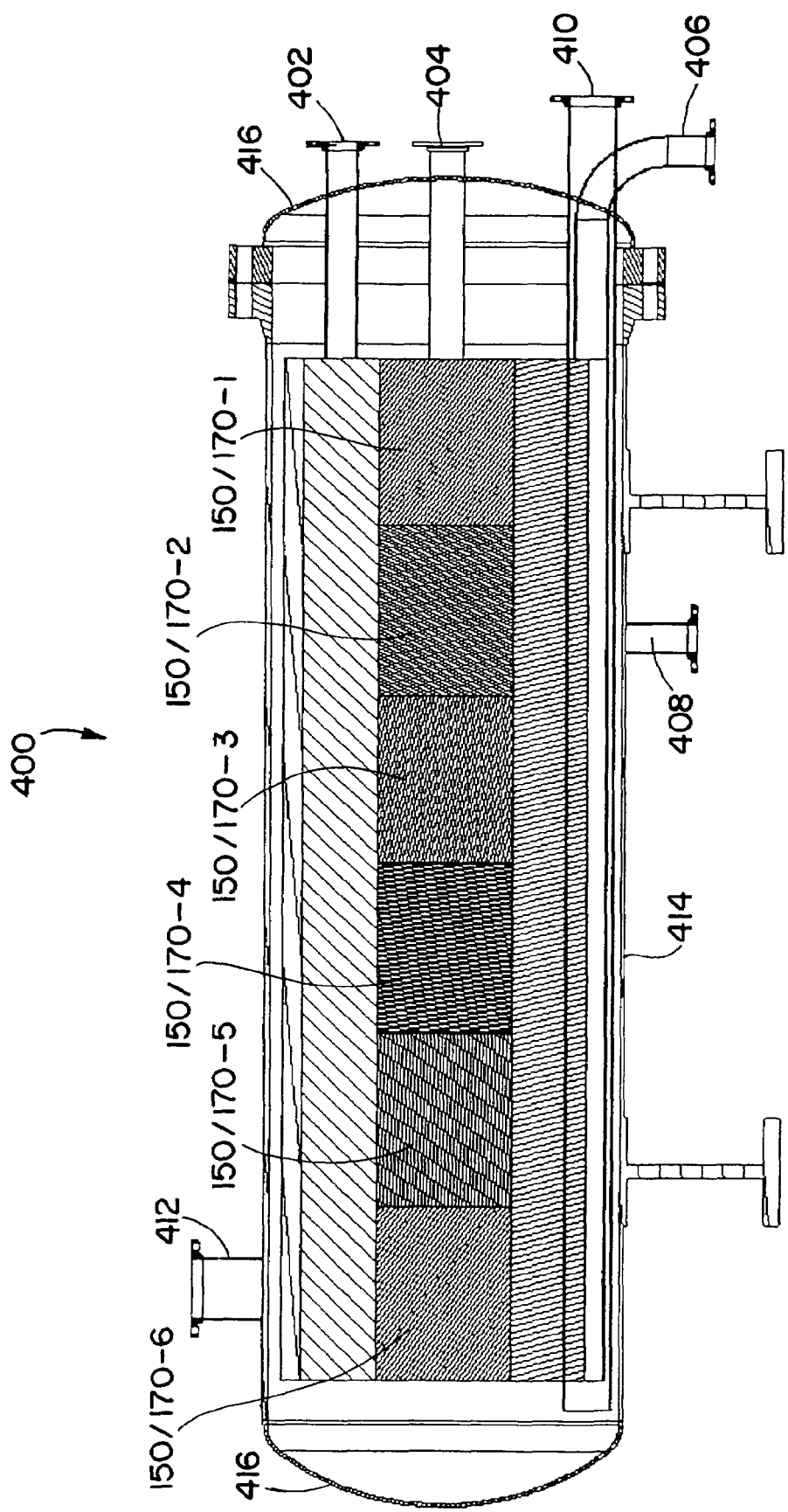
FIG. 21 is a side elevational view of a cross-section of the Fischer-Tropsch vessel illustrated in FIG. 20.
Figure 22:
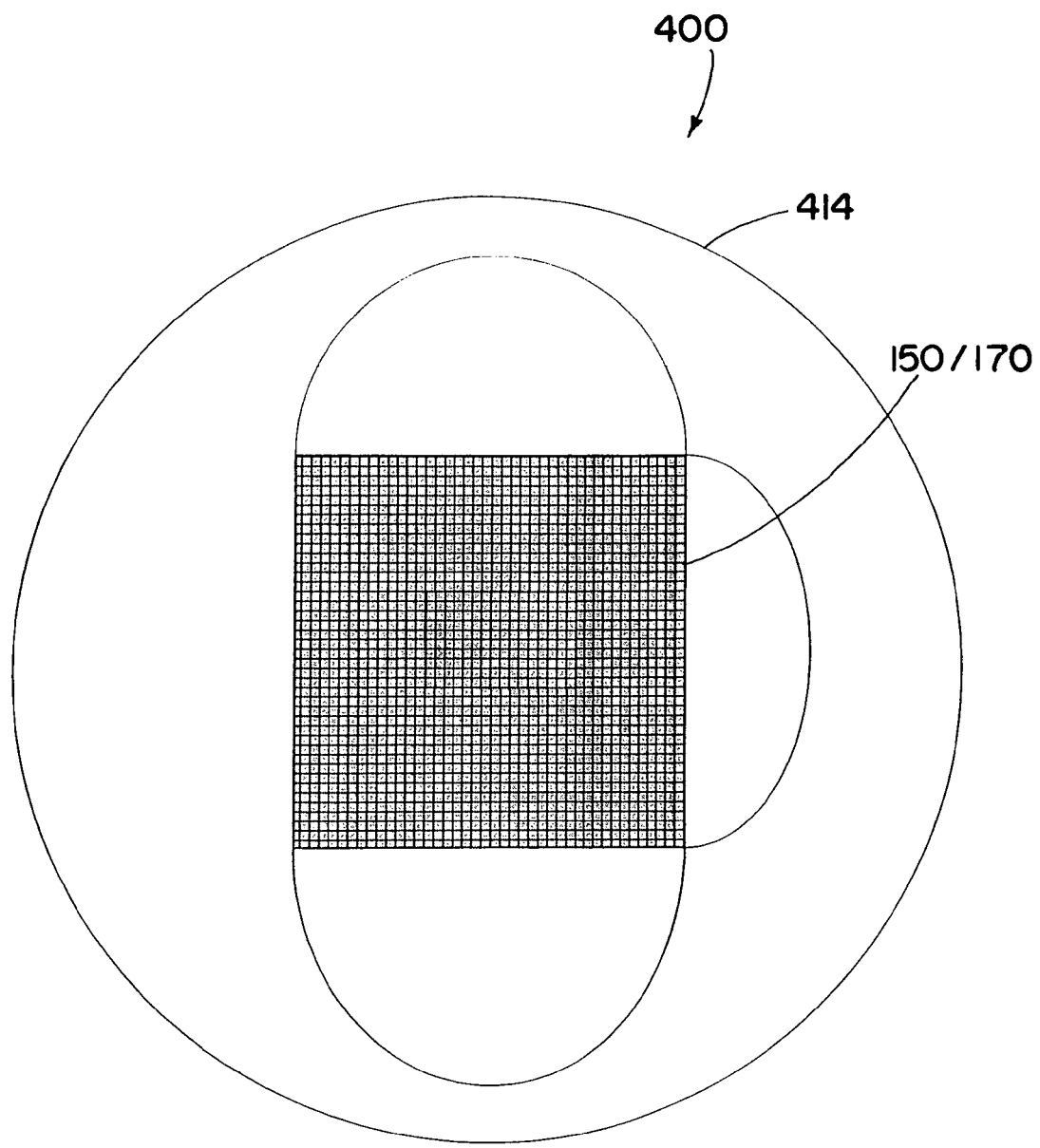
FIG. 22 is a cross-sectional view of the Fischer-Tropsch vessel illustrated in FIG. 21.

The Fischer-Tropsch microchannel reactors 150 and 170 may be housed in separate vessels 400, each vessel 400 having the construction illustrated in FIGS. 20-22. Referring to FIG. 21, the vessel 400 contains six Fischer-Tropsch microchannel reactors 150 or six Fischer-Tropsch microchannel reactors 170, which are identified in the drawings as microchannel reactors 150/170. These are identified in FIG. 21 as Fischer-Tropsch microchannel reactors 150/170-1, 150/170-2, 150/170-3, 150/170-4, 150/170-5 and 150/170-6. Although six microchannel reactors are disclosed in the drawings, it will be understood that the vessel 400 may contain any desired number of Fischer-Tropsch microchannel reactors. For example, the vessel 400 may contain from about 1 to about 1000 Fischer-Tropsch microchannel reactors 150 or 170, and in one embodiment from 1 to about 750, and in one embodiment from 1 to about 500, and in one embodiment from 1 to about 250, and in one embodiment from 1 to about 100, and in one embodiment from about 1 to about 50, and in one embodiment from 1 to about 20 Fischer-Tropsch microchannel reactors 150 or 170. The vessel 400 may be a pressurizable vessel. The vessel 400 includes inlets 402, 404 and 410, and outlets 406, 408 and 412. The inlet 402 is connected to a manifold which is provided for flowing the Fischer-Tropsch feed (i.e., the second intermediate product for the Fischer-Tropsch microchannel reactors 150 or the third intermediate product for the Fischer-Tropsch microchannel reactors 170) to the Fischer-Tropsch process microchannels in the Fischer-Tropsch microchannel reactors 150 or 170. The inlet 404 is connected to a manifold which is provided for flowing heat exchange fluid (e.g., saturated steam and water) to the heat exchange channels in the Fischer-Tropsch microchannel reactors 150 or 170. The outlet 406 is connected to a manifold which provides for the flow of product from the Fischer-Tropsch microchannel reactors 150 or 170 out of the vessel 400. The outlet 408 is connected to a manifold to provide for the flow of the heat exchange fluid (e.g., steam) out of the Fischer-Tropsch microchannel reactors 150 or 170. The vessel 400 also includes inlet 410 and outlet 412 for providing for the circulation of superheated steam to heat the product annulus of the vessel 400 and maintain flow through the product manifold.

The vessel 400 may be constructed from any suitable material sufficient for operating under the pressures and temperatures required for operating the Fischer-Tropsch microchannel reactors 150 and 170. For example, the shell 414 and heads 416 of the vessel 400 may be constructed of cast steel. The flanges, couplings and pipes may be constructed of 316 stainless steel. The vessel 400 may have any desired diameter, for example, from about 10 to about 1000 cm, and in one embodiment from about 50 to about 300 cm. The axial length of the vessel 400 may be of any desired value, for example, from about 0.5 to about 50 meters, and in one embodiment from about 1 to about 20 meters.

As indicated above, the Fischer-Tropsch microchannel reactors 150 and 170 may comprise a plurality of Fischer-Tropsch process microchannels and heat exchange channels stacked one above the other or positioned side-by-side. The Fischer-Tropsch microchannel reactors 150 and 170 may be in the form of cubic blocks. Each of these cubic blocks may have a length, width and height, the length being in the range from about 10 to about 1000 cm, and in one embodiment in the range from about 20 to about 200 cm. The width may be in the range from about 10 to about 1000 cm, and in one embodiment in the range from about 20 to about 200 cm. The height may be in the range from about 10 to about 1000 cm, and in one embodiment in the range from about 20 to about 200 cm.

The Fischer-Tropsch microchannel reactors 150 and 170 may each comprise a plurality of repeating units, each of which includes one or more Fischer-Tropsch process microchannels and one or more heat exchange channels. The repeating units that may be used include repeating units 500, 500A, 500B, and 500C illustrated in FIGS. 24-27, respectively. The Fischer-Tropsch microchannel reactors 150 and 170 may comprise from about 1 to about 1000 of the repeating units 500, 500A, 500B or 500D, and in one embodiment from about 10 to about 500 of such repeating units. Although the catalyst illustrated in each of the repeating units 500-500D is in the form of a fixed bed of particulate solids, it is to be understood that the catalyst may be in any form including the various catalyst structures described below.

Figure 24:
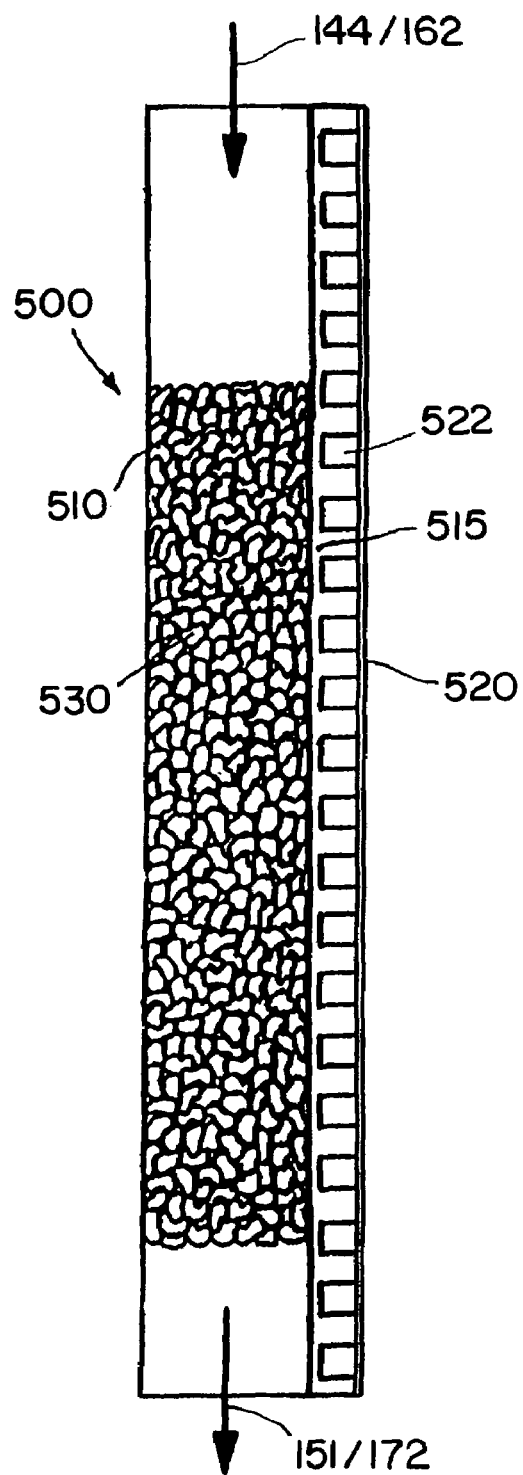

Repeating unit 500 is illustrated in FIG. 24. Referring to FIG. 24, Fischer-Tropsch process microchannel 510 is positioned adjacent to heat exchange layer 520 which contains heat exchange channels 522. The heat exchange channels 522 may be microchannels. A common wall 515 separates the process microchannel 510 from the heat exchange layer 520. A catalyst 530 is packed into the process microchannel 510. The catalyst bed 530 may be referred to as a reaction zone. In one embodiment, the length of heat exchange layer 520 is up to about 200% of the length of the reaction zone, and in one embodiment the length of heat exchange layer 520 is from about 50 to about 175% of the length of the reaction zone, and in one embodiment the length of the heat exchange layer 520 is from about 75 to about 150% of the length of the reaction zone. The reactant composition (i.e., second or third intermediate product) flows into the packed bed of catalyst 530 in process microchannel 510 in the direction indicated by arrow 144/162, contacts catalyst 530 and reacts to form the desired product. The product (i.e., third intermediate product or final product) flows out of the process microchannel 510 as indicated by arrow 151/172. Heat exchange fluid flows through the heat exchange channels 522 in a direction that is cross-current to the flow of reactant composition and product in the process microchannel 510. The Fischer-Tropsch reaction conducted in the process microchannel 510 is exothermic and the heat exchange fluid provides cooling for the reaction.

Figure 25:
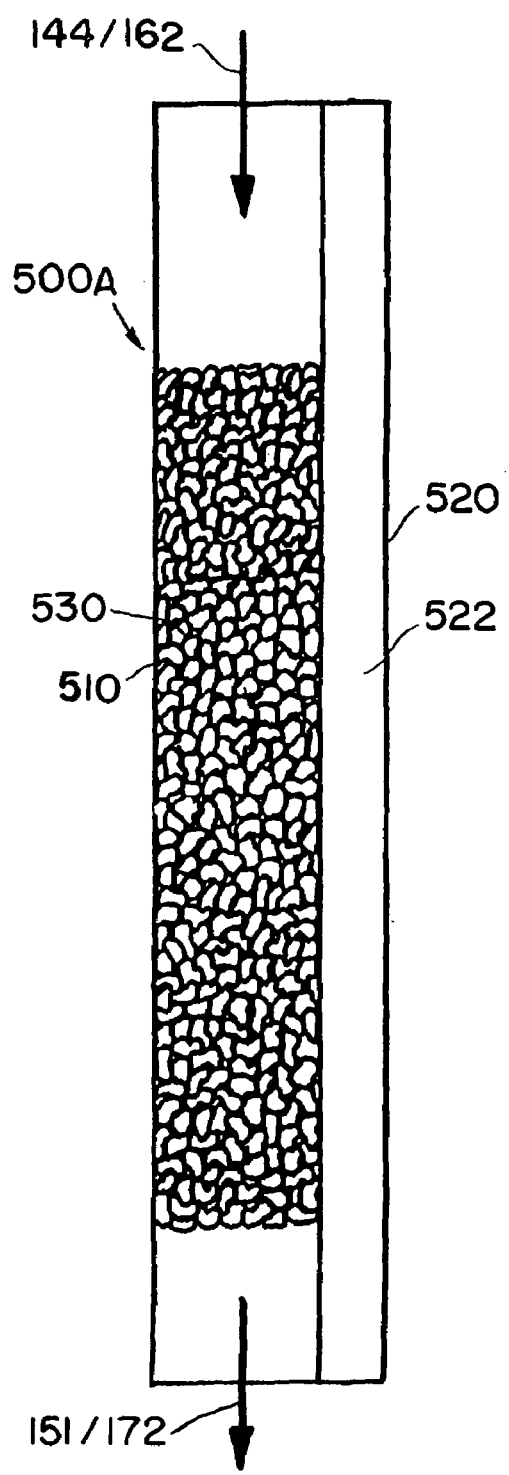

Alternatively, the process microchannels and heat exchange channels may be aligned as provided for in repeating unit 500A. Repeating unit 500A, which is illustrated in FIG. 25, is identical to the repeating unit 500 illustrated in FIG. 25 with the exception that the heat exchange channels 522 are rotated 900 and the heat exchange fluid flowing through the heat exchange channels 522 flows in a direction that may be countercurrent to the flow of reactant and product in the process microchannel 510 or cocurrent relative to the direction of reactant and product in the process microchannel 510.

Alternatively, the process microchannels and heat exchange channels may be aligned as provided for in repeating unit 500B. Repeating unit 500B is illustrated in FIG. 26. Referring to FIG. 26, process microchannel 510*a* is positioned adjacent to heat exchange layer 521. Heat exchange layer 521 contains a plurality of heat exchange channels 522 aligned in parallel relative to one another, each heat exchange channel 522 extending lengthwise at a right angle relative to the lengthwise direction of the process microchannel 510*a*. Heat exchange layer 521 is shorter in length than process microchannel 510*a*. Heat exchange layer 521 extends lengthwise from or near the entrance 513 to the reaction zone 514 of process microchannel 510A to a point 517 along the length of the process microchannel 510*a* short of the exit 516 of the reaction zone 514. In one embodiment, the length of heat exchange layer 521 is up to about 90% of the length of the reaction zone 514, and in one embodiment the length of heat exchange layer 521 is from about 5 to about 90% of the length of the reaction zone 514, and in one embodiment the length of the heat exchange layer 521 is from about 5 to about 50% of the length of the reaction zone 514, and in one embodiment the length of the heat exchange layer 521 is from about 50% to about 90% of the length of the reaction zone 514. The width of the process microchannel 510*a* is expanded or extended in the area downstream of the end 517 of the heat exchange layer 521. Alternatively, the heat exchange layer 521 may be positioned near the outlet 516 of the reaction zone 514.

Alternatively, the process microchannels and heat exchange channels may be aligned as provided for in repeating unit 500C. Repeating unit 500C, which is illustrated in FIG. 27, is identical to the repeating unit 500B illustrated in FIG. 26 with the exception that repeating unit 500C includes heat exchange layer 521*a* adjacent to process microchannel 510*a* on the opposite side of the process microchannel 510*a* from the heat exchange layer 521. Heat exchange layer 521*a* contains a plurality of parallel heat exchange channels 522*a* which are the same as or similar in size and design to the heat exchange channels 522 discussed above. Heat exchange layer 521*a* extends lengthwise from or near the entrance 513 to the reaction zone 514 of process microchannel 510*a* to a point 523 along the length of process microchannel 510*a* short of the end 517 of heat exchange layer 521. The length of the heat exchange layer 521*a* may be up to about 90% of the length of the heat exchange layer 521, and in one embodiment the length of the heat exchange layer 521*a* may be from about 5 to about 90% of the length of the heat exchange layer 521, and in one embodiment the length of the heat exchange layer 521*a* may be from about 5 to about 50% of the length of the heat exchange layer 521, and in one embodiment the length of the heat exchange layer 521*a* may be from about 50% to about 90% of the length of the heat exchange layer 521. The width of the process microchannel 132*a* is expanded in the areas downstream of the ends 517 and 523 of the heat exchange layers 521 and 521*a*, respectively. Alternatively, the heat exchange layers 521 and 521*a* may be positioned near the outlet 516 of the reaction zone 514.

In the design and operation of a Fischer-Tropsch microchannel reactor it may be advantageous to provide a tailored heat exchange profile along the length of the process microchannels in order to optimize the reaction. This may be accomplished by matching the local release of heat given off by the Fischer-Tropsch reaction conducted in the process microchannels with heat removal or cooling provided by heat exchange fluid in heat exchange channels in the microchannel reactor. The extent of the Fischer-Tropsch reaction and the consequent heat release provided by the reaction may be higher in the front or upstream sections of the reaction zones in the process microchannels as compared to the back or downstream sections of the reaction zones. Consequently, the matching cooling requirements may be higher in the upstream section of the reaction zones as compared to the downstream sections of the reaction zones. Tailored heat exchange may be accomplished by providing more heat exchange or cooling channels, and consequently the flow of more heat exchange or cooling fluid, in thermal contact with upstream sections of the reaction zones in the process microchannels as compared to the downstream sections of the reaction zones. This is shown in FIGS. 26 and 27 wherein the heat exchange layers 521 and 521*a* extend lengthwise from the entrance 513 to the reaction zone 514 along the length of the process microchannels 500B and 500C to points 517 and 523 short of the exit 516 from the reaction zone 514. Alternatively or additionally, a tailored heat exchange profile may be provided by varying the flow rate of heat exchange fluid in the heat exchange channels. In areas where additional heat exchange or cooling is desired, the flow rate of the heat exchange fluid may be increased as compared to areas where less heat exchange or cooling is required. For example, a higher rate of flow of heat exchange fluid may be advantageous in the heat exchange channels in thermal contact with the upstream sections of the reaction zones in the process microchannels as compared to the heat exchange channels in thermal contact with the downstream sections of the reaction zones. Thus, in referring to FIG. 24, for example, a higher rate of flow in the heat exchange channels 522 near the inlet to the process microchannel 500 may be used as compared to the heat exchange channels 522 near the outlet of the process microchannel where the flow rate may be less. Heat transfer from the process microchannels to the heat exchange channels may be designed for optimum performance by selecting optimum heat exchange channel dimensions and/or the rate of flow of heat exchange fluid per individual or groups of heat exchange channels. Additional design alternatives for tailoring heat exchange may relate to the selection and design of the Fischer-Tropsch catalyst (such as, particle size, catalyst formulation, packing density, use of a graded catalyst, or other chemical or physical characteristics) at specific locations within the process microchannels. These design alternatives may impact both heat release from the process microchannels as well as heat transfer to the heat exchange fluid. Temperature differentials between the process microchannels and the heat exchange channels, which may provide the driving force for heat transfer, may vary along the length of the process microchannels.

The combustion channels and staged addition channels in the SMR microchannel reactor 130, and the heat exchange channels in the Fischer-Tropsch microchannel reactors 150 and 170 may be microchannels or they may have dimensions that would characterize them as not being microchannels. For example, these channels may have internal heights or widths up to about 50 mm, and in one embodiment up to about 25 mm, and in one embodiment up to about 15 mm. The SMR process microchannels and Fischer-Tropsch process microchannels are microchannels. Each of the microchannels may have a cross-section having any shape, for example, a square, rectangle, circle, semi-circle, etc. Each microchannel may have an internal height of up to about 10 mm, and in one embodiment up to about 5 mm, and in one embodiment up to about 2 mm, and in one embodiment up to about 2 mm. In one embodiment, the height may be in the range of about 0.05 to about 10 mm, and in one embodiment from about 0.05 to about 5 mm, and in one embodiment from about 0.05 to about 2 mm, and in one embodiment about 0.05 to about 1.5 mm. The width of each of these microchannels may be of any dimension, for example, up to about 3 meters, and in one embodiment from about 0.01 to about 3 meters, and in one embodiment about 0.1 to about 3 meters. The length of each microchannel may be of any dimension, for example, up to about 10 meters, and in one embodiment about 0.2 to about 10 meters, and in one embodiment from about 0.2 to about 6 meters, and in one embodiment from 0.2 to about 3 meters.

The SMR process microchannels, combustion channels and staged addition channels in the SMR microchannel reactor 150, and the Fischer-Tropsch process microchannels and heat exchange channels in the Fischer-Tropsch microchannel reactors 150 and 170 may have rectangular cross sections and be aligned in side-by-side vertically oriented planes or horizontally oriented stacked planes. These planes may be tilted at an inclined angle from the horizontal. These configurations may be referred to as parallel plate configurations. These channels may be arranged in modularized compact units for scale-up.

The SMR microchannel reactor 130 and the Fischer-Tropsch microchannel reactors 150 and 170 may be made of any material that provides sufficient strength, dimensional stability and heat transfer characteristics to permit operation of the inventive process. These materials may include steel; aluminum, titanium; nickel; platinum; rhodium; copper; chromium; brass; alloys of any of the foregoing metals; quartz; silicon; or a combination of two or more thereof.

The SMR microchannel reactor 130 and the Fischer-Tropsch microchannel reactors 150 and 170 may be fabricated using known techniques including wire electrodischarge machining, conventional machining, laser cutting, photochemical machining, electrochemical machining, molding, water jet, stamping, etching (for example, chemical, photochemical or plasma etching) and combinations thereof.

The SMR microchannel reactor 130 and the Fischer-Tropsch microchannel reactors 150 and 170 may be constructed by forming shims with portions removed that allow flow passage. A stack of shims may be assembled via diffusion bonding, laser welding, diffusion brazing, and similar methods to form an integrated device. The microchannel reactors may be assembled using a combination of shims or laminae and partial sheets or strips. In this method, the channels or void areas may be formed by assembling strips or partial sheets to reduce the amount of material required.

Figure 40:
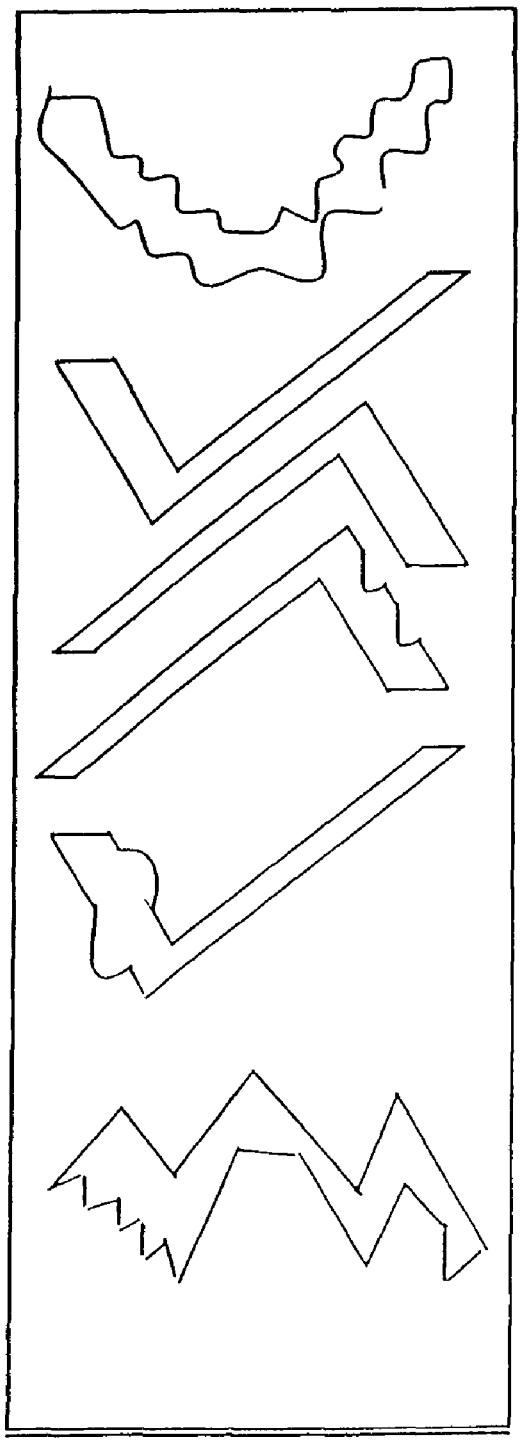
FIGS. 40 and 41 are schematic illustrations of surface features that may be used in the channels employed in the SMR microchannel reactor and Fischer-Tropsch microchannel reactors used in the inventive process.
Figure 41:
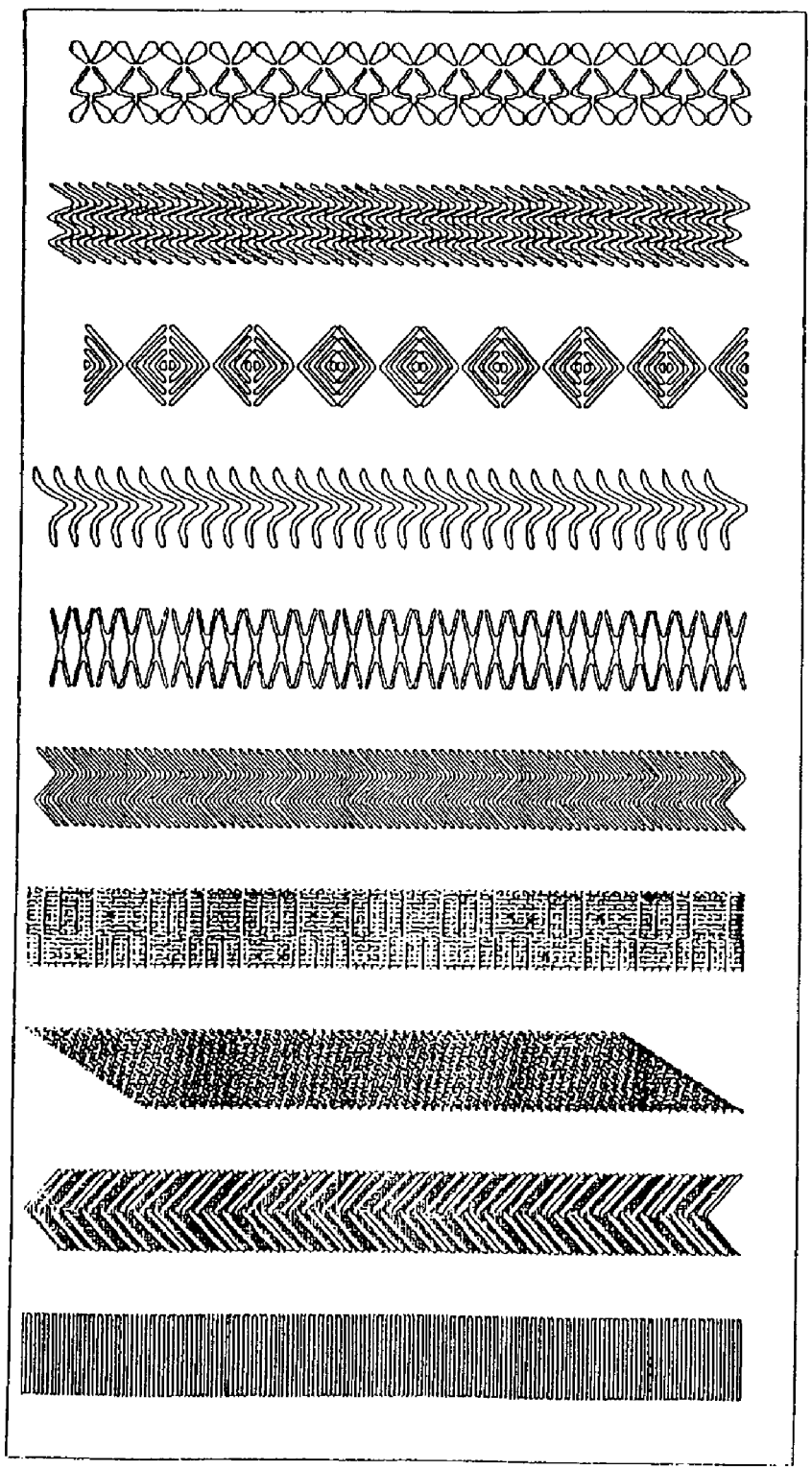

The SMR process microchannels, Fischer-Tropsch process microchannels and/or combustion channels may contain one or more surface features in the form of depressions in and/or projections from one or more interior walls of the process microchannels. Examples are shown in FIGS. 40 and 41. The heat exchange channels in the Fischer-Tropsch microchannel reactors 150 and 170 may also contain such surface features. The surface features may be used to disrupt the flow of fluid flowing in the channels. These disruptions in flow may enhance mixing and/or heat transfer. The surface features may be in the form of patterned surfaces. The SMR and/or Fischer-Tropsch microchannel reactors may be made by laminating a plurality of shims together. One or both major surfaces of the shims may contain surface features. Alternatively, the SMR and/or Fischer-Tropsch microchannel reactor may be assembled using some sheets or shims and some strips, or partial sheets to reduce the total amount of metal required to construct the device. In one embodiment, a shim containing surface features may be paired (on opposite sides of a microchannel) with another shim containing surface features. Pairing may create better mixing or heat transfer enhancement as compared to channels with surface features on only one major surface. In one embodiment, the patterning may comprise diagonal recesses that are disposed over substantially the entire width of a microchannel surface. The patterned surface feature area of a wall may occupy part of or the entire length of a microchannel surface. In one embodiment, surface features may be positioned over at least about 10%, and in one embodiment at least about 20%, and in one embodiment at least about 50%, and in one embodiment at least about 80% of the length of a channel surface. Each diagonal recesses may comprise one or more angles relative to the flow direction. Successive recessed surface features may comprise similar or alternate angles relative to other recessed surface features.

In embodiments wherein surface features may be positioned on or in more than one microchannel wall, the surface features on or in one wall may have the same (or similar) pattern as found on a second wall, but rotated about the centerline of the main channel mean bulk flow direction. In embodiments wherein surface features may be on or in opposite walls, the surface features on or in one wall may be approximately mirror images of the features on the opposite wall. In embodiments wherein surface features are on or in more than one wall, the surface features on or in one wall may be the same (or similar) pattern as found on a second wall, but rotated about an axis which is orthogonal to the main channel mean bulk flow direction. In other words, the surface features may be flipped 180 degrees relative to the main channel mean bulk flow direction and rotated about the centerline of the main channel mean bulk flow. The surface features on or in opposing or adjacent walls may or may not be aligned directly with one another, but may be repeated continuously along the wall for at least part of the length of the wall. Surface features may be positioned on three or more interior surfaces of a channel. For the case of channel geometries with three or fewer sides, such as triangular, oval, elliptical, circular, and the like, the surface features may cover from about 20% to about 100% of the perimeter of the microchannel.

In one embodiment, a patterned surface may comprise multiple patterns stacked on top of each other. A pattern or array of holes may be placed adjacent to a heat transfer wall and a second pattern, such as a diagonal array of surface features may be stacked on top and adjacent to an open channel for flow. A sheet adjacent to an open gap may have patterning through the thickness of the sheet such that flow may pass through the sheet into an underlying pattern. Flow may occur as a result of advection or diffusion. As an example, a first sheet with an array of through holes may be placed over a heat transfer wall, and a second sheet with an array of diagonal through slots may be positioned on the first sheet. This may create more surface area for adhering a catalyst. In one embodiment, the pattern may be repeated on at least one other wall of the process microchannel. The patterns may be offset on opposing walls. The innermost patterned surfaces (those surfaces bounding a flow channel) may contain a pattern such as a diagonal array. The diagonal arrays may be oriented both "with" the direction of flow or one side oriented with the direction of flow and the opposing side oriented "against" the direction of flow. By varying surface features on opposing walls, different flow fields and degrees of vorticity may be created in the fluid that travels down the center and open gap.

The surface features may be oriented at angles relative to the direction of flow through the channels. The surface features may be aligned at an angle from about 1° to about 89°, and in one embodiment from about 30° to about 75°, relative to the direction of flow. The angle of orientation may be an oblique angle. The angled surface features may be aligned toward the direction of flow or against the direction of flow. The flow of fluid in contact with the surface features may force some of the fluid into depressions in the surface features, while other fluids may flow above the surface features. Flow within the surface features may conform with the surface feature and be at an angle to the direction of the bulk flow in the channel. As fluid exits the surface features it may exert momentum in the x and y direction for an x,y,z coordinate system wherein the bulk flow is in the z direction. This may result in a churning or rotation in the flow of the fluids. This pattern may be helpful for mixing.

Two or more surface feature regions within the process microchannels may be placed in series such that mixing of the fluids may be accomplished using a first surface feature region, followed by at least one second surface feature region where a different flow pattern may be used.

The surface features may have two or more layers stacked on top of each other or intertwined in a three-dimensional pattern. The pattern in each discrete layer may be the same or different. Flow may rotate or advect in each layer or only in one layer. Sub-layers, which may not be adjacent to the bulk flow path of the channel, may be used to create additional surface area. The flow may rotate in the first level of surface features and diffuse molecularly into the second or more sublayers to promote reaction. Three-dimensional surface features may be made via metal casting, photochemical machining, laser cutting, etching, ablation, or other processes where varying patterns may be broken into discrete planes as if stacked on top of one another. Three-dimensional surface features may be provided adjacent to the bulk flow path within the microchannel where the surface features have different depths, shapes, and/or locations accompanied by sub-features with patterns of varying depths, shapes and/or locations.

An example of a three-dimensional surface feature structure may comprise recessed oblique angles or chevrons at the interface adjacent the bulk flow path of the microchannel. Beneath the chevrons there may be a series of three-dimensional structures that connect to the surface features adjacent to the bulk flow path but are made from structures of assorted shapes, depths, and/or locations. It may be further advantageous to provide sublayer passages that do not directly fall beneath an open surface feature that is adjacent to the bulk flow path within the microchannel but rather connect through one or more tortuous two-dimensional or three-dimensional passages. This approach may be advantageous for creating tailored residence time distributions in the microchannels, where it may be desirable to have a wider versus more narrow residence time distribution.

The length and width of a surface feature may be defined in the same way as the length and width of a channel. The depth may be the distance which the surface feature sinks into or rises above the microchannel surface. The depth of the surface features may correspond to the direction of stacking a stacked and bonded microchannel device with surface features formed on or in the sheet surfaces. The dimensions for the surface features may refer the maximum dimension of a surface feature; for example the depth of a rounded groove may refer to the maximum depth, that is, the depth at the bottom of the groove.

The surface features may have depths that are up to about 5 mm, and in one embodiment up to about 2 mm, and in one embodiment in the range from about 0.01 to about 5 mm, and in one embodiment in the range from about 0.01 to about 2 mm, and in one embodiment in the range from about 0.01 mm to about 1 mm. The width of the surface features may be sufficient to nearly span the microchannel width (for example, herringbone designs), but in one embodiment (such as fill features) may span about 60% or less of the width of the microchannel, and in one embodiment about 50% or less, and in one embodiment about 40% or less, and in one embodiment from about 0.1% to about 60% of the microchannel width, and in one embodiment from about 0.1% to about 50% of the microchannel width, and in one embodiment from about 0.1% to about 40% of the microchannel width. The width of the surface features may be in the range from about 0.05 mm to about 100 cm, and in one embodiment in the range from about 0.5 mm to about 5 cm, and in one embodiment in the range from about 1 to about 2 cm.

Multiple surface features or regions of surface features may be included within a channel, including surface features that recess at different depths into one or more microchannel walls. The spacing between recesses may be in the range from about 0.01 mm to about 10 mm, and in one embodiment in the range from about 0.1 to about 1 mm. The surface features may be present throughout the entire length of a microchannel or in portions or regions of the channel. The portion or region having surface features may be intermittent so as to promote a desired mixing or unit operation (for example, separation, cooling, etc.) in tailored zones. For example, a one-centimeter section of a channel may have a tightly spaced array of surface features, followed by four centimeters of a flat channel without surface features, followed by a two-centimeter section of loosely spaced surface features. The term "loosely spaced surface features" may be used to refer to surface features with a pitch or feature to feature distance that is more than about five times the width of the surface feature.

The surface features may be positioned in one or more surface feature regions that extend substantially over the entire axial length of a channel. In one embodiment, a channel may have surface features extending over about 50% or less of its axial length, and in one embodiment over about 20% or less of its axial length. In one embodiment, the surface features may extend over about 10% to about 100% of the axial length of the channel, and in one embodiment from about 20% to about 90%, and in one embodiment from about 30% to about 80%, and in one embodiment from about 40% to about 60% of the axial length of a channel.

Each surface feature leg may be at an oblique angle relative to the bulk flow direction. The feature span length or span may be defined as being normal to the feature orientation. As an example, one surface feature may be a diagonal depression at a 45 degree angle relative to a plane orthogonal to the mean direction of bulk flow in the main channel with a 0.38 mm opening or span or feature span length and a feature run length of 5.6 mm. The run length may be the distance from one end to the other end of the surface feature in the longest direction, whereas the span or feature span length may be in the shortest direction (that is not depth). The surface feature depth may be the distance way from the main channel. For surface features with a nonuniform width (span), the span may be the average span averaged over the run length.

A surface feature may comprise a recess or a protrusion based on the projected area at the base of the surface feature or the top of the surface feature. If the area at the top of the surface feature is the same or exceeds the area at the base of the surface feature, then the surface feature may be considered to be recessed. If the area at the base of the surface feature exceeds the area at the top of the surface feature, then it may be considered to be protruded. For this description, the surface features may be described as recessed although it is to be understood that by changing the aspect ratio of the surface feature it may be alternatively defined as a protrusion. For a process microchannel defined by walls that intersect only the tops of the surface features, especially for a flat channel, all surface features may be defined as recessed and it is to be understood that a similar channel could be created by protruding surface features from the base of a channel with a cross section that includes the base of the surface features.

The SMR and/or Fischer-Tropsch process microchannel and/or combustion channel may have at least about 20%, and in one embodiment at least about 35%, and in one embodiment at least about 50%, and in one embodiment at least about 70%, and in one embodiment at least about 90% of the interior surface of the channel (measured in cross-section perpendicular to length; i.e., perpendicular to the direction of net flow through the channel) that contains surface features. The surface features may cover a continuous stretch of at least about 1 cm, and in one embodiment at least about 5 cm. In the case of an enclosed channel, the percentage of surface feature coverage may be the portion of a cross-section covered with surface features as compared to an enclosed channel that extends uniformly from either the base or the top of the surface feature or a constant value in-between. The latter may be a flat channel. For example, if a channel has patterned top and bottom surfaces that are each 0.9 cm across (wide) and unpatterned side walls that are 0.1 cm high, then 90% of the surface of the channel would contain surface features.

The SMR and/or Fischer-Tropsch process microchannel may be enclosed on all sides, and in one embodiment the channel may have a generally square or rectangular cross-section (in the case of rectangular channel, surface feature patterning may be positioned on both major faces). For a generally square or rectangular channel, the channel may be enclosed on only two or three sides and only the two or three walled sides may be used in the above described calculation of percentage surface features. In one embodiment, the surface features may be positioned on cylindrical channels with either constant or varying cross section in the axial direction.

Each of the surface feature patterns may be repeated along one face of the channel, with variable or regular spacing between the surface features in the channel bulk flow direction. Some embodiments may have only a single leg to each surface feature, while other embodiments may have multiple legs (two, three, or more). For a wide-width channel, multiple surface features or columns of repeated surface features may be placed adjacent to one another across the width of the channel. For each of the surface feature patterns, the feature depth, width, span, and spacing may be variable or constant as the pattern is repeated along the bulk flow direction in the main channel. Also, surface feature geometries having an apex connecting two legs at different angles may have alternate embodiments in which the surface feature legs may not be connected at the apex.

The apertures in the apertured section 338 of the combustion channel 330 in the SMR microchannel reactor 130 may be of sufficient size to permit the flow of oxygen or source of oxygen through the apertured section 338. The apertures may be referred to as pores. The apertured section 338 may have thicknesses in the range from about 0.01 to about 10 mm, and in one embodiment about 0.01 to about 5 mm, and in one embodiment about 0.01 to about 2 mm. The apertures may have average diameters in the range up to about 5000 microns, and in one embodiment up to about 1000 microns, and in one embodiment up to about 500 microns, and in one embodiment in the range from about 10 to about 500 microns.

The apertured section 338 may be constructed of any material that provides sufficient strength and dimensional stability to permit the operation of the process. These materials may include: steel (e.g., stainless steel, carbon steel, and the like); monel; inconel; aluminum; titanium; nickel; platinum; rhodium; copper; chromium; brass; alloys of any of the foregoing metals; or a combination of two or more thereof. The apertures may be formed using known techniques such as laser drilling, microelectro machining system (MEMS), lithography electrodeposition and molding (LIGA), electrical sparkling, or electrochemical or photochemical etching.

The SMR catalyst may comprise any SMR catalyst. The SMR catalyst may comprise La, Pt, Fe, Ni, Ru, Rh, In, Ir, W, and/or an oxide thereof, or a mixture of two or more thereof. In one embodiment, the SMR catalyst may further comprise MgO, $Al_2O_3$, $SiO_2$, $TiO_2$, or a mixture of two or more thereof. In one embodiment, the SMR catalyst may comprise 13.8%-Rh/6%-MgO/$Al_2O_3$ on a metal felt of FeCrAlY alloy prepared using wash coating of the FeCrAlY felt with a thickness of about 0.25 mm and about 90% porosity. In one embodiment, the SMR catalyst may be derived from an aqueous solution of $La(NO_3)_3 \cdot 6H_2O$. In one embodiment, the SMR catalyst may be derived from a solution of $Pt(NH_3)_4(NO_3)_2$. On one embodiment, the SMR catalyst may be derived from solutions of $La(NO_3)$ and $Rh(NO_3)$ which are deposited on one or more layers of $Al_2O_3$.

The combustion catalyst may comprise Pd, Pr, Pt, Rh, Ni, Cu, and/or an oxide thereof, or a mixture of two or more thereof. In one embodiment, the combustion catalyst may further comprise $Al_2O_3$, $SiO_2$, MgO, or a mixture of two or more thereof. In one embodiment, the combustion catalyst may be derived from a solution of $Pd(NO_3)_2$ which is deposited on a layer of $Al_2O_3$. In one embodiment, the combustion catalyst may comprise a layer of Pr and Pd using precursors in the form of nitrates, and a layer of Pt using a solution of $Pt(NH_3)_4(NO_3)_2$.

The Fischer-Tropsch catalyst may comprise any Fischer-Tropsch catalyst. The Fischer-Tropsch catalyst may comprise at least one catalytically active metal or oxide thereof. In one embodiment, the Fischer-Tropsch catalyst may further comprises a catalyst support. In one embodiment, the Fischer-Tropsch catalyst may further comprises at least one promoter. The catalytically active metal may comprise Co, Fe, Ni, Ru, Re, Os, or a combination of two or more thereof. The support material may comprise alumina, zirconia, silica, aluminum fluoride, fluorided alumina, bentonite, ceria, zinc oxide, silica-alumina, silicon carbide, a molecular sieve, or a combination of two or more thereof. The support material may comprise a refractory oxide. The promoter may comprise a Group IA, IIA, IIIB or IVB metal or oxide thereof, a lanthanide metal or metal oxide, or an actinide metal or metal oxide. In one embodiment, the promoter is Li, B, Na, K, Rb, Cs, Mg, Ca, Sr, Ba, Sc, Y, La, Ac, Ti, Zr, La, Ac, Ce or Th, or an oxide thereof, or a mixture of two or more thereof. Examples of catalysts that may be used include those disclosed in U.S. Pat. Nos. 4,585,798; 5,036,032; 5,733,839; 6,075,062; 6,136,868; 6,262,131B1; 6,353,035B2; 6,368,997B2; 6,476,085B2; 6,451,864B1; 6,490,880B1; 6,537,945B2; 6,558,634B1; and U.S. Patent Publications 2002/0028853A1; 2002/0188031A1; and 2003/0105171A1; these patents and patent publications being incorporated herein by reference for their disclosures of Fischer-Tropsch catalysts and methods for preparing such catalysts.

In one embodiment, the Fischer-Tropsch catalyst may comprise Co, and optionally a co-catalyst and/or promoter, supported on a support wherein the Co loading is at least about 5% by weight, and in one embodiment at least about 10% by weight, and in one embodiment at least about 15% by weight, and in one embodiment at least about 20% by weight, and in one embodiment at least about 25% by weight, and in one embodiment at least about 28% by weight, and in one embodiment at least about 30% by weight, and in one embodiment at least about 32% by weight, and in one embodiment at least about 35% by weight, and in one embodiment at least about 40% by weight. In one embodiment, the Co loading may be from about 5 to about 50% by weight, and in one embodiment about 10 to about 50% by weight, and in one embodiment about 15 to about 50% by weight, and in one embodiment about 20 to about 50% by weight, and in one embodiment about 25 to about 50% by weight, and in one embodiment about 28 to about 50% by weight, and in one embodiment about 30 to about 50% by weight, and in one embodiment about 32 to about 50% by weight. The metal dispersion for the catalytically active metal (i.e., Co, and optionally co-catalyst and/or promoter) of the catalyst may range from about 1 to about 30%, and in one embodiment about 2 to about 20%, and in one embodiment about 3 to about 20%. The co-catalyst may be Fe, Ni, Ru, Re, Os, or an oxide thereof, or a mixture of two or more thereof. The promoter may be a Group IA, IIA, IIIB or IVB metal or oxide thereof, a lanthanide metal or metal oxide, or an actinide metal or metal oxide. In one embodiment, the promoter is Li, B, Na, K, Rb, Cs, Mg, Ca, Sr, Ba, Sc, Y, La, Ac, Ti, Zr, La, Ac, Ce or Th, or an oxide thereof, or a mixture of two or more thereof. The co-catalyst may be employed at a concentration of up to about 10% by weight based on the total weight of the catalyst (i.e., the weight of catalyst, co-catalyst, promoter and support), and in one embodiment about 0.1 to about 5% by weight. The promoter may be employed at a concentration of up to about 10% by weight based on the total weight of the catalyst, and in one embodiment about 0.1 to about 5% by weight.

In one embodiment, the Fischer-Tropsch catalyst may comprise Co supported by alumina; the loading of Co being at least about 25% by weight, and in one embodiment at least about 28% by weight, and in one embodiment at least about 30% by weight, and in one embodiment at least about 32% by weight; and the Co dispersion is at least about 3%, and in one embodiment at least about 5%, and in one embodiment at least about 7%.

In one embodiment, the Fischer-Tropsch catalyst may comprise a composition represented by the formula $$CoM_a^1 M_b^2 O_x$$

wherein: $M^1$ is Fe, Ni, Ru, Re, Os or a mixture thereof, and in one embodiment $M^1$ is Ru or Re or a mixture thereof; $M^2$ is Li, B, Na, K, Rb, Cs, Mg, Ca, Sr, Ba, Sc, Y, La, Ac, Ti, Zr, La, Ac, Ce or Th, or a mixture of two or more thereof; a is a number in the range of zero to about 0.5, and in one embodiment zero to about 0.2; b is a number in the range of zero to about 0.5, and in one embodiment zero to about 0.1; and x is the number of oxygens needed to fulfill the valency requirements of the elements present.

In one embodiment, the Fischer-Tropsch catalyst may be made using multiple impregnation steps wherein intercalcination steps are conducted between each impregnation step. The use of such a procedure, at least in one embodiment, allows for the formation of catalysts with levels of loading of catalytic metal and optionally promoter that are higher than with procedures wherein such intercalcination steps are not employed. In one embodiment, a catalytic metal (e.g., Co) and optionally co-catalyst (e.g., Re or Ru) and/or promoter is loaded on a support (e.g., $Al_2O_3$) using the following sequence of steps: (A) impregnating the support with a composition comprising a catalytic metal and optionally a co-catalyst and/or promoter to provide an intermediate catalytic product; (B) calcining the intermediate catalytic product formed in step (A); (C) impregnating the calcined intermediate product formed in (B) with another composition comprising a catalytic metal and optionally a co-catalyst and/or promoter, to provide another intermediate catalytic product; and (D) calcining the another intermediate catalytic product formed in step (C) to provide the desired catalyst product. The catalytic metal and optional co-catalyst and/or promoter may be impregnated on the support using an incipient wetness impregnation process. Steps (C) and (D) may be repeated one or more additional times until the desired loading of catalytic metal, and optional co-catalyst and/or promoter, is achieved. The composition comprising the catalytic metal may be a nitrate solution of the metal, for example, a cobalt nitrate solution. The process may be continued until the catalytic metal (i.e., Co) achieves a loading level of about 20% by weight or more, and in one embodiment about 25% by weight or more, and in one embodiment about 28% by weight or more, and in one embodiment about 30% by weight or more, and in one embodiment about 32% by weight or more, and in one embodiment about 35% by weight or more, and in one embodiment about 37% by weight or more, and in one embodiment about 40% by weight or more. Each of the calcination steps may comprise heating the catalyst at a temperature in the range of about 100° C. to about 500° C., and in one embodiment about 100° C. to about 400° C., and in one embodiment about 250 to about 350° C. for about 0.5 to about 100 hours, and in one embodiment about 0.5 to about 24 hours, and in one embodiment about 2 to about 3 hours. The temperature may be ramped to the calcination temperature at a rate of about 1-20° C./min. The calcination steps may be preceded by drying steps wherein the catalyst is dried at a temperature of about 75 to about 200° C., and in one embodiment about 75° C. to about 150° C., for about 0.5 to about 100 hours, and in one embodiment about 0.5 to about 24 hours. In one embodiment, the catalyst may be dried for about 12 hours at about 90° C. and then at about 110-120° C. for about 1-1.5 hours, the temperature being ramped from 90° C. to 110-120° C. at a rate of about 0.5-1° C./min.

The SMR, Fischer-Tropsch and/or combustion catalyst may be positioned in a single reaction zone or they may be positioned in more than one reaction zone in the process microchannels or combustion channel. The same or different catalyst may be used in each reaction zone. The catalyst may be a graded catalyst. In each reaction zone the length of one or more heat exchange zone(s) adjacent to or in thermal contact with the reaction zone may vary in their dimensions. For example, in one embodiment, the length of the one or more of these heat exchange zones may be less than about 50% of the length of each reaction zone. Alternatively, the one or more heat exchange zones may have lengths that are more than about 50% of the length of each reaction zone up to about 100% of the length of each reaction zone.

The SMR catalyst and/or Fischer-Tropsch catalyst may have any size and geometric configuration that fits within the process microchannels. The catalyst may be in the form of particulate solids (e.g., pellets, powder, fibers, and the like) having a median particle diameter of about 1 to about 1000 μm (microns), and in one embodiment about 10 to about 500 μm, and in one embodiment about 25 to about 250 μm. In one embodiment, the catalyst is in the form of a fixed bed of particulate solids.

In one embodiment, the SMR catalyst, combustion catalyst and/or Fischer-Tropsch catalyst may be in the form of a fixed bed of particulate solids (as shown in FIGS. 24-27 and 30). The median particle diameter of the particulate solids may be small, and the length of each process microchannel may be relatively short. The median particle diameter may be in the range of about 1 to about 1000 μm, and in one embodiment about 10 to about 500 μm, and the length of each process microchannel may be in the range of up to about 500 cm, and in one embodiment about 10 to about 500 cm, and in one embodiment about 50 to about 300 cm.

Figure 30:
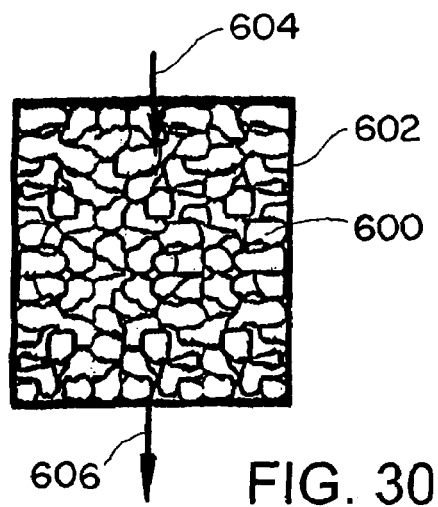
FIGS. 30-35 are schematic illustrations of catalysts or catalyst supports that may be used in the SMR process microchannels, combustion channels, Fischer-Tropsch process microchannels, and/or second Fischer-Tropsch process microchannels.

Referring to FIG. 30, the catalyst 600, which is in the form of a bed of particulate solids, is contained in process microchannel 602. Reactants enter the fixed bed as indicated by arrow 604, undergo reaction, and product flows out of the fixed bed as indicated by arrow 606.

The SMR catalyst, combustion catalyst and/or Fischer-Tropsch catalyst may be supported on a porous support structure such as a foam, felt, wad or a combination thereof. The term "foam" is used herein to refer to a structure with continuous walls defining pores throughout the structure. The term "felt" is used herein to refer to a structure of fibers with interstitial spaces therebetween. The term "wad" is used herein to refer to a structure of tangled strands, like steel wool. The catalyst may be supported on a honeycomb structure. The catalyst may be supported on a flow-by support structure such as a felt with an adjacent gap, a foam with an adjacent gap, a fin structure with gaps, a washcoat on any inserted substrate, or a gauze that is parallel to the flow direction with a corresponding gap for flow.

Figure 31:
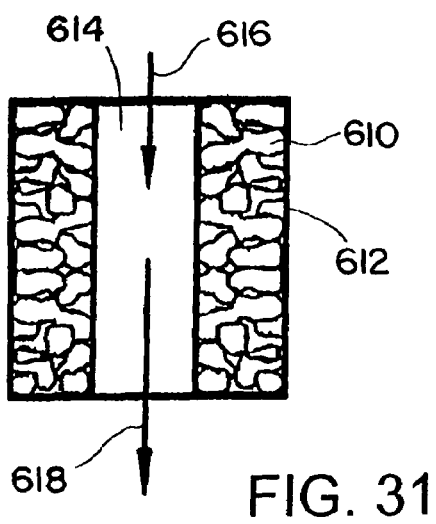

An example of a flow-by structure is illustrated in FIG. 31. In FIG. 31, the catalyst 610 is contained within process microchannel 612. An open passage way 614 permits the flow of fluid through the process microchannel 612 as indicated by arrows 616 and 618. The reactants contact the catalyst and undergo reaction to form the product.

Figure 32:
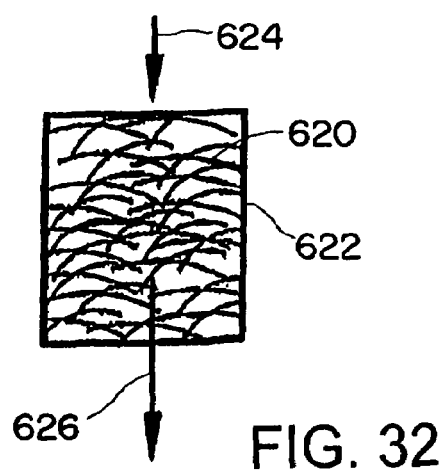

The SMR, Fischer-Tropsch and/or combustion catalyst may be supported on a flow-through support structure such as a foam, wad, pellet, powder, or gauze. An example of a flow-through structure is illustrated in FIG. 32. In FIG. 32, the flow-through catalyst 620 is contained within process microchannel 622, the reactants flow through the catalyst 620 as indicated by arrows 624 and 626, and undergo reaction to form the product.

The support structure for a flow-through catalyst may be formed from a material comprising silica gel, foamed copper, sintered stainless steel fiber, steel wool, alumina, or a combination of two or more thereof. In one embodiment, the support structure may be made of a heat conducting material, such as a metal, to enhance the transfer of heat to or from the catalyst.

The SMR, Fischer-Tropsch and/or combustion catalyst may be directly washcoated on the interior walls of the process microchannels or combustion channels, grown on the channel walls from solution, or coated on a fin structure. The catalyst may be in the form of a single piece of porous contiguous material, or many pieces in physical contact. In one embodiment, the catalyst may comprise a contiguous material and have a contiguous porosity such that molecules can diffuse through the catalyst. In this embodiment, the fluids flow through the catalyst rather than around it. In one embodiment, the cross-sectional area of the catalyst may occupy from about 1 to about 99%, and in one embodiment about 10 to about 95% of the cross-sectional area of the process microchannels and/or combustion channels. The catalyst may have a surface area, as measured by BET, of greater than about 0.5 $m^2/g$, and in one embodiment greater than about 2 $m^2/g$.

The SMR, Fischer-Tropsch and/or combustion catalyst may comprise a porous support, an interfacial layer on the porous support, and a catalyst material on the interfacial layer. The interfacial layer may be solution deposited on the support or it may be deposited by chemical vapor deposition or physical vapor deposition. In one embodiment the catalyst has a porous support, a buffer layer, an interfacial layer, and a catalyst material. Any of the foregoing layers may be continuous or discontinuous as in the form of spots or dots, or in the form of a layer with gaps or holes. The porous support may have a porosity of at least about 5% as measured by mercury porosimetry and an average pore size (sum of pore diameters divided by number of pores) of about 1 to about 1000 microns. The porous support may be a porous ceramic or a metal foam. Other porous supports that may be used include carbides, nitrides, and composite materials. The porous support may have a porosity of about 30% to about 99%, and in one embodiment about 60% to about 98%. The porous support may be in the form of a foam, felt, wad, or a combination thereof. The open cells of the metal foam may range from about 20 pores per inch (ppi) to about 3000 ppi, and in one embodiment about 20 to about 1000 ppi, and in one embodiment about 40 to about 120 ppi. The term "ppi" refers to the largest number of pores per inch (in isotropic materials the direction of the measurement is irrelevant; however, in anisotropic materials, the measurement is done in the direction that maximizes pore number).

The buffer layer, when present, may have a different composition and/or density than both the porous support and the interfacial layers, and in one embodiment has a coefficient of thermal expansion that is intermediate the thermal expansion coefficients of the porous support and the interfacial layer. The buffer layer may be a metal oxide or metal carbide. The buffer layer may comprise $Al_2O_3$, $TiO_2$, $SiO_2$, $ZrO_2$, or combination thereof. The $Al_2O_3$ may be $\alpha$-$Al_2O_3$, $\gamma$-$Al_2O_3$ or a combination thereof. The buffer layer may be formed of two or more compositionally different sublayers. For example, when the porous support is metal, for example a stainless steel foam, a buffer layer formed of two compositionally different sub-layers may be used. The first sublayer (in contact with the porous support) may be Tioxygen. The second sublayer may be $\alpha$-$Al_2O_3$ which is placed upon the Tioxygen. In one embodiment, the $\alpha$-$Al_2O_3$ sublayer is a dense layer that provides protection of the underlying metal surface. A less dense, high surface area interfacial layer such as alumina may then be deposited as support for a catalytically active layer.

The porous support may have a thermal coefficient of expansion different from that of the interfacial layer. In such a case a buffer layer may be needed to transition between the two coefficients of thermal expansion. The thermal expansion coefficient of the buffer layer can be tailored by controlling its composition to obtain an expansion coefficient that is compatible with the expansion coefficients of the porous support and interfacial layers. The buffer layer should be free of openings and pin holes to provide superior protection of the underlying support. The buffer layer may be nonporous. The buffer layer may have a thickness that is less than one half of the average pore size of the porous support. The buffer layer may have a thickness of about 0.05 to about 10 μm, and in one embodiment about 0.05 to about 5 μm.

In one embodiment adequate adhesion and chemical stability may be obtained without a buffer layer. In this embodiment the buffer layer may be omitted.

The interfacial layer may comprise nitrides, carbides, sulfides, halides, metal oxides, carbon, or a combination thereof. The interfacial layer provides high surface area and/or provides a desirable catalyst-support interaction for supported catalysts. The interfacial layer may be comprised of any material that is conventionally used as a catalyst support. The interfacial layer may comprise a metal oxide. Examples of metal oxides that may be used include $\alpha$-$Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. The interfacial layer may be used in combination with a catalytically active layer. The interfacial layer may also be formed of two or more compositionally different sublayers. The interfacial layer may have a thickness that is less than one half of the average pore size of the porous support. The interfacial layer thickness may range from about 0.5 to about 100 μm, and in one embodiment from about 1 to about 50 microns. The interfacial layer may be either crystalline or amorphous. The interfacial layer may have a BET surface area of at least about 1 $m^2/g$.

The SMR, Fischer-Tropsch and/or combustion catalyst may be deposited on the interfacial layer. Alternatively, the catalyst material may be simultaneously deposited with the interfacial layer. The catalyst layer may be intimately dispersed on the interfacial layer. That the catalyst layer is "dispersed on" or "deposited on" the interfacial layer includes the conventional understanding that microscopic catalyst particles are dispersed: on the support layer (i.e., interfacial layer) surface, in crevices in the support layer, and in open pores in the support layer.

Figure 33:
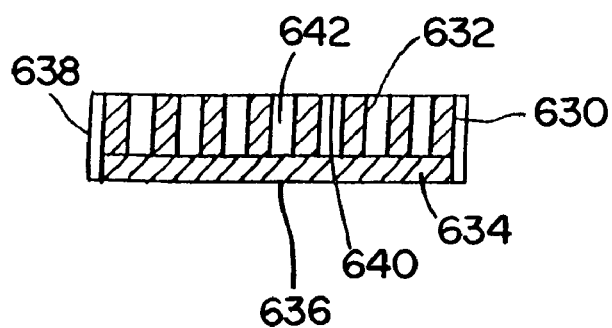
Figure 34:
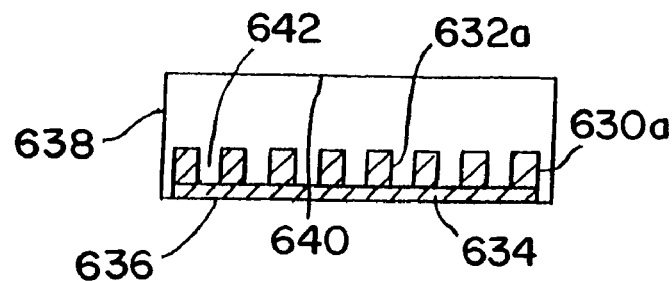
Figure 35:
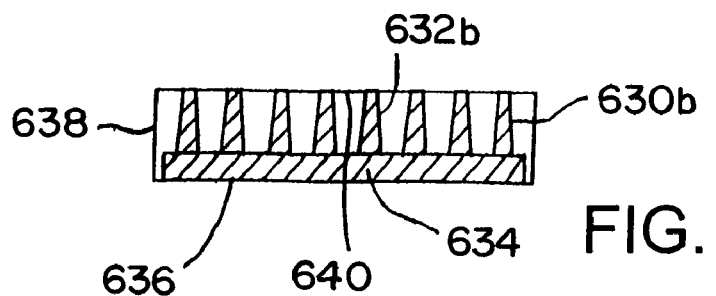

The SMR, Fischer-Tropsch and/or combustion catalyst may be supported on an assembly of one or more fins positioned within the process microchannels. Examples are illustrated in FIGS. 33-35. Referring to FIG. 33, fin assembly 630 includes fins 632 which are mounted on fin support 634 which overlies base wall 636 of process microchannel 638. The fins 632 project from the fin support 634 into the interior of the process microchannel 638. The fins 632 may extend to and contact the interior surface of upper wall 640 of process microchannel 638. Fin channels 642 between the fins 632 provide passage ways for reactant and product to flow through the process microchannel 638 parallel to its length. Each of the fins 632 has an exterior surface on each of its sides. The exterior surface provides a support base for the catalyst. The reactants may flow through the fin channels 642, contact the catalyst supported on the exterior surface of the fins 632, and react to form product. The fin assembly 630a illustrated in FIG. 34 is similar to the fin assembly 630 illustrated in FIG. 33 except that the fins 632a do not extend all the way to the interior surface of the upper wall 640 of the microchannel 638. The fin assembly 630b illustrated in FIG. 35 is similar to the fin assembly 630 illustrated in FIG. 33 except that the fins 632b in the fin assembly 630b have cross sectional shapes in the form of trapezoids. Each of the fins may have a height ranging from about 0.02 mm up to the height of the process microchannel 638, and in one embodiment from about 0.02 to about 10 mm, and in one embodiment from about 0.02 to about 5 mm, and in one embodiment from about 0.02 to about 2 mm. The width of each fin may range from about 0.02 to about 5 mm, and in one embodiment from about 0.02 to about 2 mm and in one embodiment about 0.02 to about 1 mm. The length of each fin may be of any length up to the length of the process microchannel 638, and in one embodiment up to about 10 m, and in one embodiment about 0.5 to about 10 m, and in one embodiment about 0.5 to about 6 m, and in one embodiment about 0.5 to about 3 m. The gap between each of the fins may be of any value and may range from about 0.02 to about 5 mm, and in one embodiment from about 0.02 to about 2 mm, and in one embodiment from about 0.02 to about 1 mm. The number of fins in the process microchannel 638 may range from about 1 to about 50 fins per centimeter of width of the process microchannel 638, and in one embodiment from about 1 to about 30 fins per centimeter, and in one embodiment from about 1 to about 10 fins per centimeter, and in one embodiment from about 1 to about 5 fins per centimeter, and in one embodiment from about 1 to about 3 fins per centimeter. Each of the fins may have a cross-section in the form of a rectangle or square as illustrated in FIG. 33 or 34, or a trapezoid as illustrated in FIG. 35. When viewed along its length, each fin may be straight, tapered or have a serpentine configuration. The fin assembly may be made of any material that provides sufficient strength, dimensional stability and heat transfer characteristics to permit operation for which the process microchannel is intended. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; quartz; silicon; or a combination of two or more thereof. The fin assembly may be made of an $Al_2O_3$ or a $Cr_2O_3$ forming material. The fin assembly may be made of an alloy comprising Fe, Cr, Al and Y, or an alloy comprising Ni, Cr and Fe.

The SMR, Fischer-Tropsch and/or combustion catalyst may be in the form of a bed of particulates which may be graded in composition or graded with a thermally conductive inert material. The thermally conductive inert material may be interspersed with the active catalyst. Examples of thermally conductive inert materials that may be used include diamond powder, silicon carbide, aluminum, alumina, copper, graphite, and the like. The catalyst bed fraction may range from about 100% by weight active catalyst to less than about 50% by weight active catalyst. The catalyst bed fraction may range from about 10% to about 90% by weight active catalyst, and in one embodiment from about 25% to about 75% by weight. In an alternate embodiment the thermally conductive inert material may be deployed at the center of the catalyst or within the catalyst particles. The active catalyst may be deposited on the outside, inside or intermittent within a composite structure that includes the thermally conductive inert. The resultant catalyst composite structure may have an effective thermal conductivity when placed in a process microchannel or combustion channel that is at least about 0.3 W/m/K, and in one embodiment at least about 1 W/m/K, and in one embodiment at least about 2 W/m/K.

The SMR, Fischer-Tropsch and/or combustion catalyst bed may be graded only locally within the process microchannel or combustion channel. For example, a process microchannel may contain a catalyst bed with a first reaction zone and a second reaction zone. The top or bottom (or front or back) of the catalyst bed may be graded in composition whereby a more or less active catalyst is employed in all or part of the first or second reaction zone. The composition that is reduced in one reaction zone may generate less heat per unit volume and thus reduce the hot spot and potential for the production of undesirable by-products, such as methane in a Fischer-Tropsch reaction. The catalyst may be graded with an inert material in the first and/or second reaction zone, in full or in part. The first reaction zone may contain a first composition of catalyst or inert material, while the second reaction zone may contain a second composition of catalyst or inert material.

Different particle sizes may be used in different axial regions of the process microchannels to provide for graded catalyst beds. For example, very small particles may be used in a first reaction zone while larger particles may be used in a second reaction zone. The average particle diameters may be less than half the height or gap of the process microchannels. The very small particles may be less than one-fourth of the process microchannel height or gap. Larger particles may cause lower pressure drops per unit length of the process microchannels and may also reduce the catalyst effectiveness. The effective thermal conductivity of a catalyst bed may be lower for larger size particles. Smaller particles may be used in regions where improved heat transfer is sought throughout the catalyst bed or alternatively larger particles may be used to reduce the local rate of heat generation.

Relatively short contact times, high selectivity to the desired product and relatively low rates of deactivation of the catalyst may be achieved by limiting the diffusion path required for the catalyst. This may be achieved when the catalyst is in the form of a thin layer on an engineered support such as a metallic foam or on the wall of the process microchannel. This may allow for increased space velocities. The thin layer of catalyst may be produced using chemical vapor deposition. This thin layer may have a thickness in the range up to about 1 micron, and in one embodiment in the range from about 0.1 to about 1 micron, and in one embodiment in the range from about 0.1 to about 0.5 micron, and in one embodiment about 0.25 micron. These thin layers may reduce the time the reactants are within the active catalyst structure by reducing the diffusional path. This may decrease the time the reactants spend in the active portion of the catalyst. The result may be increased selectivity to the product and reduced unwanted by-products. An advantage of this mode of catalyst deployment may be that, unlike conventional catalysts in which the active portion of the catalyst may be bound up in an inert low thermal conductivity binder, the active catalyst film may be in intimate contact with either an engineered structure or a wall of the process microchannel. This may leverage high heat transfer rates attainable in the microchannel reactor and allow for close control of temperature. This may result in the ability to operate at increased temperature (faster kinetics) without promoting the formation of undesired by-products, thus producing higher productivity and yield and prolonging catalyst life.

The configuration of the SMR microchannel reactor 130 and/or Fischer-Tropsch microchannel reactors 150 and 170 may be tailored to match the reaction kinetics. Near the entrance or top of a first reaction zone of a process microchannel, the microchannel height or gap may be smaller than in a second reaction zone near the exit or bottom of the process microchannel. Alternatively, the reaction zones may be smaller than half the process microchannel length. For example, a first process microchannel height or gap may be used for the first 25%, 50%, 75%, or 90% of the length of the process microchannel for a first reaction zone, while a larger second height or gap may be used in a second reaction zone downstream from the first reaction zone. This configuration may be suitable for conducting Fischer-Tropsch Tropsch synthesis reactions. Other gradations in the process microchannel height or gap may be used. For example, a first height or gap may be used near the entrance of the microchannel to provide a first reaction zone, a second height or gap downstream from the first reaction zone may be used to provide a second reaction zone, and a third height or gap may be used to provide a third reaction zone near the exit of the microchannel. The first and third heights or gaps may be the same or different. The first and third heights or gaps may be larger or smaller than the second height or gap. The third height or gap may be smaller or larger than the second height or gap. The second height or gap may be larger or smaller than the third height or gap.

In one embodiment, the SMR catalyst, Fischer-Tropsch and/or combustion catalyst may be regenerated by flowing a regenerating fluid through the process microchannels combustion channel in contact with the catalyst. The regenerating fluid may comprise hydrogen or a diluted hydrogen stream. The diluent may comprise nitrogen, argon, helium, methane, carbon dioxide, steam, or a mixture of two or more thereof. The temperature of the regenerating fluid may be from about 50 to about 400° C., and in one embodiment about 200 to about 350° C. The pressure within the channels during this regeneration step may range from about 1 to about 40 atmospheres, and in one embodiment about 1 to about 20 atmospheres, and in one embodiment about 1 to about 5 atmospheres. The residence time for the regenerating fluid in the channels may range from about 0.01 to about 1000 seconds, and in one embodiment about 0.1 second to about 100 seconds.

When the catalyst is a Fischer-Tropsch catalyst, it may be regenerated by increasing the molar ratio of $H_2$ to CO in the reactant composition to at least about 2.5:1, and in one embodiment at least about 3:1, and flowing the resulting adjusted feed composition through the process microchannels in contact with the catalyst at a temperature in the range from about 150° C. to about 300° C., and in one embodiment in the range from about 180° C. to about 250° C., for a period of time in the range from about 0.1 to about 100 hours, and in one embodiment in the range from about 0.5 to about 20 hours, to provide the regenerated catalyst. The feed composition may be adjusted by interrupting the flow of all feed gases except hydrogen and flowing the hydrogen through the process microchannels in contact with the catalyst. The flow of $H_2$ may be increased to provide for the same contact time used for the reactant composition comprising $H_2$ and CO. The adjusted feed composition may comprise $H_2$ and is characterized by the absence of CO. Once the catalyst is regenerated, the Fischer-Tropsch process may be continued by contacting the regenerated catalyst with the original reactant composition comprising $H_2$ and CO.

In one embodiment, the SMR and/or Fischer-Tropsch process microchannels and/or combustion channels may be characterized by having bulk flow paths. The term "bulk flow path" refers to an open path (contiguous bulk flow region) within the process microchannels or combustion channel. A contiguous bulk flow region allows rapid fluid flow through the channels without large pressure drops. In one embodiment, the flow of fluid in the bulk flow region is laminar. Bulk flow regions within each process microchannel or combustion channel may have a cross-sectional area of about 0.05 to about 10,000 mm², and in one embodiment about 0.05 to about 5000 mm², and in one embodiment about 0.1 to about 2500 mm². The bulk flow regions may comprise from about 5% to about 95%, and in one embodiment about 30% to about 80% of the cross-section of the process microchannels or combustion channel.

The contact time of the reactants with the SMR, Fischer-Tropsch and/or combustion catalyst may range up to about 2000 milliseconds (ms), and in the range from about 10 to about 2000 ms, and in one embodiment from about 10 ms to about 1000 ms, and in one embodiment about 20 ms to about 500 ms. In one embodiment, the contact time may range up to about 300 ms, and in one embodiment from about 20 to about 300 ms, and in one embodiment from about 50 to about 150 ms, and in one embodiment about 75 to about 125 ms, and in one embodiment about 100 ms. In one embodiment, the contact time may be up to about 100 ms, and in one embodiment from about 10 to about 100 ms.

The space velocity (or gas hourly space velocity (GHSV)) for the flow of fluid in the SMR process microchannels, Fischer-Tropsch process microchannels and/or combustion channels may be at least about 1000 $hr^{-1}$ (normal liters of feed/hour/liter of volume within the process microchannels) or at least about 800 ml feed/(g catalyst) (hr). The space velocity may range from about 1000 to about 1,000,000 $hr^{-1}$, or from about 800 to about 800,000 ml feed/(g catalyst) (hr). In one embodiment, the space velocity may range from about 10,000 to about 100,000 $hr^{-1}$, or about 8,000 to about 80,000 ml feed/(g catalyst) (hr).

The pressure drop of fluids as they flow in the SMR process microchannels, Fischer-Tropsch process microchannels, combustion channels, and/or staged addition channels may range up to about 10 atmospheres per meter of length of channel (atm/m), and in one embodiment up to about 5 atm/m, and in one embodiment up to about 3 atm/m.

The Reynolds Number for the flow of fluid in the SMR process microchannels, Fischer-Tropsch process microchannels, combustion channels, and/or staged addition channels may be in the range of about 10 to about 4000, and in one embodiment about 100 to about 2000.

The heat exchange fluid entering the heat exchange channels of the Fischer-Tropsch microchannel reactors 150 and 170 may be at a temperature of about 100° C. to about 400° C., and in one embodiment about 200° C. to about 300° C. The heat exchange fluid exiting the heat exchange channels may be at a temperature in the range of about 150° C. to about 450° C., and in one embodiment about 200° C. to about 350° C. The residence time of the heat exchange fluid in the heat exchange channels may range from about 1 to about 2000 ms, and in one embodiment about 10 to about 500 ms. The pressure drop for the heat exchange fluid as it flows through the heat exchange channels may range up to about 10 atm/m, and in one embodiment from about 1 to about 10 atm/m, and in one embodiment from about 2 to about 5 atm/m. The heat exchange fluid may be in the form of a vapor, a liquid, or a mixture of vapor and liquid. The Reynolds Number for the flow of the heat exchange fluid in heat exchange channels may be from about 10 to about 4000, and in one embodiment about 100 to about 2000.

The heat exchange fluid used in the heat exchange channels in the Fischer-Tropsch microchannel reactors 150 and 170 may be any heat exchange fluid suitable for cooling a Fischer-Tropsch exothermic reaction. These may include air, steam, liquid water, gaseous nitrogen, other gases including inert gases, carbon monoxide, oils such as mineral oil, and heat exchange fluids such as Dowtherm A and Therminol which are available from Dow-Union Carbide.

The heat exchange channels used in the Fischer-Tropsch microchannel reactors may comprise process channels wherein an endothermic process is conducted. These heat exchange process channels may be microchannels. Examples of endothermic processes that may be conducted in the heat exchange channels include steam reforming and dehydrogenation reactions. Steam reforming of an alcohol that occurs at a temperature in the range from about 200° C. to about 300° C. is an example of an endothermic process that may be used. The incorporation of a simultaneous endothermic reaction to provide an improved heat sink may enable a typical heat flux of roughly an order of magnitude above the convective cooling heat flux.

The heat exchange fluid may undergo a partial or full phase change as it flows in the heat exchange channels of the Fischer-Tropsch microchannel reactors 150 and 170. This phase change may provide additional heat removal from the process microchannels beyond that provided by convective cooling. For a liquid heat exchange fluid being vaporized, the additional heat being transferred from the Fischer-Tropsch process microchannels may result from the latent heat of vaporization required by the heat exchange fluid. An example of such a phase change may be water converted to steam as shown in FIGS. 2-9. In one embodiment, about 50% by weight of the heat exchange fluid may be vaporized, and in one embodiment about 35% by weight may be vaporized, and in one embodiment about 20% by weight may be vaporized, and in one embodiment about 10% by weight may be vaporized. In one embodiment, from about 10% to about 50% by weight may be vaporized.

The heat flux for heat exchange in the SMR microchannel reactor 130 and the Fischer-Tropsch microchannel reactors 150 and 170 may be in the range from about 0.01 to about 500 watts per square centimeter of surface area of the one or more process microchannels (W/cm²) in the microchannel reactor, and in one embodiment in the range from about 0.1 to about 250 W/cm², and in one embodiment from about 1 to about 125 W/cm². The heat flux for convective heat exchange in the microchannel reactor may be in the range from about 0.01 to about 250 W/cm², and in one embodiment in the range from about 0.1 to about 50 W/cm², and in one embodiment from about 1 to about 25 W/cm², and in one embodiment from about 1 to about 10 W/cm². The heat flux for phase change and/or an exothermic or endothermic reaction of the heat exchange fluid may be in the range from about 0.01 to about 500 W/cm², and in one embodiment from about 1 to about 250 W/cm², and in one embodiment, from about 1 to about 100 W/cm², and in one embodiment from about 1 to about 50 W/cm², and in one embodiment from about 1 to about 25 W/cm², and in one embodiment from about 1 to about 10 W/cm².

The control of heat exchange during the SMR and Fischer-Tropsch reaction processes, in one embodiment, may be advantageous for controlling selectivity towards the desired product due to the fact that such added cooling and/or heating may reduce or eliminate the formation of undesired by-products from undesired parallel reactions with higher activation energies.

The pressure within each individual heat exchange channel in the Fischer-Tropsch microchannel reactors 150 and 170 may be controlled using passive structures (e.g., obstructions), orifices and/or mechanisms upstream of the heat exchange channels or in the channels. By controlling the pressure within each heat exchange microchannel, the temperature within each heat exchange microchannel can be controlled. A higher inlet pressure for each heat exchange channel may be used where the passive structures, orifices and/or mechanisms let down the pressure to the desired pressure. By controlling the temperature within each heat exchange channel, the temperature in the Fischer-Tropsch process microchannels can be controlled. Thus, for example, each Fischer-Tropsch process microchannel may be operated at a desired temperature by employing a specific pressure in the heat exchange channel adjacent to or in thermal contact with the process microchannel. This provides the advantage of precisely controlled temperatures for each Fischer-Tropsch process microchannel. The use of precisely controlled temperatures for each Fischer-Tropsch process microchannel provides the advantage of a tailored temperature profile and an overall reduction in the energy requirements for the process.

In a scale up device, for certain applications, it may be required that the mass of the process fluid be distributed uniformly among the microchannels. Such an application may be when the process fluid is required to be heated or cooled down with adjacent heat exchange channels. The uniform mass flow distribution may be obtained by changing the cross-sectional area from one parallel microchannel to another microchannel. The uniformity of mass flow distribution may be defined by Quality Index Factor (Q-factor) as indicated below. A Q-factor of 0% means absolute uniform distribution.

$$Q = \frac{\dot{m}_{max} - \dot{m}_{min}}{\dot{m}_{max}} \times 100$$

A change in the cross-sectional area may result in a difference in shear stress on the wall. In one embodiment, the Q-factor for the SMR microchannel reactor 130 and/or Fischer-Tropsch microchannel reactors 150 and/or 170 may be less than about 50%, and in one embodiment less than about 20%, and in one embodiment less than about 5%, and in one embodiment less than about 1%.

The superficial velocity for fluid flowing in the SMR and/or Fischer-Tropsch process microchannels may be at least about 0.01 meters per second (m/s), and in one embodiment at least about 0.1 m/s, and in one embodiment in the range from about 0.01 to about 100 m/s, and in one embodiment in the range from about 0.01 to about 1 m/s, and in one embodiment in the range from about 0.1 to about 10 m/s, and in one embodiment in the range from about 1 to about 100 m/s.

The free stream velocity for fluid flowing in the SMR and/or Fischer-Tropsch process microchannels may be at least about 0.001 m/s, and in one embodiment at least about 0.01 m/s, and in one embodiment in the range from about 0.001 to about 200 m/s, and in one embodiment in the range from about 0.01 to about 100 m/s, and in one embodiment in the range from about 0.01 to about 200 m/s.

Figure 28:
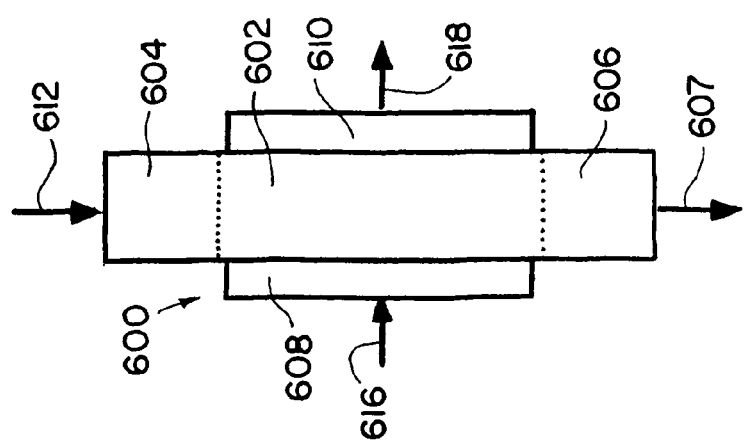

In one embodiment, temperature swing adsorption (TSA) or pressure swing adsorption (PSA) may be used to effect the separations in the $H_2$ separator 140, $H_2$ separator 190 and/or $N_2$ separator 195. Referring to FIG. 28, the TSA or PSA process may be conducted using microchannel separator 600 which includes microchannel separator core 602, process header 604, process footer 606, heat exchange header 608 and heat exchange footer 610. The microchannel separator core 602 contains a plurality of process microchannels and a plurality of heat exchange channels. The heat exchange channels may be microchannels. A sorption medium is contained within the process microchannels. The process microchannels and heat exchange channels may be aligned in layers, one above the other, or side by side. In one embodiment, each layer of process microchannels is positioned between two layers of heat exchange channels, one of the layers of heat exchange channels being used for heating and the other layer of heat exchange channels being used for cooling. The process header 604 provides a passageway for fluid to flow into the process microchannels with an even or substantially even distribution of flow to the process microchannels. The process footer 606 provides a passageway for fluid to flow from the process microchannels 604 in a rapid manner with a relatively high rate of flow. A heat exchange fluid flows into heat exchange header 608, as indicated by arrow 616, and from heat exchange header 608 through the heat exchange channels in microchannel separator core 602 to heat exchange footer 610, and out of heat exchange footer 610, as indicated by directional arrow 618. The heat exchange fluid may be used to heat and cool the process microchannels. A fluid mixture containing $H_2$ or $N_2$ flows into microchannel separator 600, as indicated by arrow 612, through process header 604 and then into the process microchannels in the microchannel separator core 602 where it contacts a sorption medium. The fluid mixture is maintained in the process microchannels in contact with the sorption medium until at least part of the $H_2$ or $N_2$ is sorbed or until the remaining parts of the fluid mixture are sorbed by the sorption medium. The non-sorbed parts of the fluid mixture are then removed from the process microchannels, and from the microchannel separator 600 as indicated by arrow 607. The temperature for a TSA process or pressure for a PSA process within the process microchannels is then changed to provide for desorption of the sorbed material from the sorption medium. The desorbed material is then removed from the process microchannels and from the microchannel separator 600 as indicated by arrow 607.

Figure 29:
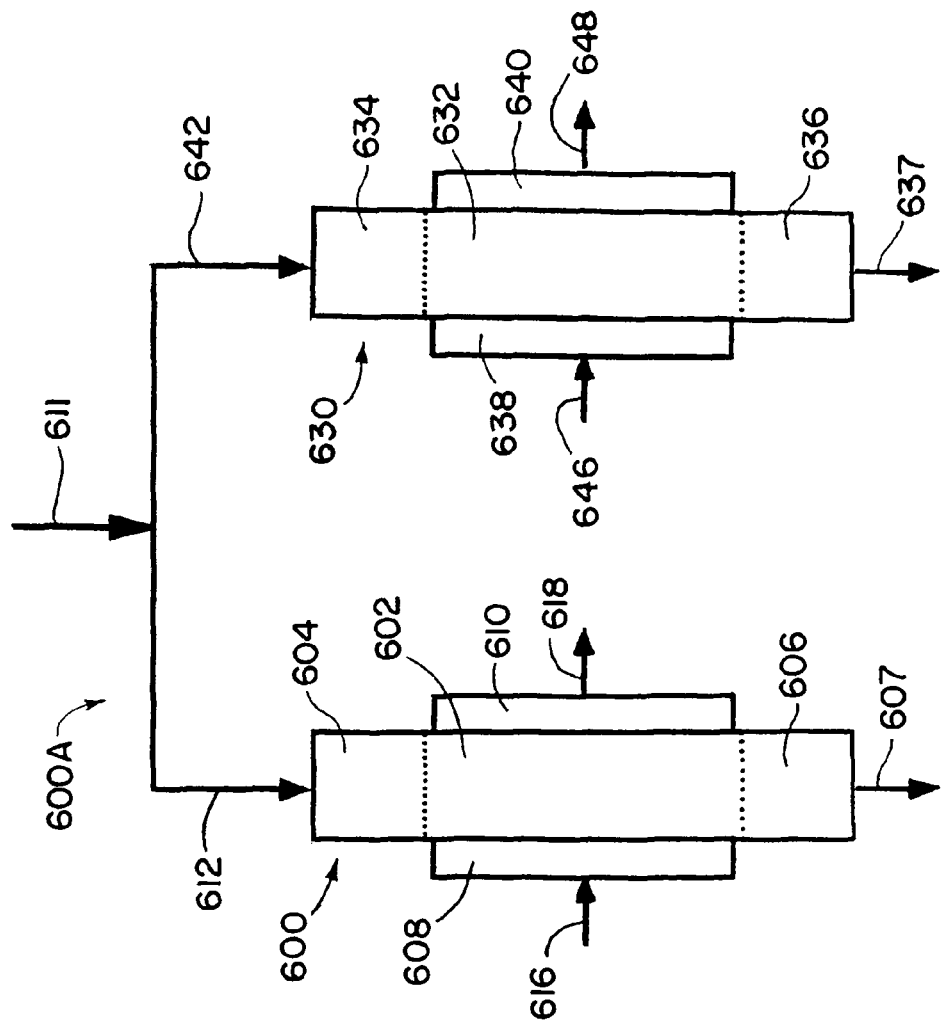
FIGS. 28 and 29 are schematic illustrations of microchannel separators that may be used to separate $H_2$ and/or $N_2$ from process fluids used in the inventive process. The separation techniques that may be used in the microchannel separators illustrated in FIGS. 28 and 29 may include temperature swing adsorption (TSA) or pressure swing adsorption (PSA) techniques.

The TSA or PSA process illustrated in FIG. 29 involves the use of two microchannel separators 600 and 630 operating in parallel. This arrangement allows for a sequential operation wherein a sorption step may be conducted in microchannel separator 600 while a desorption step is conducted in microchannel separator 630, and vice versa. Microchannel separator 600 is the same as described above with reference to FIG. 28. Microchannel separator 630 is the same as or similar to microchannel separator 600 in construction and operation. Microchannel separator 630 includes microchannel separator core 632, process header 634, process footer 636, heat exchange header 638 and heat exchange footer 640. The microchannel separator core 632 contains a plurality of process microchannels and a plurality of heat exchange channels. The heat exchange channels may be microchannels. A sorption medium is contained within the process microchannels. The process microchannels and heat exchange channels may be aligned in layers, one above the other, or side by side. A heat exchange fluid flows into heat exchange header 638, as indicated by arrow 646, and from heat exchange header 638 through the heat exchange channels in microchannel separator core 632 to heat exchange footer 640, and out of heat exchange footer 640, as indicated by arrow 648. A fluid mixture containing $H_2$ or $N_2$ flows from line 611 into microchannel separators 600 and 630, as indicated by arrows 612 and 642. The fluid mixture is processed in microchannel separator 600 as discussed above. The fluid mixture flows in microchannel separator 630 through process header 634 and then into the process microchannels in the microchannel separator core 632 where it contacts the sorption medium. The fluid mixture is maintained in the process microchannels in contact with the sorption medium until at least part of either the $H_2$ or $N_2$ is sorbed or until the remaining parts of the fluid mixture are sorbed by the sorption medium. The non-sorbed parts of the fluid mixture are then removed from the microchannel separator 630 as indicated by arrow 637. The temperature for a TSA process or pressure for a PSA process within the process microchannels is then changed to provide for desorption of the sorbed material from the sorption medium. The desorbed material is then removed from the microchannel separator 630 as indicated by arrow 637.

TSA and PSA processes employing microchannel technology that may be used for the foregoing separations are disclosed in U.S. Pat. Nos. 6,508,862 B1 and 6,652,627 B1, and U.S. Patent Publication US 2005/0045030 A1, which are incorporated herein by reference.

In one embodiment, membranes may be used to effect the separations in the $H_2$ separator 140, $H_2$ separator 190 and/or $N_2$ separator 195. The process is based on the difference in permeation rates between $H_2$ or $N_2$ and the remainder of the components in the streams being treated. Permeation involves two sequential mechanisms: the gas phase component must first dissolve into the membrane, then diffuse through it to the permeate side. Different components have different solubilities and permeating rates. The former depends primarily on the chemical composition of the membrane and the latter on the structure of the membrane. Gases can have high permeation rates due to high solubilities, high diffusivities, or both. Absolute permeation rates may vary depending on the type of membrane. The driving force for both solution and diffusion is the partial pressure difference across the membrane, between the feed and permeate sides. Gases with higher permeabilities may enrich on the permeate side of the membrane, while gases with lower permeabilities may enrich on the non-permeate side of the membrane due to depletion of components with permeabilities. The first fraction of gas to permeate through the membrane may consist primarily of the components with the highest permeability. As a larger fraction of the feed gas is allowed to permeate, there may be an increase in the relative amount of the components with lower permeabilities in the permeate stream. Hence, for $H_2$ or $N_2$ separations, higher purity $H_2$ or $N_2$ may be associated with lower recovery, and lower purity $H_2$ or $N_2$ may be associated with higher recovery. Higher $H_2$ or $N_2$ recovery may also require that more membrane area be provided. The membrane area required under fixed feed composition and system pressure levels may increase exponentially at high levels of $H_2$ or $N_2$ recovery. The performance of a specific membrane system, i.e., the recovery versus product purity relationship for a given fluid stream, may be dependent upon the feed to permeate ratio, and may be less dependent on the absolute pressure levels. However, the area requirement may be inversely proportional to the feed pressure. For this reason, it may be desirable to compress the gaseous stream being treated to achieve the required pressure ratio rather than permeate, even though the permeate flow may be smaller.

There are two types of membranes that may be useful for $H_2$ or $N_2$ separation: asymmetric and composite. Asymmetric membranes may be composed of two layers of a single polymer. There is a dense layer which performs the separation and a microporous substrate layer whose function is to provide mechanical support. Composite membranes have two different polymers wherein a separation polymer is coated on a substrate polymer. This allows for a selection of a separation polymer based on its permeation characteristics without regard for its mechanical properties. Furthermore, relatively small quantities of separation polymer may be required. Thus, costly polymers of limited availability may be used. Membranes may be manufactured as hollow fibers or as flat sheets. Both types of membranes may be packaged as modules. Hollow fiber membrane systems may have the advantage that a larger surface area can be packaged in a given number of modules.

In one embodiment, the use of TSA, PSA, membranes, or a combination of two or more thereof, to selectivity recycle carbon components from the tail gas may increase the carbon efficiency of the process by about 10% for a 60% carbon selectivity to the tail gas recycle. The carbon efficiency may increase from about 6% to about 13% corresponding to carbon selectivities of about 40% to about 80%. Selective carbon recycle may be used to minimize $CO_2$ emissions.

In one embodiment, the process and/or heat exchange streams from the SMR microchannel reactor 130 and/or the Fischer-Tropsch microchannel reactors 150 and/or 170 may be used to heat and/or cool the TSA microchannel separators.

EXAMPLE

A process simulation using Chem CAD is conducted. The process is as illustrated in FIG. 8 with the exception that both $N_2$ and $H_2$ rejection from the carbon rich tail gas recycle stream (line 116 in FIG. 8) is used. The SMR microchannel reactor is operated at a temperature of 900° C. and a pressure of 16.5 bars. The steam to carbon mole ratio is 1.6 and the conversion of methane is 80.6%. The Fischer-Tropsch microchannel reactors 150 and 170 are each operated at a temperature of 230° C., and a CO conversion of 70%. The results are provided in Table 1. In Table 1, stream 196 refers to $N_2$ rejection from the tail gas (see, line 196 in FIG. 9).

TABLE 1

| | Stream No. | | | | | | | |
|---|---|---|---|---|---|---|---|---|
| | 112 | 116 | 118 | 132 | 133 | 134 | 142 | 155 |
| Temp, ° C. | 38 | 51 | 482 | 300 | 127 | 325 | 48 | 225 |
| Pres, psig | 545 | 288 | 276 | 229 | 20 | −0.0135 | 28 | 356 |
| Flow rates (Kmol/h) | | | | | | | | |
| Hydrogen | 0 | 0 | 53.5 | 4995.6 | 0 | 0 | 1327 | 0 |
| Oxygen | 0 | 0 | 0 | 0 | 985.9 | 297.3 | 0 | 0 |
| Nitrogen | 13 | 0 | 13 | 13 | 3708.8 | 3721.7 | 12.9 | 0 |
| Water | 0 | 0.2 | 3200.2 | 1771 | 0 | 1356.2 | 15.7 | 320 |
| Carbon Monoxide | 0 | 162.4 | 162.4 | 1836.3 | 0 | 0 | 23.1 | 0 |
| Carbon Dioxide | 20.1 | 453.8 | 473.9 | 511.5 | 0 | 71.3 | 41.4 | 0 |
| Methane | 1199.3 | 496.4 | 1695.7 | 376.3 | 0 | 0 | 6.8 | 0 |
| Ethane | 99.2 | 21.9 | 121.1 | 0 | 0 | 0 | 0 | 0 |
| Propane | 8 | 14.2 | 22.3 | 0 | 0 | 0 | 0 | 0 |
| N-Butane | 0.4 | 10.9 | 11.3 | 0 | 0 | 0 | 0 | 0 |
| N-Pentane | 0 | 6.4 | 6.4 | 0 | 0 | 0 | 0 | 0 |
| N-Hexane | 0 | 1 | 1 | 0 | 0 | 0 | 0 | 0 |
| N-Heptane | 0 | 0 | 0 | 0 | 0 | 0 | 0 | 0 |
| N-Octane | 0 | 0 | 0 | 0 | 0 | 0 | 0 | 0 |
| N-Nonane | 0 | 0 | 0 | 0 | 0 | 0 | 0 | 0 |
| N-Decane | 0 | 0 | 0 | 0 | 0 | 0 | 0 | 0 |

| | Stream No. | | | | | | | | | |
|---|---|---|---|---|---|---|---|---|---|---|
| | 144 | 157 | 113 | 151 | 152 | 162 | 116 | 114 | 153 | 154 | 196 |
| Temp, ° C. | 230 | 66 | 66 | 225 | 225 | 230 | 51 | 41 | 225 | 225 | 51 |
| Pres, psig | 191 | 131 | 131 | 361 | 356 | 351 | 288 | 291 | 361 | 356 | 288 |
| Flow rates (Kmol/h) | | | | | | | | | | | |
| Hydrogen | 3596.8 | 829.3 | 0 | 0 | 0 | 829.4 | 0 | 0 | 0 | 0 | 0 |
| Oxygen | 0 | 0 | 0 | 0 | 0 | 0 | 0 | 0 | 0 | 0 | 0 |
| Nitrogen | 12.7 | 12.7 | 0 | 0 | 0 | 12.7 | 0 | 0 | 0 | 0 | 12.7 |
| Water | 51.2 | 64.2 | 1246.5 | 21450.1 | 21450.1 | 64.2 | 4.4 | 437.1 | 6454.2 | 6454.2 | 4.2 |
| Carbon Monoxide | 1810.6 | 542.9 | 0 | 0 | 0 | 542.9 | 162.4 | 0 | 0 | 0 | 0 |
| Carbon Dioxide | 465.5 | 467.7 | 0 | 0 | 0 | 467.7 | 453.8 | 0 | 0 | 0 | 0 |
| Methane | 368.8 | 470.8 | 0 | 0 | 0 | 470.7 | 496.4 | 0 | 0 | 0 | 0 |
| Ethane | 0 | 17.7 | 0 | 0 | 0 | 17.7 | 21.9 | 0 | 0 | 0 | 0 |
| Propane | 0 | 12.5 | 0 | 0 | 0 | 12.5 | 14.2 | 0 | 0 | 0 | 0 |
| N-Butane | 0 | 12.2 | 0 | 0 | 0 | 12.2 | 10.9 | 0 | 0 | 0 | 0 |
| N-Pentane | 0 | 13.8 | 0 | 0 | 0 | 13.8 | 6.4 | 0 | 0 | 0 | 0 |
| N-Hexane | 0 | 9.8 | 0 | 0 | 0 | 9.8 | 1 | 0 | 0 | 0 | 0 |
| N-Heptane | 0 | 6.4 | 0 | 0 | 0 | 6.4 | 0 | 0 | 0 | 0 | 0 |
| N-Octane | 0 | 3.5 | 0 | 0 | 0 | 3.5 | 0 | 0 | 0 | 0 | 0 |
| N-Nonane | 0 | 1.4 | 0 | 0 | 0 | 1.4 | 0 | 0 | 0 | 0 | 0 |
| N-Decane | 0 | 0.5 | 0 | 0 | 0 | 0.5 | 0 | 0 | 0 | 0 | 0 |

This Example shows that when $N_2$ and $H_2$ are rejected from the recycled tail gas stream, a carbon utilization of about 90% can be achieved. This is compared to carbon utilizations of about 78-80% that are observed when $N_2$ and $H_2$ rejection from the recycled tail gas are not employed. Both of these figures represent significant improvements over carbon utilizations of about 70-72% that are reported for conventional (i.e., non-microchannel) gas to liquid processes.

While the invention has been explained in relation to various embodiments, it is to be understood that various modifications thereof may become apparent to those skilled in the art upon reading this specification. Therefore, it is to be understood that the invention includes all such modifications that may fall within the scope of the appended claims.

The invention claimed is:

1. A process, comprising:
   (A) flowing an SMR feed in an SMR microchannel reactor in contact with one or more SMR catalysts to form a first intermediate product, the SMR feed comprising methane and steam, the first intermediate product comprising CO and $H_2$; the SMR microchannel reactor comprising a plurality of SMR process microchannels and a plurality of combustion channels; the SMR process microchannels containing the one or more SMR catalysts, the methane and steam contacting the one or more SMR catalysts in the process microchannels; separating part of the $H_2$ from the first intermediate product to form a second intermediate product, the second intermediate product comprising CO and $H_2$; the combustion channels containing one or more combustion catalysts, the separated $H_2$ being combined with oxygen or a source of oxygen to form a combustion reaction mixture; the combustion reaction mixture contacting the one or more combustion catalysts, undergoing a combustion reaction, and generating heat and a combustion exhaust; transferring heat from the combustion channels to the SMR process microchannels; and
   (B) flowing the second intermediate product in a Fischer-Tropsch microchannel reactor in contact with one or more Fischer-Tropsch catalysts to form a Fischer-Tropsch product comprising one or more higher molecular weight hydrocarbons; the Fischer-Tropsch microchannel reactor comprising a plurality of Fischer-Tropsch process microchannels and a plurality of heat exchange channels; the Fischer-Tropsch process microchannels containing the one or more Fischer-Tropsch catalysts, the second intermediate product contacting the one or more Fischer-Tropsch catalysts in the Fischer-Tropsch process microchannels; transferring heat from the Fischer-Tropsch process microchannels to a heat exchange fluid in the heat exchange channels.

2. The process of claim 1 wherein the Fischer-Tropsch product formed in step (B) further comprises a gaseous mixture comprising CO and $H_2$, the gaseous mixture being separated from the Fischer-Tropsch product, the separated gaseous mixture comprising a third intermediate product, the process further comprising:
   (C) flowing the third intermediate product in a second Fischer-Tropsch microchannel reactor in contact with one or more second Fischer-Tropsch catalysts to form a second Fischer-Tropsch product comprising one or more higher molecular weight hydrocarbons; the second Fischer-Tropsch microchannel reactor comprising a plurality of second Fischer-Tropsch process microchannels and a plurality of second heat exchange channels; the second Fischer-Tropsch process microchannels containing one or more second Fischer-Tropsch catalysts, the third intermediate product contacting the one or more second Fischer-Tropsch catalysts in the second Fischer-Tropsch process microchannels; transferring heat from the second Fischer-Tropsch process microchannels to a heat exchange fluid in the second heat exchange channels.

3. The process of claim 1 wherein the SMR feed is derived from a natural gas feed, and a tail gas is formed in the Fischer-Tropsch microchannel reactor, at least part of the tail gas being combined with the natural gas feed.

4. The process of claim 1 wherein the SMR feed is derived from a natural gas feed, and process water is formed in the Fischer-Tropsch microchannel reactor, at least a portion of the process water being combined with the natural gas feed.

5. The process of claim 1 wherein the SMR feed is derived from a natural gas feed, and process water is formed in the Fischer-Tropsch microchannel reactor and is combined with the natural gas feed, and tail gas is formed in the Fischer-Tropsch microchannel reactor and at least part of the tail gas is combined with the natural gas feed.

6. The process of claim 5 wherein the natural gas feed, process water and tail gas are combined in a saturator, the saturator being upstream of the SMR microchannel reactor.

7. The process of claim 1 wherein the SMR feed comprises one or more higher molecular weight hydrocarbons, the process further comprising flowing the SMR feed and steam in a pre-reformer to convert at least some of the higher molecular weight hydrocarbons in the SMR feed to methane, the pre-reformer being upstream of the SMR microchannel reactor.

8. The process of claim 1 wherein the SMR feed comprises one or more higher molecular weight hydrocarbons, the process further comprising flowing the SMR feed and steam in a pre-reformer to convert at least some of the higher molecular weight hydrocarbons in the SMR feed to methane, the pre-reformer being integrated with the SMR microchannel reactor and being heated by heat from the combustion channels.

9. The process of claim 1 wherein the SMR feed comprises one or more higher molecular weight hydrocarbons, the process further comprising flowing the SMR feed and steam in the SMR process microchannels at a first temperature in a first part of the SMR process microchannels to convert at least some of the higher molecular weight hydrocarbons in the SMR feed to methane, the resulting product comprising a modified SMR feed comprising methane, and flowing the modified SMR feed in a second part of the SMR process microchannels at a second temperature to convert the modified SMR feed to the first intermediate product.

10. The process of claim 1 wherein staged addition channels are positioned adjacent to the combustion channels, the oxygen source of oxygen flowing through to the staged addition channels into the combustion channels.

11. The process of claim 1 wherein the combustion exhaust comprises a vapor and a liquid, the vapor being separated from the liquid in a vapor-liquid separator, the liquid comprising water.

12. The process of claim 1 wherein the SMR feed is derived from a natural gas feed, and a tail gas is formed in the Fischer-Tropsch microchannel reactor, the tail gas comprising $H_2$, CO, $CO_2$ and one or more hydrocarbons, the tail gas flowing through an $H_2$ separator to provide a carbon rich tail gas and an $H_2$ rich tail gas, the carbon rich tail gas being combined with the natural gas feed, the $H_2$ rich tail gas being used as a fuel.

13. The process of claim 1 wherein a tail gas is formed in the Fischer-Tropsch microchannel reactor, the tail gas comprising $N_2$, the tail gas flowing through a nitrogen separator wherein $N_2$ is separated from the tail gas.

14. The process of claim 1 wherein the SMR feed is derived from a natural gas feed, and a tail gas is formed in the Fischer-Tropsch microchannel reactor, the tail gas comprising $H_2$, $N_2$, CO, $CO_2$ and one or more hydrocarbons, the tail gas flowing through an $H_2$ separator to provide a carbon rich tail gas and an $H_2$ rich tail gas, the carbon rich tail gas comprising $N_2$, the carbon rich tail gas flowing through a nitrogen separator wherein $N_2$ is separated from the carbon rich tail gas, the carbon rich tail gas being combined with the natural gas feed, the $H_2$ rich tail gas being used as a fuel.

15. The process of claim 1 wherein the second intermediate product is compressed prior to step (B).

16. The process of claim 1 wherein the SMR feed is derived from a natural gas feed, and a tail gas is formed in the Fischer-Tropsch microchannel reactor and at least part of the tail gas is combined with the natural gas feed, the at least part of the tail gas being compressed prior to being combined with the natural gas feed.

17. The process of claim 1 wherein the heat exchange fluid in the heat exchange channels is at least partially vaporized in the heat exchange channels.

18. The process of claim 1 wherein the Fischer-Tropsch product comprises one or more paraffins and/or one or more olefins of about 5 to about 100 carbon atoms.

19. The process of claim 1 wherein the Fischer-Tropsch product comprises olefins and paraffins, the ratio of olefins to paraffins being in the range from about 0.01 to about 0.8.

20. The process of claim 1 wherein the Fischer-Tropsch product is further processed using hydrocracking, hydroisomerizing or dewaxing.

21. The process of claim 1 wherein natural gas is used in the formation of the SMR feed, the percent of carbon in the Fischer-Tropsch product relative to carbon in the natural gas being in the range from about 50 to about 70%.

22. The process of claim 2 wherein natural gas is used in the formation of the SMR feed, the overall percent of carbon in the first and second Fischer-Tropsch products relative to carbon in the natural gas is at least about 75%.

23. The process of claim 1 wherein each SMR process microchannel has at least one heat transfer wall and the heat flux for heat exchange within the SMR microchannel reactor is in the range from about 0.01 to about 500 watts per square centimeter of surface area of the heat transfer walls.

24. The process of claim 1 wherein each SMR process microchannel has a first part wherein the temperature is in the range from about 150 to about 400° C., and a second part downstream of the first part wherein the temperature is in the range from about 600 to about 1000° C.

25. The process of claim 1 wherein each Fischer-Tropsch process microchannel has at least one heat transfer wall and the heat flux for heat exchange within the Fischer-Tropsch microchannel reactor is in the range from about 0.01 to about 500 watts per square centimeter of surface area of the heat transfer walls.

26. The process of claim 1 wherein one or more multi-stream heat exchangers provide for exchange of heat between the SMR feed and first intermediate product, and between the $H_2$ and the oxygen or source of oxygen of the combustion reaction mixture and the combustion exhaust.

27. The process of claim 1 wherein $H_2$ is separated from the first intermediate product using temperature swing adsorption, pressure swing adsorption, membranes, or a combination of two or more thereof.

28. The process of claim 12 wherein temperature swing adsorption, pressure swing adsorption, membranes, or a combination of two or more thereof, is used to separate the carbon rich tail gas from the $H_2$ rich tail gas.

29. The process of claim 13 wherein temperature swing adsorption, pressure swing adsorption, membranes, or a combination of two or more thereof, is used to separate the $N_2$ from the tail gas.

30. The process of claim 14 wherein temperature swing adsorption, pressure swing adsorption, membranes, or a combination of two or more thereof, is used to separate $H_2$ from the tail gas and to separate $N_2$ from the carbon rich tail gas.

31. The process of claim 1 wherein the SMR catalyst comprises La, Pt, Fe, Ni, Ru, Rh, In, Ir, W, and/or an oxide thereof, or a mixture of two or more thereof.

32. The process of claim 31 wherein the SMR catalyst further comprises MgO, $Al_2O_3$, $SiO_2$, $TiO_2$, or a mixture of two or more thereof.

33. The process of claim 1 wherein the combustion catalyst comprises Pd, Pr, Pt, Rh, Ni, Cu, and/or an oxide thereof, or a mixture of two or more thereof.

34. The process of claim 33 wherein the combustion catalyst further comprises $Al_2O_3$, $SiO_2$, MgO, or a mixture of two or more thereof.

35. The process of claim 1 wherein the Fischer-Tropsch catalyst comprises one or more of Co, Fe, Ni, Ru, Re, Os, and/or an oxide thereof, or a mixture of two or more thereof.

36. The process of claim 1 wherein the Fischer-Tropsch catalyst comprises one or more metals from Group IA, IIA, IIIB or IIIB of the Periodic Table and/or an oxide thereof, a lanthanide metal and/or oxide thereof, an actinide metal and/or oxide thereof, or a mixture of two or more thereof.

37. The process of claim 1 wherein the SMR catalyst, combustion catalyst and/or Fischer-Tropsch catalyst is in the form of particulate solids.

38. The process of claim 1 wherein the SMR catalyst, combustion catalyst and/or Fischer-Tropsch catalyst is coated on interior walls of the channels, grown on interior walls of the channels, or coated on a fin structure.

39. The process of claim 1 wherein the SMR catalyst, combustion catalyst and/or Fischer-Tropsch catalyst is supported on a support structure having a flow-by configuration, a flow-through configuration, or a serpentine configuration.

40. The process of claim 1 wherein the SMR catalyst, combustion catalyst and/or Fischer-Tropsch catalyst is supported on a support structure having the configuration of a foam, felt, wad, fin, or a combination of two or more thereof.

41. The process of claim 1 wherein the SMR catalyst, combustion catalyst and/or Fischer-Tropsch catalyst is supported on a support structure in the form of a fin assembly comprising at least one fin.

42. A process, comprising:
(A) flowing an SMR feed in an SMR microchannel reactor in contact with one or more SMR catalysts to form a first intermediate product, the SMR feed comprising methane and steam, the first intermediate product comprising CO and $H_2$; the SMR microchannel reactor comprising a plurality of SMR process microchannels and a plurality of combustion channels; the SMR process microchannels containing the one or more SMR catalysts, the methane and steam contacting the one or more SMR catalysts in the process microchannels; separating part of the $H_2$ from the first intermediate product to form a second intermediate product, the second intermediate product comprising CO and $H_2$; the combustion channels containing one or more combustion catalysts, the separated $H_2$ being combined with oxygen or a source of oxygen to form a combustion reaction mixture; the combustion reaction mixture contacting the one or more combustion catalysts, undergoing a combustion reaction, and generating heat and a combustion exhaust;

transferring heat from the combustion channels to the SMR process microchannels;

(B) flowing the second intermediate product in a Fischer-Tropsch microchannel reactor in contact with one or more Fischer-Tropsch catalysts to form a Fischer-Tropsch product comprising one or more higher molecular weight hydrocarbons, and a gaseous mixture comprising CO and $H_2$; the Fischer-Tropsch microchannel reactor comprising a plurality of Fischer-Tropsch process microchannels and a plurality of heat exchange channels; the Fischer-Tropsch process microchannels containing the one or more Fischer-Tropsch catalysts, the second intermediate product contacting the one or more Fischer-Tropsch catalysts in the Fischer-Tropsch process microchannels; separating the gaseous mixture from the Fischer-Tropsch product, the separated gaseous mixture comprising a third intermediate product; transferring heat from the Fischer-Tropsch process microchannels to a heat exchange fluid in the heat exchange channels; and (C) flowing the third intermediate product in a second Fischer-Tropsch microchannel reactor in contact with one or more second Fischer-Tropsch catalysts to form a second Fischer-Tropsch product comprising one or more higher molecular weight hydrocarbons; the second Fischer-Tropsch microchannel reactor comprising a plurality of second Fischer-Tropsch process microchannels and a plurality of second heat exchange channels; the second Fischer-Tropsch process microchannels containing one or more second Fischer-Tropsch catalysts, the third intermediate product contacting the one or more second Fischer-Tropsch catalysts in the second Fischer-Tropsch process microchannels; transferring heat from the second Fischer-Tropsch process microchannels to a heat exchange fluid in the second heat exchange channels.

43. The process of claim 1 wherein the Fischer-Tropsch product is hydrocracked in a hydrocracker operated in series with the Fischer-Tropsch microchannel reactor.

* * * * *